(12) United States Patent
Ross

(10) Patent No.: US 12,040,877 B1
(45) Date of Patent: Jul. 16, 2024

(54) MOUNTING APPARATUS FOR WIRELESS COMMUNICATION EQUIPMENT

(71) Applicant: L3VEL, LLC, Wilmington, DE (US)

(72) Inventor: Kevin Ross, Lehi, UT (US)

(73) Assignee: L3VEL, LLC, Wilmington, DE (US)

( * ) Notice: Subject to any disclaimer, the term of this patent is extended or adjusted under 35 U.S.C. 154(b) by 0 days.

(21) Appl. No.: 17/963,076

(22) Filed: Oct. 10, 2022

Related U.S. Application Data

(63) Continuation of application No. 17/242,148, filed on Apr. 27, 2021.

(60) Provisional application No. 63/025,297, filed on May 15, 2020, provisional application No. 63/016,252, filed on Apr. 27, 2020.

(51) Int. Cl.
*H04B 7/10* (2017.01)
*H04W 88/08* (2009.01)

(52) U.S. Cl.
CPC ............. *H04B 7/10* (2013.01); *H04W 88/08* (2013.01)

(58) Field of Classification Search
CPC ........ H04B 7/10; H04W 88/02; H04W 88/06; H04W 88/08
See application file for complete search history.

(56) References Cited

U.S. PATENT DOCUMENTS

| | | |
|---|---|---|
| 8,385,921 B1 | 2/2013 | Shousterman et al. |
| 8,406,126 B1 | 3/2013 | Leiba et al. |
| 9,425,985 B1 | 8/2016 | Shousterman et al. |
| 9,538,331 B2 | 1/2017 | Ross et al. |
| 9,621,465 B2 | 4/2017 | Ross |
| 9,860,179 B2 | 1/2018 | Ross |
| 9,942,776 B2 | 4/2018 | Ross et al. |
| 9,973,939 B2 | 5/2018 | Ross |
| 10,027,508 B2 | 7/2018 | Leiba et al. |
| D856,962 S | 8/2019 | Hart et al. |
| 10,530,851 B1 | 1/2020 | Hart |
| 10,530,882 B2 | 1/2020 | Ross |
| 2007/0116471 A1 | 5/2007 | Bloom et al. |

(Continued)

FOREIGN PATENT DOCUMENTS

| | | |
|---|---|---|
| CN | 201466202 U | 5/2010 |
| WO | 2018083548 A1 | 5/2018 |

(Continued)

OTHER PUBLICATIONS

International Searching Authority, International Search Report and Written Opinion, PCT/US2021/029478, mailed Aug. 13, 2021, 11 pages.

(Continued)

*Primary Examiner* — Ankur Jain
(74) *Attorney, Agent, or Firm* — LEE SULLIVAN SHEA & SMITH LLP

(57) ABSTRACT

A wireless communication node of a wireless communication system may include a wireless communication module that is configured to communicate with a satellite (e.g., a low earth orbit satellite) and a mounting unit for mounting the wireless communication module at a ground-based installation site, where the mounting unit is configured to mechanically rotate the wireless communication module in response to receiving a command signal. Further, in at least some implementations, the wireless communication module may have electronic beamsteering capability.

17 Claims, 42 Drawing Sheets

(56) References Cited

U.S. PATENT DOCUMENTS

| | | |
|---|---|---|
| 2014/0057570 A1 | 2/2014 | Leiba |
| 2015/0002336 A1 | 1/2015 | Thubert et al. |
| 2015/0358082 A1 | 12/2015 | Ross |
| 2017/0010341 A1* | 1/2017 | Uego ................ H01Q 3/08 |
| 2017/0156119 A1 | 6/2017 | Neves et al. |
| 2017/0188293 A1* | 6/2017 | Mizusawa .......... H04W 72/542 |
| 2018/0238305 A1 | 8/2018 | McMahon |
| 2018/0331935 A1 | 11/2018 | Ross et al. |
| 2018/0332154 A1 | 11/2018 | Gharabegian |
| 2018/0343685 A1 | 11/2018 | Hart et al. |
| 2018/0351245 A1 | 12/2018 | Constance et al. |
| 2019/0074865 A1 | 3/2019 | Henry et al. |
| 2019/0356035 A1 | 11/2019 | Dominguez |
| 2020/0192338 A1 | 6/2020 | Mangino |
| 2020/0404175 A1 | 12/2020 | Terry et al. |
| 2021/0350091 A1 | 11/2021 | Blank et al. |
| 2022/0132487 A1 | 4/2022 | Werb |
| 2023/0036972 A1* | 2/2023 | Ross .................. H04W 76/19 |

FOREIGN PATENT DOCUMENTS

| | | |
|---|---|---|
| WO | 2022084942 A1 | 4/2022 |
| WO | 2022133930 A1 | 6/2022 |

OTHER PUBLICATIONS

Saudi Arabia Patent Office, First Substantive Examination Report mailed on Dec. 28, 2023 (and corresponding translation), issued in connection with Saudi Arabia Application No. 522441036, 17 pages.

International Searching Authority, International Search Report and Written Opinion, PCT/US2023/076358, mailed Feb. 1, 2024, 11 pages.

Chile Patent Office, Expert Report mailed on Jan. 15, 2024 (and corresponding translation), issued in connection with Chile Application No. 2022-02931, 22 pages.

* cited by examiner

MOUNTING APPARATUS FOR WIRELESS COMMUNICATION EQUIPMENT

CROSS-REFERENCE TO RELATED APPLICATIONS

This application is a continuation of and claims priority to U.S. Non-Provisional application Ser. No. 17/242,148, filed on Apr. 27, 2021 and titled "Mounting Apparatus for Wireless Communication Equipment," which in turn claims priority to (i) U.S. Provisional Application No. 63/016,252, filed Apr. 27, 2020, and titled "Mount for Wireless Communication Equipment," and (ii) U.S. Provisional Application No. 63/025,297, filed May 15, 2020, and titled "Mounting Apparatus for Wireless Communication Equipment," each of which is incorporated herein by reference in its entirety.

BACKGROUND

Wired and wireless networking and communications systems are widely deployed to provide various types of communication and functional features, including but not limited to those for high speed home internet, security and automation, and/or others. These systems may be capable of supporting communication with a user through a communication connection or a system management action.

Certain types of wireless communication systems (sometimes also referred to as wireless network systems, wireless communication networks, or wireless networks) may comprise multiple wireless communication nodes that facilitate wireless communication within the system. One example of such a wireless communication system may take the form of a wireless mesh network that comprises wireless communication nodes that are capable of receiving and transmitting high bandwidth signals operating at very high frequencies (e.g., millimeter wave signals), which may be used to provide next-generation wireless communication services (e.g., 5G or beyond wireless communication services), among various other possibilities.

OVERVIEW

Depending on the particular type of wireless communication system, it may be preferred or even necessary to have a clear line-of-sight ("LOS") between wireless communication nodes of the wireless communication system to enable signal transmission. For instance, the wireless communication nodes that are part of a given wireless communication system may communicate along wireless access paths that are highly directional and may function properly only under perfect or near perfect LOS conditions. Any interruption to these wireless access paths may result in loss of communication and/or network failure.

Interruptions to wireless access paths may be caused by various events. Such events may include, as some examples, loss of an intermediary node along the wireless access path, new construction within or surrounding the area of the wireless network, or vegetation growth within or around the area of the wireless network. LOS conditions of a large-scale wireless mesh network in an area of moderate to high vegetation can be adversely impacted, resulting in single or multiple link failures or interruptions, especially during seasons when foliage is dense. In some instances where LOS conditions are adversely impacted, a large number of field technicians may need to be dispatched to fix these LOS issues, which may involve determining which links were impacted, identifying corresponding wireless communication nodes, and re-adjusting and/or re-aligning wireless mesh communication network radios (if such re-aligning is even possible) of the wireless communication nodes to re-establish LOS in order to re-connect the wireless mesh communication nodes to the wireless mesh communication network.

Accordingly, for such wireless communication systems, there is a need for equipment and techniques that enable wireless communication nodes of a wireless communication system to be deployed at their respective deployment sites in a manner that allows wireless links having sufficient LOS conditions to be established and maintained.

To address these and other needs, disclosed herein are example mounting apparatuses for wireless communication equipment (e.g., one or more wireless communication nodes and their respective components) that is used to facilitate wireless communications within a wireless communication system.

In accordance with the present disclosure, a first type of mounting apparatus for a wireless communication node may be designed to securely affix the wireless communication node to a rooftop of a building (or another comparable mounting location that provides for improved LOS conditions) without requiring any penetration to the rooftop's surface (i.e., the mounting apparatus may be non-penetrating). For example, the first type of mounting apparatus disclosed herein may be able to achieve non-penetrative affixation by using a distributed weight system coupled with one or more support struts. In this way, the first type of mounting apparatus disclosed herein may allow the wireless communication node to be mounted on a rooftop or other comparable mounting location that provides for improved LOS conditions, which may help to reduce interruptions to connections with other wireless communication nodes in a wireless communication system, while also protecting the rooftop's surface from penetrative damage and thereby maintaining the rooftop's structural integrity and avoiding the time, labor, and cost that may be associated with installing a penetrative mount.

In practice, the first type of mounting apparatus disclosed herein could be used to mount a wireless communication node that takes any of various forms, including but not limited to a wireless communication node comprising equipment for establishing one or more point-to-point (ptp) wireless links and/or equipment for establishing one or more point-to-multipoint (ptmp) wireless links within a wireless communication system, among various other possibilities. Examples of equipment for establishing ptp and/or ptmp links that may be mounted using the first type of mounting apparatus disclosed herein are described in further detail below.

In order to further address the need to establish and maintain wireless links having sufficient LOS conditions, some types of wireless communication nodes may also include equipment that is capable of changing the direction of the node's one or more radiation beams, which is often referred to as beam steering or beam forming. For instance, at least some of the wireless communication nodes in a wireless communication system (e.g., a wireless mesh network) may have ptmp radio modules that include phased array antennas that may be configured to engage in electronic beam steering, as will be explained in more detail further below. Typically, such a phased array antenna may have multiple antenna elements that can each transmit signals at a specific phase, and, based on the values of the signal phases at phased antenna elements, the overall beam that is emitted from the antenna can be electronically steered in a desired direction vertically (elevation), horizontally (azimuth), or in both directions.

Further, although the 3 dB beam width of an individual beam produced by the phased antenna array is typically narrow (e.g., from 1~2 degrees to 10~12 degrees), the phased antenna array with the help of multiple distinct narrow beams pointing in different directions (e.g., horizontally and/or vertically) can provide coverage to an entire sector (e.g., coverage of 90 degrees). It should be understood that the phased antenna array can have a different sector coverage as well (e.g., a coverage greater or less than 90 degrees). For example, a phased antenna array can have 60 degree coverage or 120 degree coverage with the help of multiple narrow individual beams within the 60 degree or 120 degree range, respectively. In order to provide 360 degree coverage, four wireless mesh communication radios with phased antenna arrays may be required.

Because it generates multiple, distinct narrow beams, a phased array antenna can be used for fine re-alignment of a wireless communication module within a wireless communication node (e.g., a wireless mesh radio module) in the event of partial or complete LOS failures. For instance, due to growth of a tree branch, LOS between the respective wireless communication modules (e.g., wireless mesh radio modules) of two wireless communication nodes within a wireless communication network may be partially impacted, which may result in signal degradation that impacts bi-directional traffic throughput of the wireless communication link established between the wireless communication modules and possibly an entire segment of the wireless communication network depending on the specific topology of the network. In such instances, a phased antenna array at one or both ends of the wireless communication link may try multiple different narrow beams generated by the phased antenna array and select a given narrow beam that provides the best signal strength for transmission and/or reception.

While a phased antenna array may be used to re-align a wireless communication node as described above, there may be instances where LOS is impacted by circumstances and/or obstacles (e.g., vegetation) such that none of the possible narrow beams generated at one or both ends of a wireless communication link is able to produce an acceptable signal strength for signal transmission and/or reception. In such instances, the wireless communication node at the impacted site may need to have the direction of one or more of its radiation beams changed to point towards a different wireless communication node that may be outside the sector coverage of the phased antenna array of the wireless communication node. Consequently, the phased antenna array of a ptmp radio module may be unable to mitigate a LOS disruption using electronic beam steering alone, and the ptmp radio module may need to be further adjusted in order to direct the beams generated by the phased antenna array in a different direction.

Electronic beam steering could also be employed by certain ptp radio modules in order to steer the direction of a ptp radio module's single radiation beam from one wireless communication node to another wireless communication node (e.g., due to a trigger such as a change in link condition). However, as with the electronic beam steering employed by ptmp radio modules, there may be circumstances where electronic beam steaming alone cannot perform the necessary adjustment of the ptp radio module's beam direction, which may give rise to a need for the ptp radio module to be further adjusted in order to direct the beam generated by a ptp radio module in a different direction.

To address these additional needs, also disclosed herein is a second type of mounting apparatus for a wireless communication node that is configured to mechanically rotate one or more radio modules of the wireless communication node (e.g., one or more ptp and/or ptmp radio modules for a wireless mesh network) in any of various different directions (e.g., different horizontal directions) in response to a command signal, thereby enabling a particular radio module to be rotated independently of any other radio module of the wireless communication node on an "as needed" basis. As will be described in more detail further below, such a command signal may be issued by a computing device that is connected to the mount, such as an NPU for the wireless communication node, which may function to instruct the mounting apparatus to rotate a particular radio module in response to various triggering events, including but not limited to receiving a command message from a remote computing system or locally determining that an adjustment to direction of the particular radio module is needed. According to one implementation, this second type of mounting apparatus may carry out the rotation of the given wireless communication module with the help of a stepper motor. Advantageously, when this second type of mounting apparatus is used to mount a wireless communication node having multiple wireless communication modules, such as multiple wireless mesh radios that each comprise a phased antenna array, the mounting apparatus may enable each such wireless communication module to be rotated independently of any other wireless communication module of the wireless communication node.

Accordingly, in one aspect, disclosed herein is a mounting apparatus for a wireless communication node comprising: (i) a first weighting-element enclosure that is adapted to house a first weighting element, wherein the first weighting-element enclosure has a first set of connectors that extend from the first weighting-element enclosure; (ii) a second weighting-element enclosure that is adapted to house a second weighting element, wherein the second weighting-element enclosure has a second set of connectors that extend from the second weighting-element enclosure, and wherein the first weighting-element enclosure is connected to the second weighting-element enclosure via two joints that are disposed between the first set of connectors and the second set of connectors; (ii) a post that is affixed to either the first weighting-element enclosure or the second weighting-element enclosure; (iii) one or more communication-equipment enclosures that are each attached to the post and are each adapted to house respective equipment for the wireless communication node; and (iv) at least a first support strut that is connected between the post and a first one of the two joints disposed between the first weighting-element enclosure and the second weighting-element enclosure.

In another aspect, disclosed herein is a mounting apparatus for a wireless communication node comprising: (i) a base enclosure that is adapted to house a network processing unit (NPU); (ii) a post that is affixed to the base enclosure; and (iii) one or more radio enclosures that are each attached to the post and are each adapted to house a respective radio module, wherein each respective radio enclosure of the one or more radio enclosures is attached to the post via a respective bracket arrangement comprising a motor that is configured to rotate the respective radio enclosure in response to receiving a command signal.

The foregoing has outlined rather broadly the features and technical advantages of examples according to this disclosure so that the following detailed description may be better understood. Additional features and advantages will be described below. It should be understood that the specific examples disclosed herein may be readily utilized as a basis for modifying or designing other structures for carrying out the same operations disclosed herein. Characteristics of the concepts disclosed herein including their organization and method of operation together with associated advantages will be better understood from the following description when considered in connection with the accompanying figures. It should be understood that the figures are provided for the purpose of illustration and description only.

One of ordinary skill in the art will appreciate these as well as numerous other aspects in reading the following disclosure.

BRIEF DESCRIPTION OF THE DRAWINGS

A further understanding of the nature and advantages the present disclosure may be realized by reference to the following drawings.

DETAILED DESCRIPTION

As noted above, certain types of wireless communication systems (sometimes also referred to as wireless network systems, wireless communication networks, or wireless networks) may comprise multiple wireless communication nodes that facilitate wireless communication within the system. These wireless communication systems, and the wireless communication nodes included within such systems, may take any of various different forms.

Figure 1:
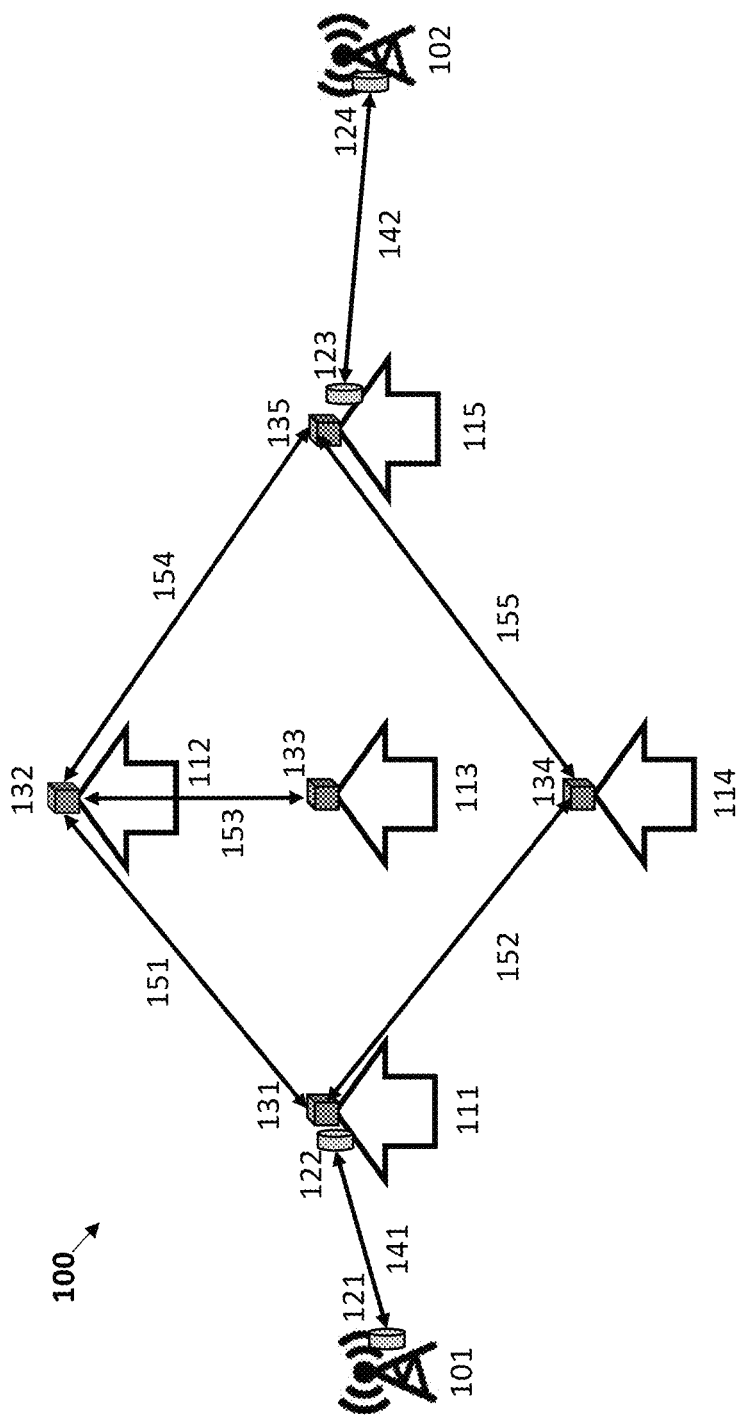
FIG. 1 depicts an example diagram relating to a wireless networking and communication system, in accordance with various aspects of this disclosure.

Referring to FIG. 1, a data communication network capable of providing multigigabit internet speeds through wireless point-to-point (ptp) and point-to-multipoint (ptmp) links is illustrated. Communication network 100 in FIG. 1 includes Tower/fiber access points 101 and 102. Tower/fiber access points 101 and 102 can be co-located or can be located at different physical locations. Tower/fiber access points 101 and 102 have access to a high bandwidth dark fiber capable of providing up to several hundred gigabits/second of data throughput. Tower/fiber access points 101 and 102 provide backhaul connectivity between a core network/data center (not shown in the FIG. 1 for the sake of simplicity) and a seed home of the communication network described below. Tower/Fiber access points 101 and 102 also host wireless ptp communication nodes 121 and 124.

As shown, wireless communication nodes 121 and 124 are capable of reception and transmission of high bandwidth (multiple gigahertz) signals operating at very high frequencies (e.g., 6 Ghz~100 Ghz such as 28 Ghz, V band, E band, etc.). Wireless communication nodes 121 and 124 each comprise a baseband/digital unit equipped with components including but not limited to a processor, memory, etc. Wireless communication nodes 121 and 124 also each comprise an RF unit and antenna unit. The antenna subsystem of wireless communication nodes 121 and 124 is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

As further shown in FIG. 1, communication network 100 includes seed homes 111 and 115. Examples of seed homes include detached single-family homes, multi-dwelling units (MDUs), small/medium business (SMB), etc., where communication equipment nodes can be deployed on rooftops. Seed homes 111 and 115 host wireless ptp communication nodes 122 and 123. Wireless communication nodes 122 and 123 are capable of reception and transmission of high bandwidth (multiple gigahertz) signals operating at very high frequencies (e.g., 6 Ghz~100 Ghz such as 28 Ghz, V band, E band, etc.).

Wireless communication nodes 122 and 123 comprise a baseband/digital unit equipped with components including but not limited to a processor, memory, etc. Wireless communication nodes 122 and 123 also comprise an RF unit and antenna unit. The antenna subsystem of wireless communication nodes 122 and 123 is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

Wireless communication node 121 residing in Tower/fiber access point location 101 and wireless communication node 122 residing in seed home 111 work together to form a bi-directional high bandwidth communication ptp data link 141 that provides connectivity between Tower/fiber access point 101 and seed home 111 segment of communication network 100. Similarly, wireless communication node 124 residing in Tower/fiber access point location 102 and wireless communication node 123 residing in seed home 115 work together to form a bi-directional high bandwidth communication ptp data link 142 that provides connectivity between Tower/fiber access point 102 and seed home 115 segment of the communication network 100.

Seed home 111, in addition to wireless communication node 122, hosts a second wireless communication node 131. Second wireless communication node 131 comprises multiple independent transmission/reception modules, which may also be referred to as "radio modules." Each module of the wireless communication node 131 is capable of reception and transmission of high bandwidth (multiple gigahertz) signals operating at very high frequencies (e.g., 6 Ghz~100 Ghz such as 28 Ghz, V band, E band, etc.). Each module of wireless communication node 131 comprises an independent baseband/digital unit equipped with components including but not limited to a processor, memory, etc. Each module in wireless communication node 131 also comprises an independent RF unit and independent antenna unit. The antenna subsystem of each wireless communication node 131's module is capable of reception and transmission of directional signals where a significant portion of the signal energy is concentrated within a few degrees around the antenna boresight (e.g., within a range of 0.5 degrees to 5 degrees), both in vertical and horizontal directions, in contrast to omni directional antennas where signal energy is close to evenly spread across 360° degrees.

Communication network 100 also includes multiple anchor homes 112, 113 and 114. Each of these anchor homes host a wireless communication node similar to wireless communication node 131 described above. However, unlike seed homes, a wireless communication node on an anchor home only provides wireless connectivity to one or more anchor homes and/or seed homes but does not provide connectivity to the Tower/Fiber access point. For example, anchor home 112 hosts wireless communication node 132. A first module of wireless communication node 132 residing in anchor home 112 and another module of wireless communication node 131 residing in seed home 111 work together to form a bi-directional high bandwidth communication ptp data link 151 that provides connectivity between seed home 111 and anchor home 112 segment of the communication network 100. Similarly, as another example, a second module of wireless communication node 132 residing in anchor home 112 and a module of wireless communication node 133 residing in anchor home 113 work together to form a bi-directional high bandwidth communication ptp data link 153 that provides connectivity between anchor home 112 and anchor home 113. As yet another example, a third module of wireless communication node 132 residing in anchor home 112 and a module of wireless communication node 135 residing in seed home 115 work together to form a bi-directional high bandwidth communication ptp data link 154 that provides connectivity between anchor home 112 and seed home 115. As a further example, another module of wireless communication node 131 residing in seed home 111 and a module of wireless communication node 134 residing in anchor home 114 work together to form a bi-directional high bandwidth communication ptp data link 152 that provides connectivity between anchor home 114 and seed home 111. As another example, another module of wireless communication node 134 residing in anchor home 114 and a module of wireless communication node 135 residing in seed home 115 work together to form a bi-directional high bandwidth communication ptp data link 155 that provides connectivity between anchor home 114 and seed home 115. Other examples are possible as well.

Bi-directional communication links 141, 142, 151, 152, 153, 154 & 155 shown in FIG. 1 can use various different multiple access schemes for transmission and reception including but not limited to frequency division multiple access (FDMA), time division multiple access (TDMA), single carrier FDMA (SC-FDMA), single carrier TDMA (SC-TDMA), code division multiple access (CDMA), orthogonal frequency division multiple access (OFDMA), and/or non-orthogonal multiple access (NOMA) as described in various generations of communication technologies including 1G, 2G, 3G, 4G, 5G and 6G, etc. Bi-directional communication links 141, 142, 151, 152, 153, 154 & 155 formed by a set of communication nodes comprising two or more of 121, 122, 123, 124, 131, 132, 133, 134, and/or 135 are capable of data information transfer via a variety of digital transmission schemes, including but not limited to amplitude modulation (AM), phase modulation (PM), pulse amplitude modulation/quadrature amplitude modulation (PAM/QAM), and/or ultra-wide band (UWB) pulse modulation (pico-second pulses), etc.

In FIG. 1, two Tower/fiber access points 101 & 102, two seed homes 111 & 115 and three anchor homes 112, 113 & 114 and seven bi-directional ptp data links 141, 142, 151, 152, 153, 154 & 155 are shown to illustrate an example of a communication network. However, in general, it should be understood that communication network 100 can include a different number of Tower/fiber nodes, seed homes, anchor homes and/or communication links, which may depend on the specific layout of a particular instantiation of the communication network deployed in the field. Similarly, although, FIG. 1 shows four communication nodes 121, 122, 123 & 124 that provide connectivity between a Tower/fiber access point (e.g., Tower/fiber access points 101, 102) and a seed home, five communication nodes 131, 132, 133, 134 & 135 that provide connectivity between two anchor homes or between an anchor and a seed home, the number of these communication nodes can vary from one communication network to another communication network, which may depend on the specific size and layout of a particular instantiation of the communication network. It should also be understood that communication network 100 may also contain other nodes (e.g., network switches/routers, etc.) that are omitted here for the sake of simplicity.

Figure 2:
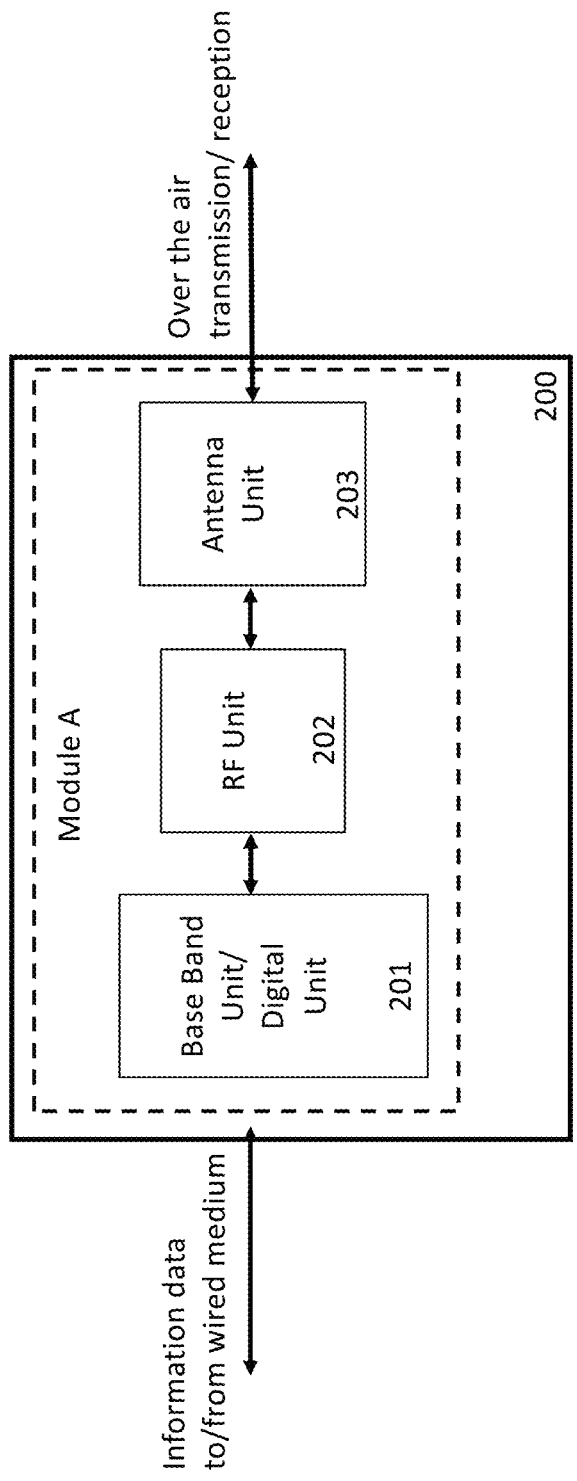
FIG. 2 depicts an example wireless communication node comprising a module, in accordance with various aspects of this disclosure.

Referring to FIG. 2, one possible embodiment of wireless communication node 131 of FIG. 1 is shown as wireless communication node 200. Wireless communication node 200 in FIG. 2 comprises a module labelled as "Module A," which is one type of ptp radio module. As shown, Module A comprises a base band unit or digital unit 201 which runs the physical layer level protocol including digital modulation/demodulation (modem) and other higher layer protocols such as a MAC layer, etc. Base band unit 201 interacts with other nodes of communication network that are external to the wireless communication node 200 via a wired medium.

Module A also includes RF unit 202 which, among other things, performs processing of intermediate frequency (IF) signals and defines the frequency range of the radio signals that can be transmitted or received via Module A. RF unit 202 is capable of operating over a wide range of frequencies (e.g., V band frequencies ranging from 57 Ghz to 71 Ghz).

Further, as shown, Module A also comprises antenna unit 203 which performs the transmission and reception of over the air radio signals. Antenna unit 203 is capable of transmitting and receiving extremely narrow beam of signals. Antenna unit 203 may be constructed with metamaterials that have excellent properties of controlling the directionality of radio signals that cannot be exhibited by ordinary antennas. Module A with the help of antenna unit 203 is capable of establishing ptp links with a different module residing in a different wireless communication node.

Figure 3:
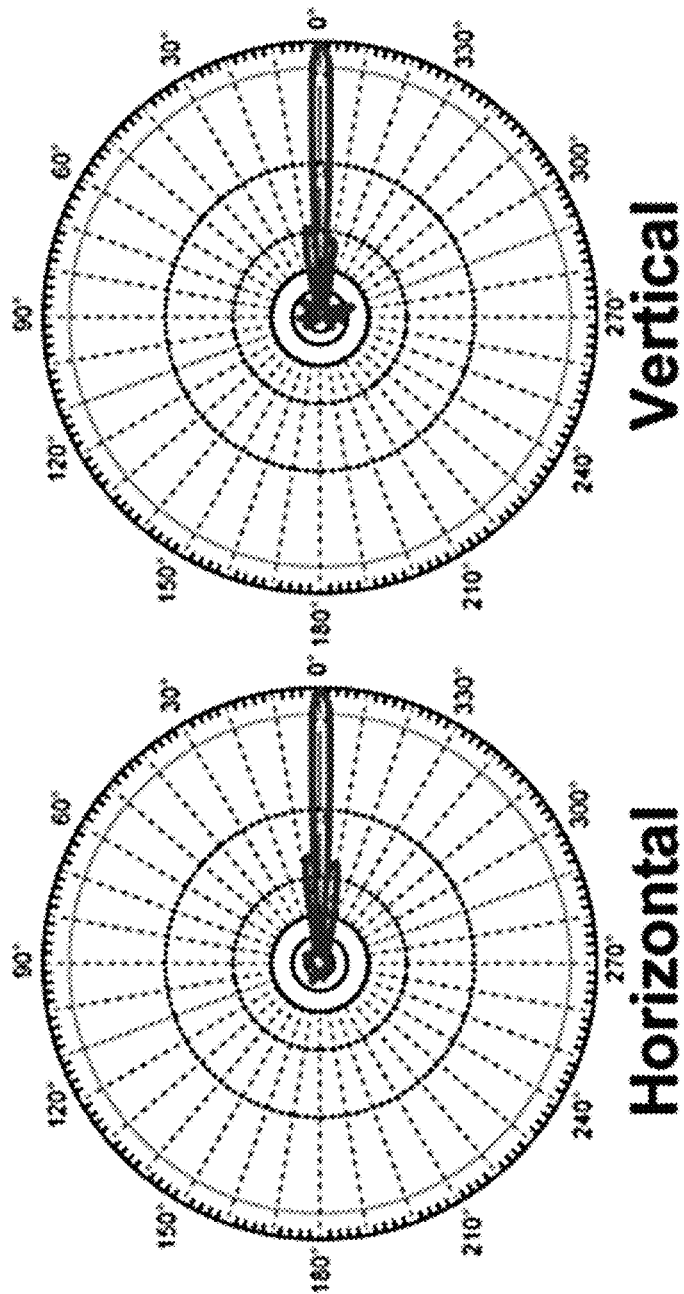
FIG. 3 depicts an example antenna pattern of a module, in accordance with various aspects of this disclosure.

Referring to FIG. 3, an example of an antenna pattern of Module A created by antenna unit 203 is shown. It can be seen from the antenna pattern in FIG. 3 that the beam width of antenna unit 203 of Module A is extremely narrow (less than a degree) and the side lobe power levels start to drop at a rapid rate. For instance, as shown, approximately 5-6 degrees from the main lobe, power levels may drop by more than 30 dB.

It should be understood that the antenna pattern of antenna unit 203 shown in FIG. 3 is just one example showing the extremely narrow beam antenna pattern generation capability of Module A. In other instances, due to a change in antenna elements, size, frequency, etc., different patterns may be generated. Further, while Module A can be constructed using metamaterials described above, it should be understood that Module A can be constructed using a parabolic antenna or other types of antennas. However, it should be understood that the main characteristic of generation of extremely narrow antenna beam pattern is common to all the instances of Module A.

Figure 4:
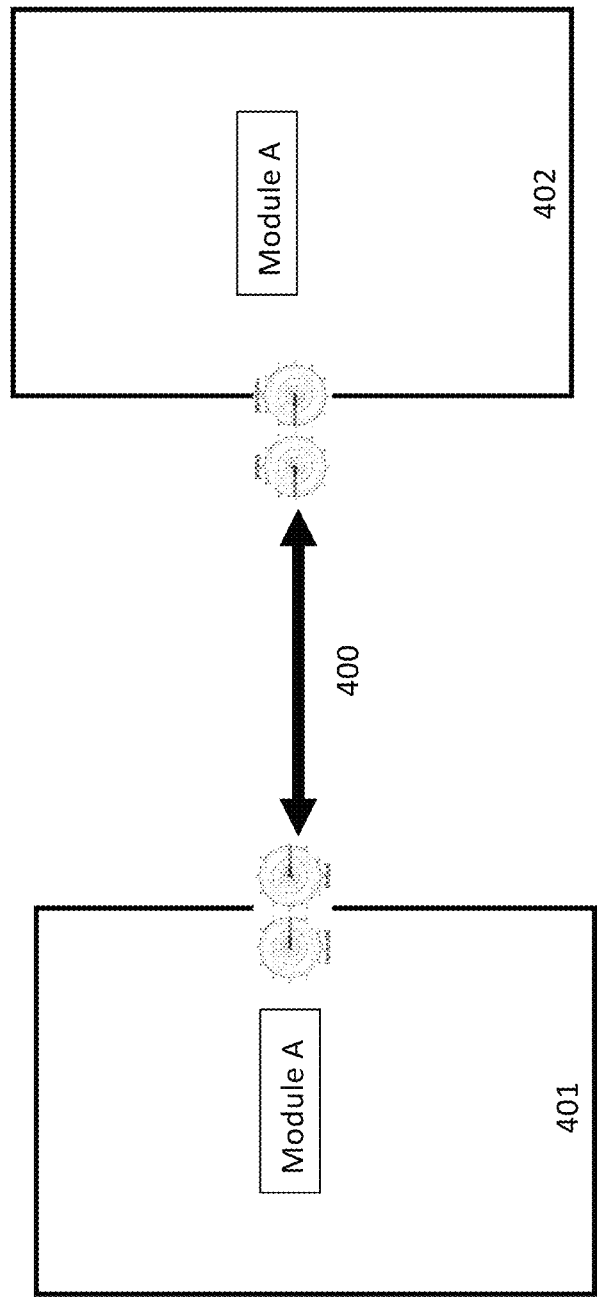
FIG. 4 depicts an example communication link between two wireless communication nodes, in accordance with various aspects of this disclosure.

Referring to FIG. 4, a ptp wireless communication link 400 established between two wireless communication nodes 401 and 402 is shown. Wireless communication nodes 401 and 402 each host a single communication module (i.e., "Module A") that may take the form similar to Module A depicted in FIG. 2 and described above. As shown in FIG. 4, due to the antenna unit characteristics of each respective Module A in the wireless communication nodes 401 and 402, the bi-directional ptp link 400 may have an extremely narrow beam. This transmission and reception capability of radio signals over an extremely narrow beam via ptp link 400 provides interference immunity in scenarios where there are a large number of wireless communication links established by multiple wireless communication nodes concentrated in a small area and operating in the same frequency.

In some implementations, Module A can additionally provide beam steerability characteristics in addition to the capability of transmitting and receiving data over extremely narrow beams as explained above and illustrated in the context of FIGS. 2-4.

Figure 5:
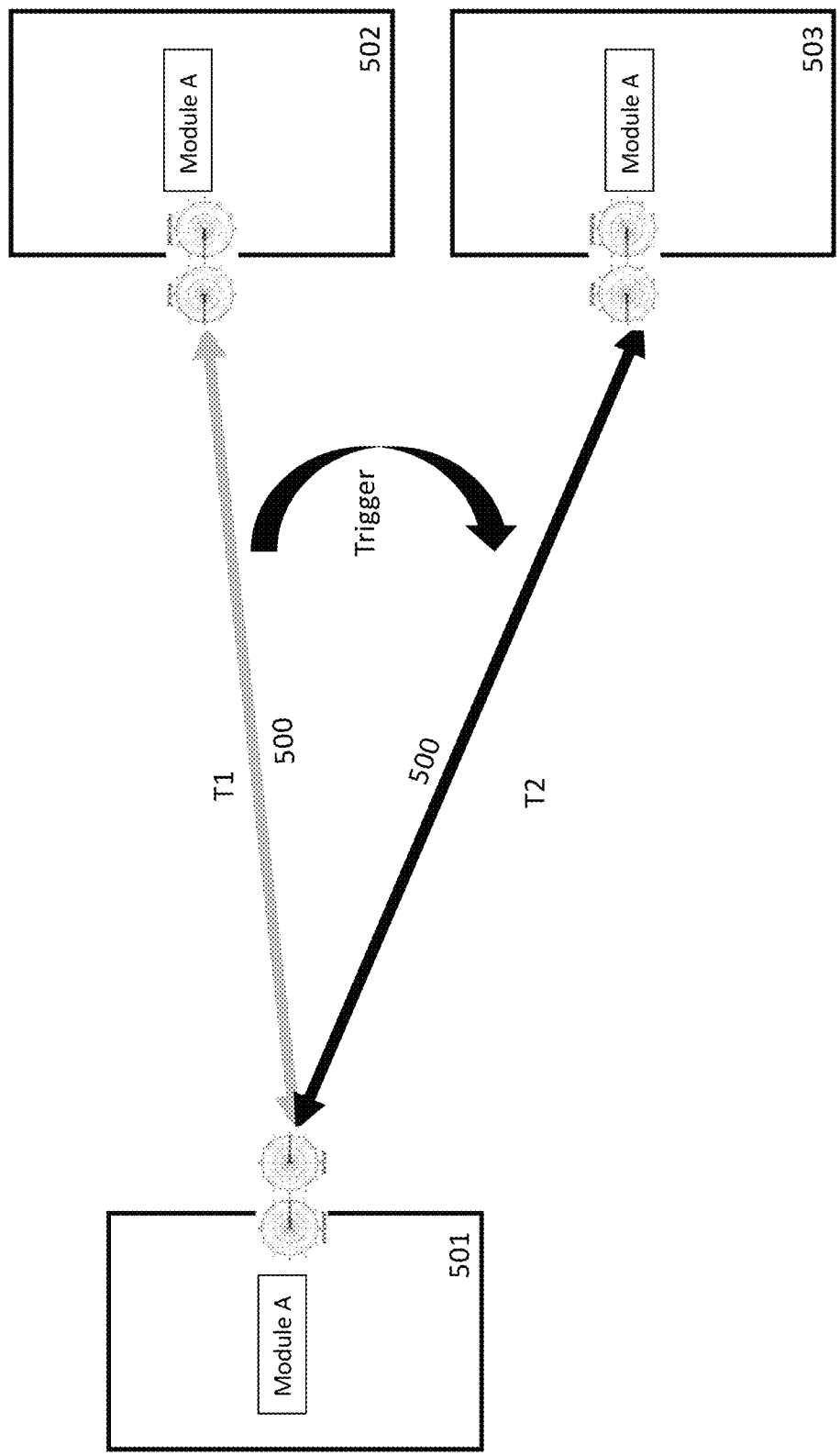
FIG. 5 depicts example wireless communication nodes, in accordance with various aspects of this disclosure.

For example, referring to FIG. 5, a wireless communication node 501 comprising Module A, a second wireless communication node 502 comprising Module A and a third wireless communication node 503 comprising Module A is shown. During time T1, Module A of wireless communication node 501 and Module A of wireless communication node 502 work together to establish an extremely narrow beam based bi-directional link 500 for the exchange of information data between wireless communication nodes 501 and 502. Due to some trigger, Module A of wireless communication node 501 may invoke the beam steering capability of the module and change the direction of the antenna transmission and reception beam towards wireless communication node 503 and work together with Module A of wireless communication node 503 to dynamically establish a bi-directional extremely narrow beam-based link 500 between wireless communication node 501 and wireless communication node 503 during time T2. The trigger for this beam steering can be due to changes in the link condition between wireless communication node 501 and wireless communication node 502, which may involve various factors, including but not limited to, a change from a LOS path to a non-LOS path due to a change in environment, increased interference, a change in a position of wireless communication node 502 with respect to wireless communication node 501, and/or instructions from higher layers, etc.

In one embodiment, wireless communication node 503 can be different than wireless communication node 502. In another embodiment, wireless communication node 503 can be the same as wireless communication node 502 but in a different physical location.

In some embodiments, wireless communication nodes defined above and discussed in the context of FIGS. 2-5 can host more than one module. This allows a wireless communication node to communicate simultaneously with multiple wireless communication nodes by establishing multiple extremely narrow beam bi-directional links with the help of multiple modules (e.g., multiple Module As) belonging to different wireless communication nodes working together.

Figure 6:
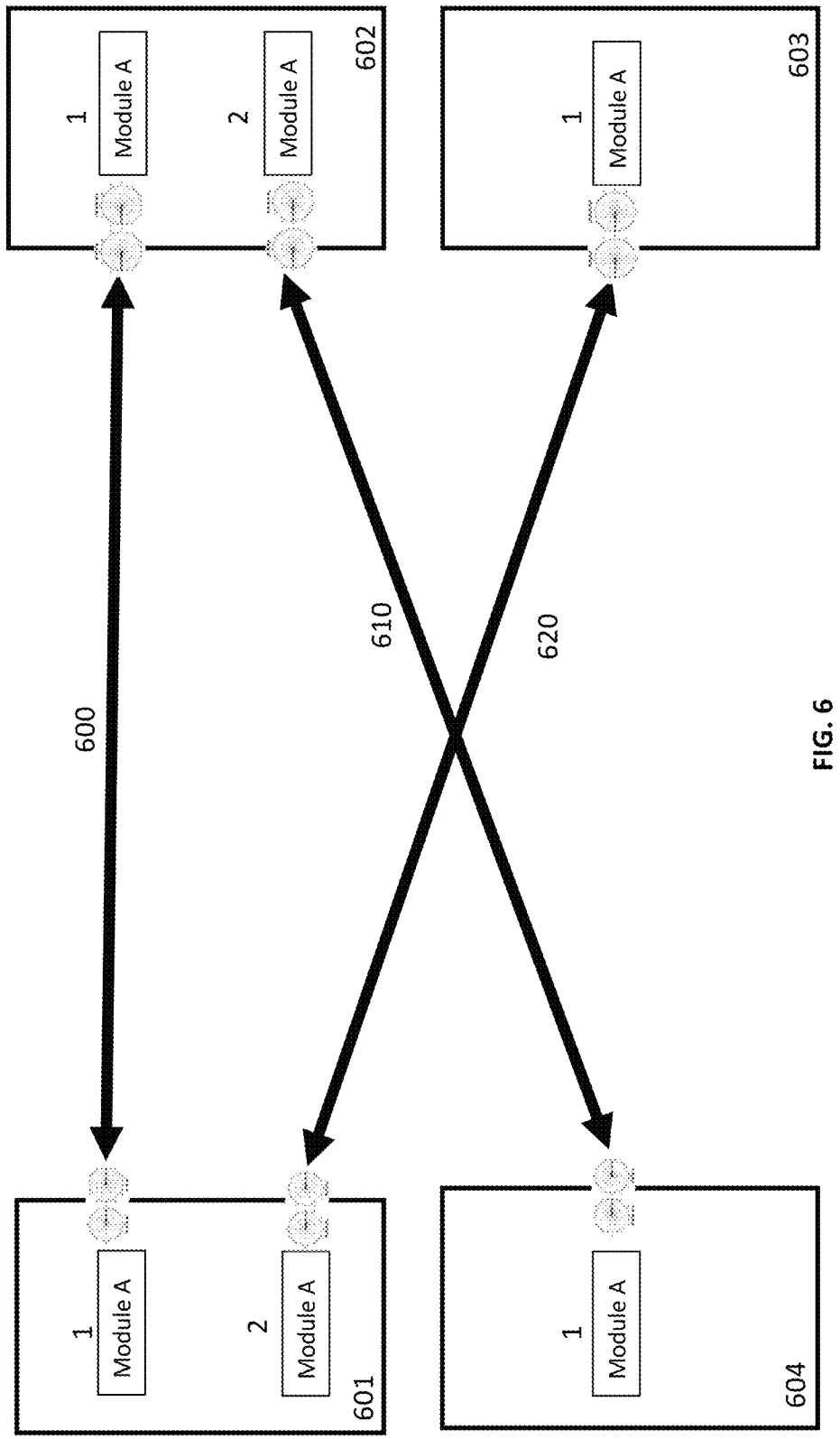
FIG. 6 depicts example wireless communication nodes that are communicatively coupled, in accordance with various aspects of this disclosure.

As one example to illustrate, referring to FIG. 6, wireless communication nodes 601 and 602 each host two Module As labeled "1" and "2," while wireless communication nodes 603 and 604 each host a single Module A. As shown, a $1^{st}$ Module A of wireless communication node 601 and a $1^{st}$ Module A of wireless communication node 602 work together to establish extremely narrow bi-directional beam-based link 600 to provide a wireless connection between wireless communication node 601 and 602. Similarly, a $2^{nd}$ Module A of wireless communication node 601 and 602 and a $1^{st}$ (and only) Module A of wireless communication nodes 603 and 604 respectively work together to establish extremely narrow bi-directional beam-based links 610 and 620 to provide wireless connections between wireless communication nodes 601-603 and 602-604, respectively.

In one embodiment, the $1^{st}$ and 2nd Module A of wireless communication nodes 601 and 602 can be inside the same physical enclosure and in other embodiments, the $1^{st}$ Module A of wireless communication nodes 601 and 603 can be inside one physical enclosure and the $2^{nd}$ Module A of wireless communication nodes 601 and 603 can be inside a different physical enclosure. In embodiments where different Module As belonging to the same wireless communication node are contained in separate physical enclosures, these Module As can be connected via a wired link as they are co-located in the same seed home or anchor home.

In FIG. 6, a maximum of two Module As are shown to be contained in a wireless communication node that enables the wireless communication node to establish two independent bi-directional links with different wireless communication nodes simultaneously. However, it should be understood that a wireless communication node can host more than two Module As and the maximum number of Module As that a wireless communication node can host may depend on the maximum total power available to the wireless communication node.

Further, it should be understood that in one embodiment, all Module As belonging to the same wireless communication node may operate on the same carrier frequencies of a frequency band, and in other embodiments, different Module As belonging to same wireless communication node may operate on different carrier frequencies of a frequency band.

Figure 7:
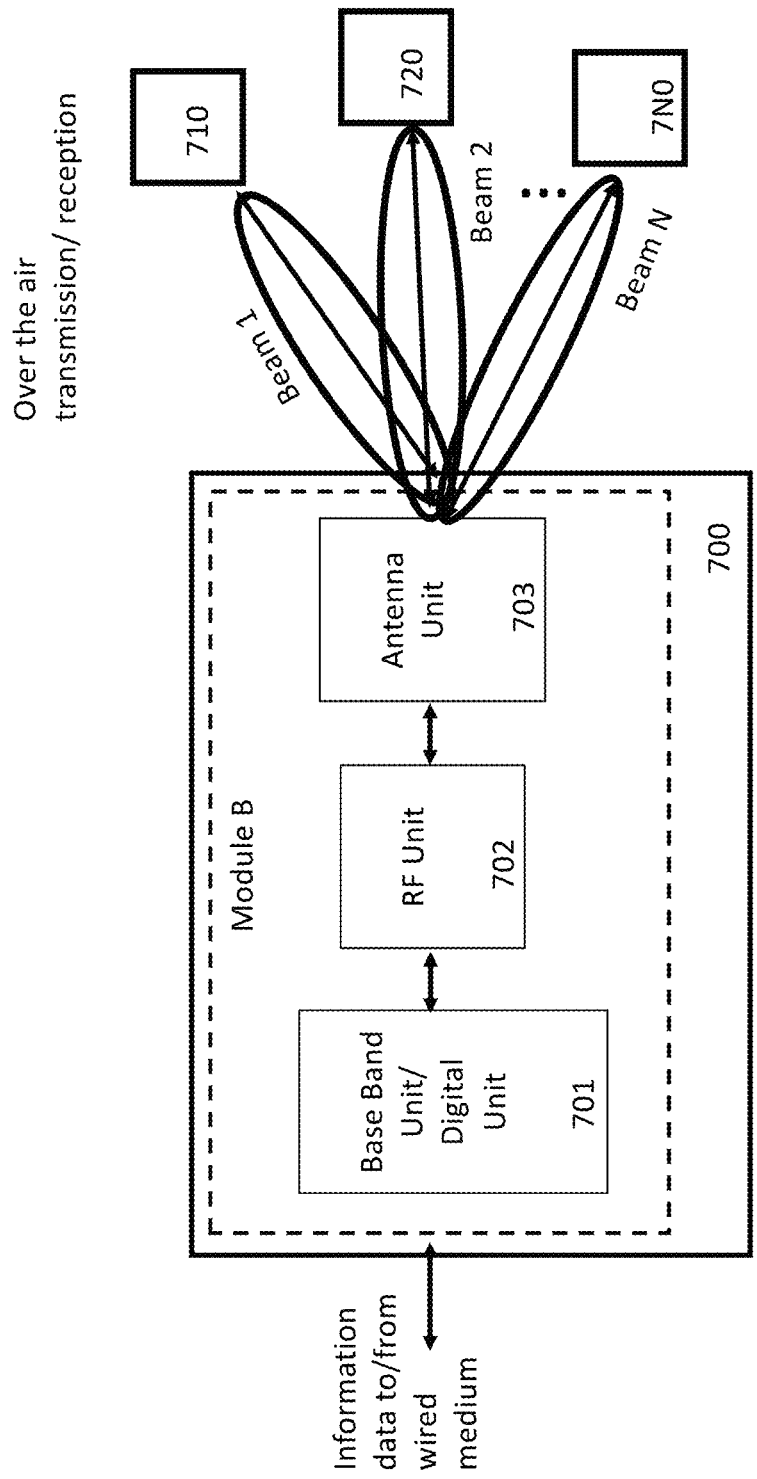
FIG. 7 depicts another example wireless communication node comprising a module, in accordance with various aspects of this disclosure.

Referring to FIG. 7, another embodiment of wireless communication node 131 of FIG. 1 is shown as wireless communication node 700. Wireless communication node 700 in FIG. 7 comprises a single module labeled as "Module B," which is one type of ptmp radio module. Module B comprises base band unit or digital unit 701 which runs the physical layer level protocol including digital modulation/demodulation (modem) and other higher layer protocols such as a MAC layer, etc. Base band unit 701 interacts with other nodes of the communication network that are external to the wireless communication node 700 via wired medium.

Module B also includes RF unit 702, which among other things processes intermediate frequency (IF) signals and defines the frequency range of the radio signals that can be transmitted or received with Module B. RF unit 702 is capable of operating over a wide range of frequencies (e.g., V band frequencies ranging from 57 Ghz to 71 Ghz).

Further, Module B comprises antenna unit 703, which performs the transmission and reception of over the air radio signals. Antenna unit 703 may be an active antenna system (AAS) that comprises a phased array of transmitters and receivers that are capable of beamforming and creating multiple beams simultaneously in different directions. By virtue of the simultaneous creation of multiple beams in different directions, AAS of antenna unit 703 enables the wireless communication node 700 to establish ptmp wireless communication links with multiple wireless communication nodes. Hence Module B with the help of antenna unit 703 is capable of establishing ptmp links with a different module residing in a different wireless communication node.

As further shown in FIG. 7, Module B residing in wireless communication node 700 is shown to create 1 to N multiple beams with the help of AAS of antenna unit 703. Value N depends on the number of transmit and receive antennas in AAS of antenna unit 703. Specifically, it can be seen that wireless communication unit 700 is connected to wireless communication unit 710, wireless communication unit 720, and wireless communication unit 7N0 via bi-directional beam 1, beam 2 and beam N respectively. It can also be seen from the antenna pattern in FIG. 7 that the beam width of the ptmp beams of antenna unit 703 of Module B are not extremely narrow (e.g., 3 dB beam width of 7-10 degree) and side lobes power levels do not start to drop at a rapid rate, which is in contrast to the antenna pattern of the antenna unit belonging to Module A described above and discussed in the context of FIGS. 2-6.

Further, Module B of wireless communication node 700 also differs from Module A (discussed above in the context of FIGS. 2-6) with respect to the limitation that the multiple bi-directional links operate in a single frequency range at a given time. For example, signal beams 1 to N that connect wireless communication node 700 to wireless communication nodes 710 to 7N0 respectively may only operate within the same frequency range at a given instant of time. It is to be noted that at a different instant, all beams 1 to N can switch to operate at a frequency range different from the frequency range used in the previous time instant, however, frequency range of an individual beam remains the same as the frequency range of all the other N-1 beams at a given instant of time. Hence, with respect to Module B, although due to phased antenna arrays can create multiple beams to create point-to-multi point links to connect one wireless communication node with multiple wireless communication nodes as shown in FIG. 7, an interference profile at the receiver side with such a ptmp network is inferior to an interference profile of a ptmp network where a wireless communication node hosts multiple Module As and creates multiple ptp links as shown in FIG. 6, where wireless communication node 601 uses two Module As to connect to wireless communication node 602 and wireless communication node 603 simultaneously. The main reasons of high interference with Module B may be due to (1) individual phased antenna array-based beams that are not as narrow as extremely narrow beams generated by metamaterial-based antenna of Module A and/or (2) all beams of Module B belonging to one wireless communication unit that cannot operate at different frequency ranges unlike multiple ptp narrow beams of wireless communication node that host multiple Module As.

Figure 8:
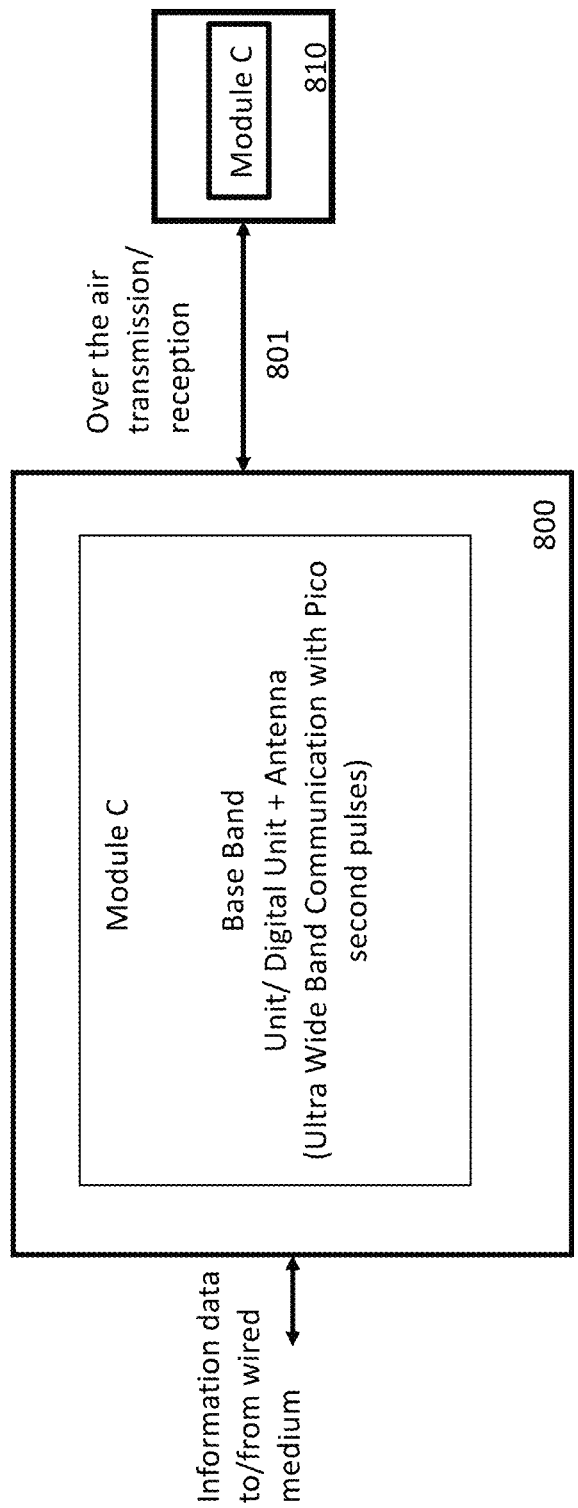
FIG. 8. depicts yet another example wireless communication node comprising a module, in accordance with various aspects of this disclosure.

Referring to FIG. 8, another possible embodiment of wireless communication node 131 of FIG. 1 is shown as wireless communication node 800 and wireless communication node 810. Wireless communication node 800 in FIG. 8 comprises a module labeled as "Module C," which is another type of ptp radio module. Module C comprises a base band unit or digital unit which runs the physical layer level protocol including digital modulation/demodulation (modem) and other higher layer protocols such as MAC layer etc. Module C's baseband unit interacts with other nodes of a communication network that are external to the wireless communication node 800 via wired medium.

Module C also includes an ultra-wide band antenna embedded with the baseband unit. Module C is capable of generation, transmission, and reception of extremely short duration pulses (a few picoseconds long) and uses pulse modulation (and its variations such as pulse amplitude modulation, etc.) to transmit data at extremely high rates (e.g., greater than 100 Gbps) by transmitting signals over a very wide range of frequencies. In one embodiment, pulses used for communication by Module C can use frequencies ranging from few hundred megahertz to few hundred gigahertz. One of ordinary skill in the art will appreciate that the range of frequencies used by pulses generated by Module C of wireless communication unit 800 can take a different range as well. Moreover, multiple module Cs can be placed together to create a 1-, 2-, or 3-dimensional array. Elements of this array (e.g., module C) are capable of performing a time synchronized transmission for beam forming. This allows the RF signal energy of the Pico second/UWB pulses to focus in a desired (receiver) direction and can also enable the creation of null or low RF signal energy of the Pico second/UWB pulse in other directions to avoid interference.

One fundamental difference between the characteristic of signals generated by Module C and signals generated by Module A and/or Module B is that these signals generated by Module C are ultra wide band (UWB) signals and their power spectral density over the entire range of frequencies is very low. In this respect, these UWB signals do not create interference with other signals operating on a narrow band of frequencies as these UWB signals are treated as noise by receivers of normal wireless communication nodes.

As further shown in FIG. 8, Module C of wireless communication node 800 and Module C of wireless communication unit 810 establish a link 801 by working together. As explained above, such a communication link 801 operates over an ultra-wide range of frequencies. However, even in the presence of other wireless communication nodes (not shown in FIG. 8) such as wireless communication nodes with Module A or Module B that operate on a narrow band of frequencies compared to Module C of wireless communication node 800, performance of network is not impacted as power spectral density over the frequency range of communication link 801 that overlaps with frequency ranges on which a nearby wireless communication node using narrow band signals using for example Module A and/or Module B operates is very low and is treated as noise by the receivers of Module A and/or Module B.

In another preferred embodiment, in line with the discussion above, wireless communication node 131 in FIG. 1 can host two types of modules. This allows a wireless communication node to communicate simultaneously with multiple wireless communication nodes and with two different interference profiles.

Figure 9:
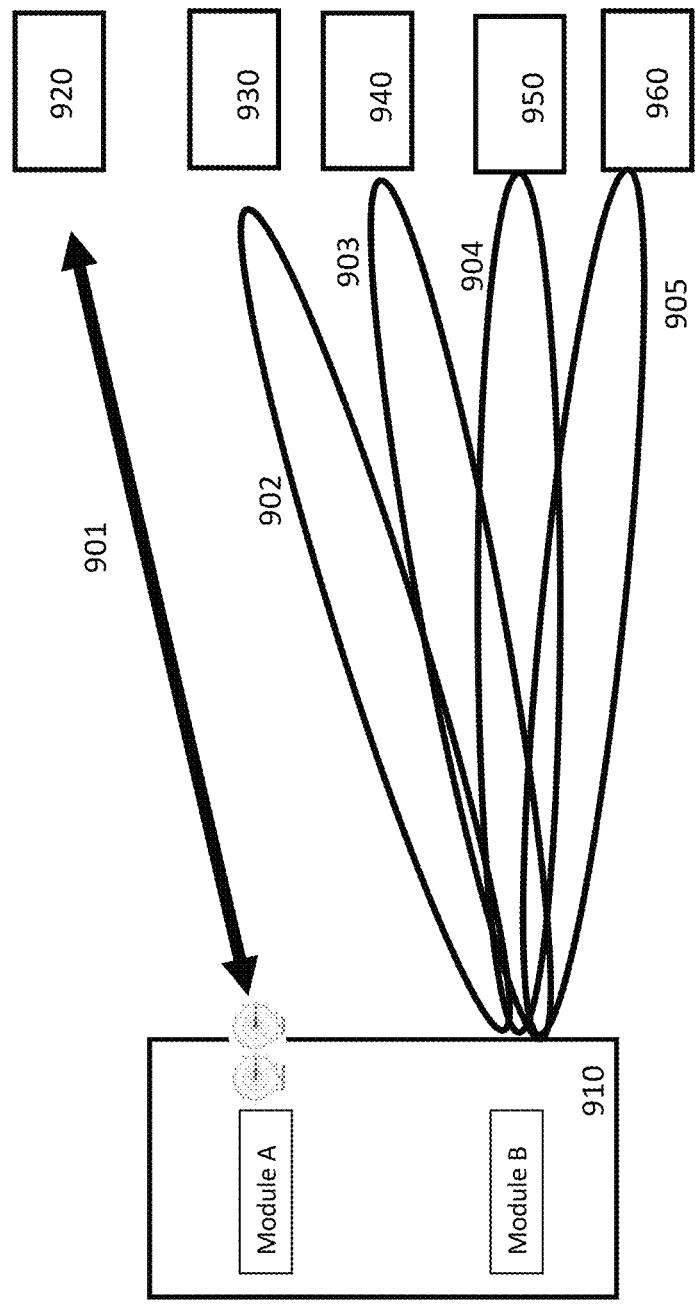
FIG. 9 depicts an example wireless communication node comprising two modules, in accordance with various aspects of this disclosure.

As one example to illustrate, referring to FIG. 9, wireless communication node 910 hosts one Module A and one Module B. Module A of wireless communication node 910 and a communication module of wireless communication node 920 work together to establish extremely narrow bi-directional beam-based link 901 to provide wireless connection between wireless communication nodes 910 and 920. Simultaneously, Module B of wireless communication node 910 which is based on AAS and generates multiple beams simultaneously creates a ptmp link that connects wireless communication node 910 with wireless communication nodes 930, 940, 950 and 960. Specifically, Module B of wireless communication node 910 coordinates with (1) a module of wireless communication node 930 to establish bi-directional beam 902, (2) a module of wireless communication node 940 to establish bi-directional beam 903, (3) a module of wireless communication node 950 to establish bi-directional beam 904, and (4) a module of wireless communication node 960 to establish bi-directional beam 905. In one embodiment, extremely narrow beam 901 and group of beams including 902, 903, 904 and 905 may all operate within the same range of carrier frequencies at a given time. In another embodiment, extremely narrow beam 901 may operate within a different range of frequencies compared to the range of frequencies used by the group of beams including 902, 903, 904 and 905 at a given time.

In one embodiment, Module A and Module B of wireless communication node 910 can be inside the same physical enclosure. In other embodiments, Module A and Module B of wireless communication node 910 can be inside two separate physical enclosures. In such embodiments where Module A and Module B belong to the same wireless communication node contained in separate physical enclosures, Module A and Module B can be connected via a wired link as they are co-located in the same seed home or anchor home.

In FIG. 9, a maximum of two modules (i.e., a single Module A and a single Module B) are shown to be contained in a wireless communication node 910 that enables the wireless communication node to establish two independent and different types of bi-directional links with different wireless communication nodes simultaneously. However, it should be understood that wireless communication node 910 can host more than two modules (e.g., a combination of one or more Module As and one or more Module Bs) and the maximum number of total modules that a wireless communication node can host may depend on the maximum total power available to the wireless communication node. Further, it should be understood that in one embodiment, all modules belonging to same wireless communication node may operate on the same carrier frequencies of a frequency band but in other embodiments, different modules belonging to the same wireless communication node may operate on different carrier frequencies of a frequency band.

As noted above, wireless communication nodes 131 in FIG. 1 can host more than one type of module. This allows a wireless communication node to communicate simultaneously with multiple wireless communication nodes and with different interference profiles.

Figure 10:
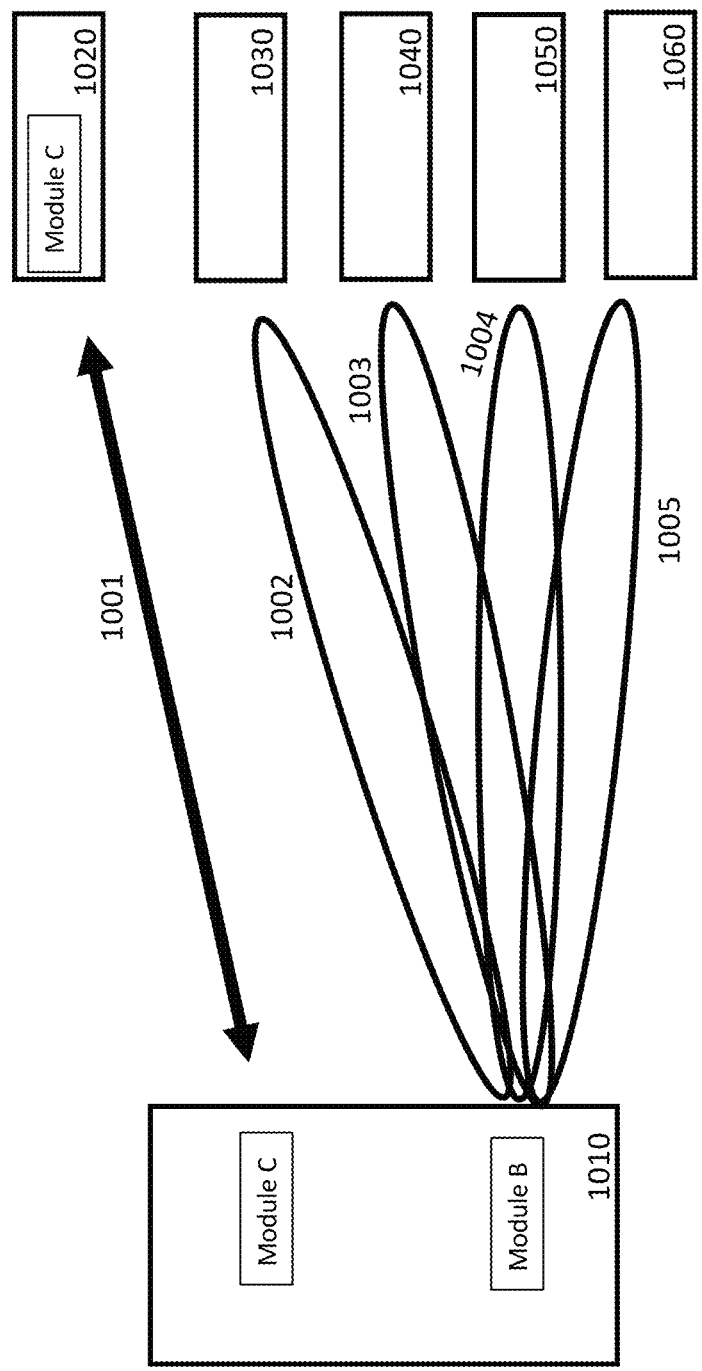
FIG. 10 depicts another example wireless communication node comprising two modules, in accordance with various aspects of this disclosure.

As another example to illustrate, referring to FIG. 10, wireless communication node 1010 hosts one Module C and one Module B. Module C of wireless communication node 1010 and Module C of wireless communication node 1020 work together to establish extremely high data rate ultra-wide frequency and low power spectral density beam-based link 1001 to provide wireless connection between wireless communication nodes 1010 and 1020. Module B of wireless communication node 1010, which is based on AAS and generates multiple beams simultaneously, creates a ptmp link that connects wireless communication node 1010 with wireless communication nodes 1030, 1040, 1050 and 1060. Specifically, Module B of wireless communication node 1010 coordinates with (1) a module of wireless communication node 1030 to establish bi-directional beam 1002, (2) a module of wireless communication node 1040 to establish bi-directional beam 1003, (3) a module of wireless communication node 1050 to establish bi-directional beam 1004, and (4) a module of wireless communication node 1060 to establish bi-directional beam 1005.

In one embodiment, Module C and Module B of wireless communication node 1010 can be inside same physical enclosure. In other embodiments, Module C and Module B of wireless communication node 1010 can be inside two separate physical enclosures. In such an embodiment where Module C and Module B belong to the same wireless communication node contained in separate physical enclosures, Module C and Module B can be connected via a wired link as they are co-located in same seed home or anchor home.

In FIG. 10, a maximum of two modules (i.e., a single Module C and a single Module B) are shown to be contained in a wireless communication node 1010 that enables the wireless communication node to establish two independent and different types of bi-directional links with different wireless communication nodes simultaneously. However, it should be understood that wireless communication node 1010 can host more than two types of module (e.g., a combination of Module A, Module B and/or Module C) and the maximum number of total modules that a wireless communication node can host may depend on the maximum total power available to the wireless communication node. It should be also understood that in one embodiment, all modules belonging to same wireless communication node may operate on same carrier frequencies of a frequency band, while in other embodiments, different modules belonging to same wireless communication node may operate on different carrier frequencies of a frequency band.

In another preferred embodiment, wireless communication nodes 131 in FIG. 1 can host more than one type of module and dynamically change the type of link between wireless communication nodes. This allows a wireless communication node to communicate simultaneously with multiple wireless communication nodes and with different interference profiles and to adapt with changes in network environment.

Figure 11A:
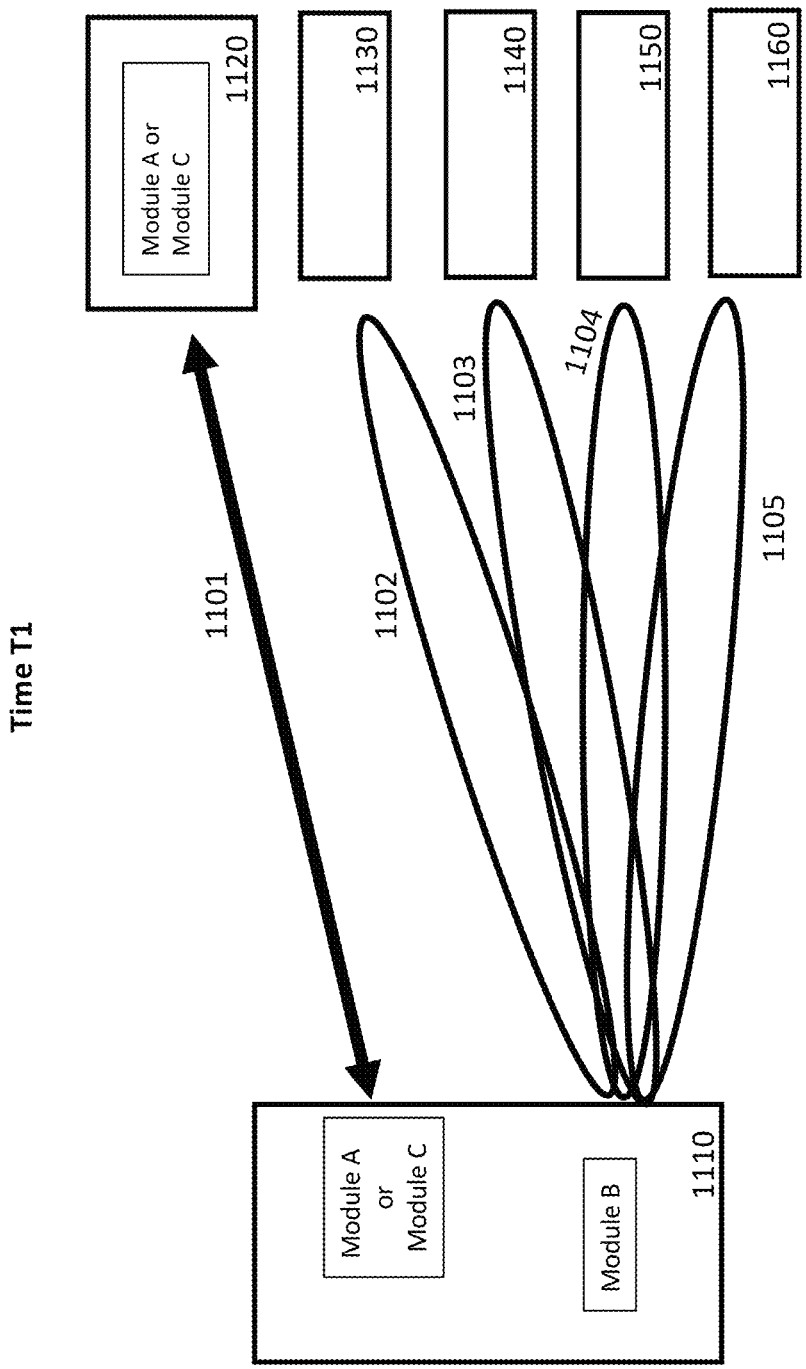
FIG. 11A depicts an example wireless communication node at a given time that can dynamically change type of links between wireless communication nodes, in accordance with various aspects of this disclosure.

As one example to illustrate, referring to FIG. 11A, wireless communication node 1110 hosts a Module C or Module A along with a Module B. During time T1, Module A/Module C of wireless communication node 1110 and communication module of wireless communication node 1010 work together to establish either an extremely high date rate ultra-wide frequency low power spectral density beam or extremely narrow beam-based link 1101 to provide wireless connection between wireless communication nodes 1110 and 1120. At substantially the same time duration T1, Module B of wireless communication node 1110 which is based on AAS and generates multiple beams simultaneously creates a ptmp link that connects wireless communication node 1110 with wireless communication nodes 1130, 1140, 1150 and 1160. Specifically, Module B of wireless communication node 1110 coordinates with (1) a module of wireless communication node 1130 to establish bi-directional beam 1102, (2) a module of wireless communication node 1140 to establish bi-directional beam 1103, (3) a module of wireless communication node 1150 to establish bi-directional beam 1104, and (4) a module of wireless communication node 1160 to establish bi-directional beam 1105.

Figure 11B:
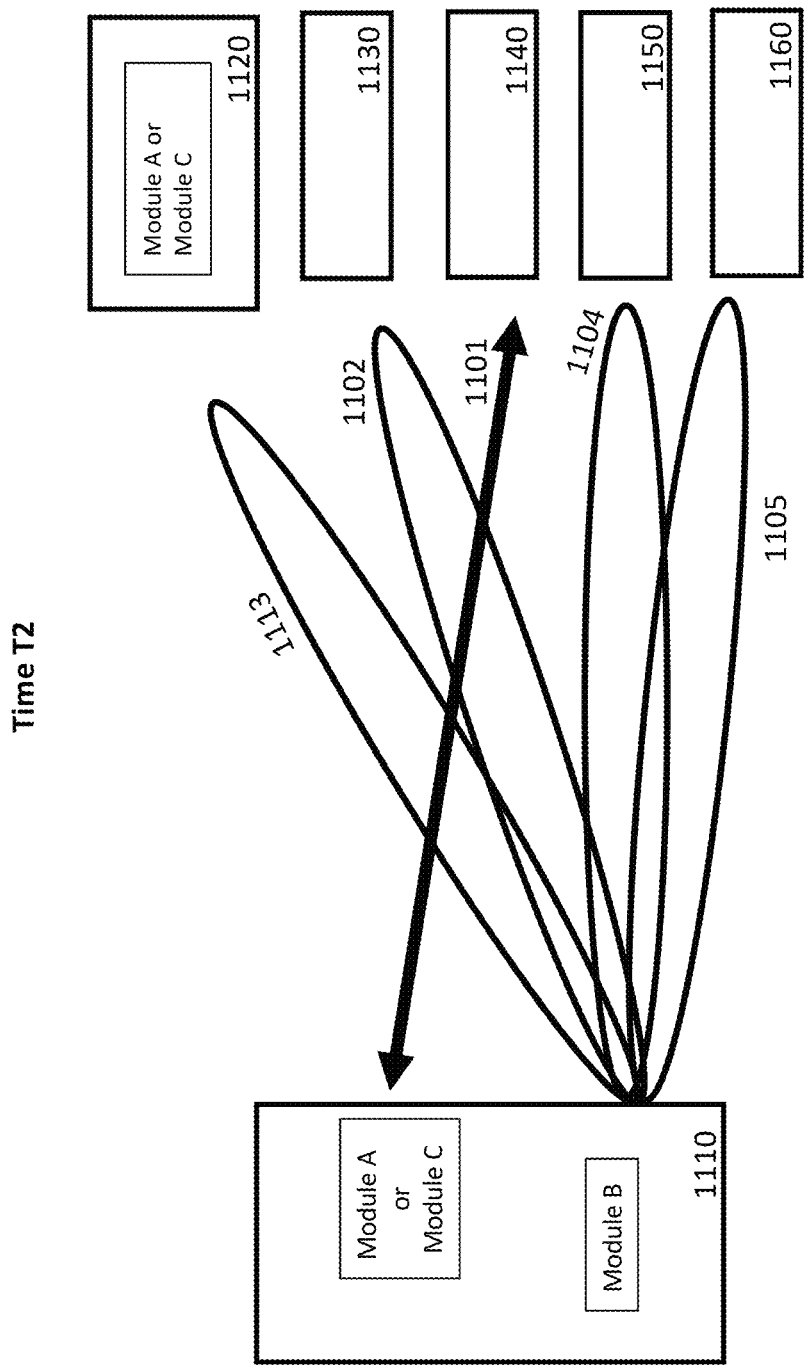
FIG. 11B depicts an example wireless communication node at another given time that can dynamically change type of links between wireless communication nodes, in accordance with various aspects of this disclosure.

Referring to FIG. 11B, at a different time T2, due to some trigger, Module A/Module C of wireless communication node 1110 may dynamically switch its wireless link from wireless communication node 1120 to wireless communication node 1140 by steering the beam towards wireless communication node 1140. At the same time or after receiving instructions from a higher layer, Module B of wireless communication node 1110 disconnects its link with wireless communication node 1140 via beam 1103 and generates a new beam 1113 in the direction of wireless communication node 1120 and establishes connection with wireless communication node 1120. Trigger for this beam steering can be due to changes in the link condition between wireless communication node 1110 and wireless communication node 1120 or 1140, which may involve various factors, including but not limited to change from a LOS path to a non-LOS path due to a change in environment, increased interference, a change in position of wireless communication node 1120 or 1140 with respect to wireless communication node 1110, instructions from higher layers, etc.

As shown in FIGS. 11A-B, dynamic link switching may occur between wireless communication nodes 1110, 1120 and 1140. However, it should be understood that dynamic switching can also occur between different communication nodes.

In some instances, one or more wireless communication nodes may leave the communication network. In such case, links between nodes may be dropped and the communication network may dynamically re-align itself by adjusting/switching link types between the remaining number of wireless communication nodes in the communication network to best suit the needs to the wireless communication nodes and the communication network.

In some embodiments, wireless communication nodes 1120, 1130, 1140, 1150 and 1160 can host multiple modules of the same or different types. For example, one or more of wireless communication nodes 1120, 1130, 1140, 1150 and 1160 can host one Module A and one Module B. Hence, when wireless communication node 1110 makes a ptp link using its Module A or Module C with a first communication module (e.g., Module A or C) of wireless communication nodes 1120, 1130, 1140, 1150 and 1160, then a second communication module (e.g., Module B) of wireless communication nodes 1120, 1130, 1140, 1150 and 1160 can simultaneously create ptmp wireless communication links with other modules of wireless communication nodes in the mesh network that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module B) of wireless communication nodes 1120, 1130, 1140, 1150 and 1160 can simultaneously create ptmp wireless communication links with other modules of wireless communication nodes in the mesh network that are not shown here.

As another example, one or more of wireless communication nodes 1120, 1130, 1140, 1150 and 1160 can host two Module As or Module Cs. Hence, when wireless communication node 1110 makes a ptp link using its Module A or Module C with the first Module A or C of wireless communication nodes 1120, 1130, 1140, 1150 and 1160, then the second Module A or Module C of wireless communication nodes 1120, 1130, 1140, 1150 and 1160 can simultaneously create ptp wireless communication links with other modules of wireless communication nodes in the mesh network that are not shown here. Similarly, when wireless communication node 1110 makes a ptmp links using its Module B with the first communication modules (Module A or C) of wireless communication nodes 1120, 1130, 1140, 1150 and 1160, then the second Module A or C of wireless communication nodes 1120, 1130, 1140, 1150 and 1160 can simultaneously create ptmp wireless communication links with other modules of wireless communication nodes in the mesh network that are not shown here.

As yet another example, wireless communication nodes 1120, 1130, 1140, 1150 and 1160 can host multiple Module As or Module Cs and a Module B. For instance, one or more of wireless communication nodes 1120, 1130, 1140, 1150 and 1160 can host two Module As or Module Cs and one Module B. Hence, when wireless communication node 1110 makes a ptp link using its Module A or Module C with a first Module A or C of wireless communication nodes 1120, 1130, 1140, 1150 and 1160, then a second Module A or Module C of wireless communication nodes 1120, 1130, 1140, 1150 and 1160 can simultaneously create ptp wireless communication links with a third communication module (e.g., Module B) of wireless communication nodes 1120, 1130, 1140, 1150 and 1160 can simultaneously create ptmp wireless communication links with other modules of wireless communication nodes in the mesh network that are not shown here. Similarly, when wireless communication node 1110 makes a ptmp link using its Module B with the first communication module (e.g., Module A or C) of wireless communication nodes 1120, 1130, 1140, 1150 and 1160, then the second communication module (e.g., Module A or C) of wireless communication nodes 1120, 1130, 1140, 1150 and 1160 can simultaneously create ptp wireless communication links with other modules of wireless communication nodes in the mesh network that are not shown here and a third communication module (e.g., Module B) of wireless communication nodes 1120, 1130, 1140, 1150 and 1160 can simultaneously create ptmp wireless communication links with other modules of wireless communication nodes in the mesh network that are not shown here.

It is to be noted that wireless communication links established by Module A or Module C have high reliability due to interference immunity either due to extremely narrow beams or due to transmission of data over ultra-high bandwidth. These features make these links more suitable to carry control information and data for multiple users of a wireless communication mesh network. Hence links established by Module A or Module C can act as a wireless backhaul for a mesh network while links established with Module B can provide access to individual users of a communication network.

In one embodiment, an entire wireless mesh can be composed of ptp links where both links providing backhaul and access have interference immunity. Although such links are more expensive due to the requirement of separate modules to establish individual links, such links are suitable when certain high service quality or reliability is required to be ensured for all customers of the network.

Figure 12:
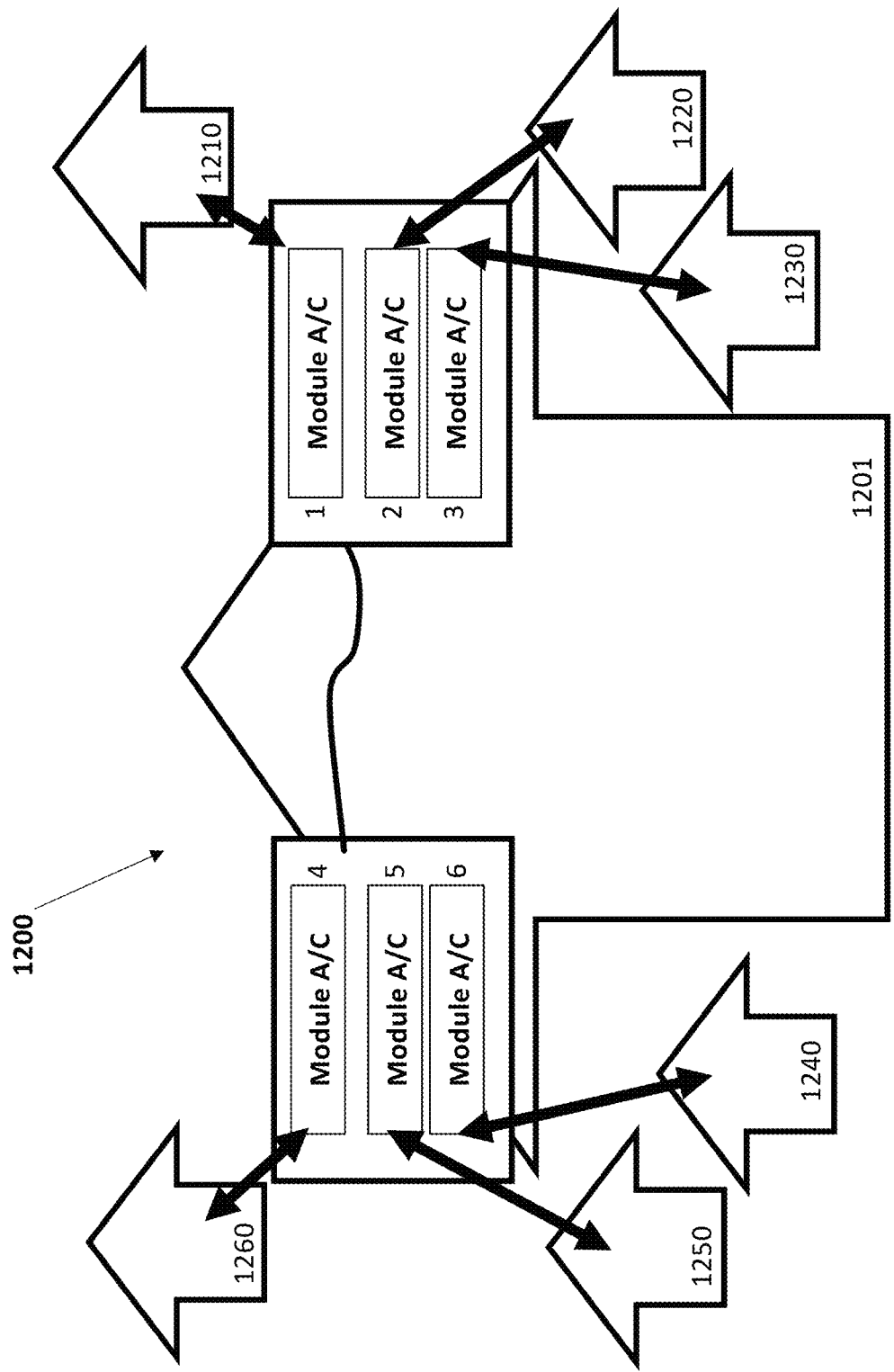
FIG. 12 depicts an example location of a communication network that can be a seed or an anchor home, in accordance with various aspects of this disclosure.

For example, FIG. 12 shows a location 1200 of a communication network that can be a seed or an anchor home. Location 1200 hosts a wireless communication node 1201 that contains a total of 6 communication modules that belong to either Module A or Module C. Hence wireless communication node 1201 is capable of establishing six ptp links. As shown, wireless communication node 1201 uses a $1^{st}$ and $4^{th}$ Module A/Module C to establish connections with location 1210 and location 1260 that serve as backhaul links, while wireless communication node 1201 uses a $2^{nd}$, $3^{rd}$, $5^{th}$ and $6^{th}$ Module A/Module C to establish ptp links with location 1220, 1230, 1250 and 1240 to provide access links. In this respect, links between locations 1200 and 1220, locations 1200 and 1230, locations 1200 and 1240, and locations 1200 and 1250 only carry data for individual users, whereas links between locations 1200 and 1260 and locations 1200 and 1210 carry signaling and data for all the locations including 1200, 1210, 1220, 1230, 1240, 1250 and 1260.

In another embodiment, an entire wireless mesh can be composed of combination of ptp links and ptmp links where ptp links act as backhaul links and ptmp links act as access links to individual users. Although such wireless mesh networks due to presence of ptmp links provide interference immunity to all the users of the communication network, such wireless mesh networks are less expensive due to the non-requirement of separate modules to establish individual links.

Figure 13:
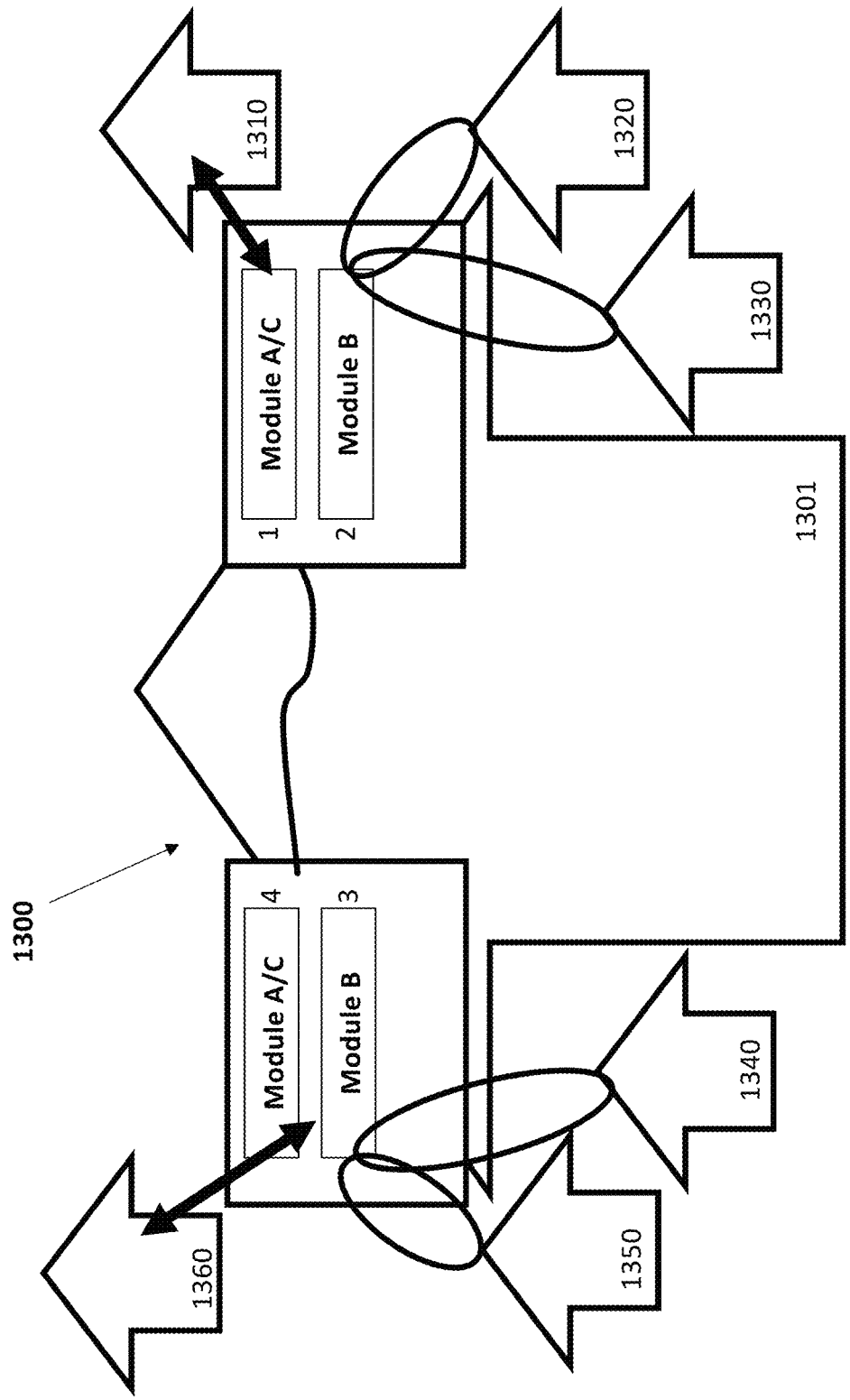
FIG. 13 depicts another example location of a communication network that can be a seed or an anchor home, in accordance with various aspects of this disclosure.

For example, FIG. 13 shows a location 1300 of a communication network that can be a seed or an anchor home. Location 1300 hosts a wireless communication node 1301 that contains a total of 4 communication modules that belong to either Module A/Module C or Module B. Hence this wireless communication node is capable of establishing two ptp links and two ptmp links. As shown, wireless communication node 1301 uses a $1^{st}$ and $4^{th}$ Module A/Module C to establish connections with location 1310 and location 1360 that serve as backhaul links, while wireless communication node 1301 uses a $2^{nd}$ Module B to establish ptmp links with locations 1320, 1330 and uses a $3^{rd}$ Module B to establish ptmp links with locations 1350 and 1340 to provide access links. In other words, links between locations 1300 and 1320, locations 1300 and 1330, locations 1300 and 1340 and locations 1300 and 1350 only carry data for individual users, whereas links between locations 1300 and 1360 and locations 1300 and 1310 carry signaling and data for all the locations including 1300, 1310, 1320, 1330, 1340, 1350 and 1360.

Figure 14:
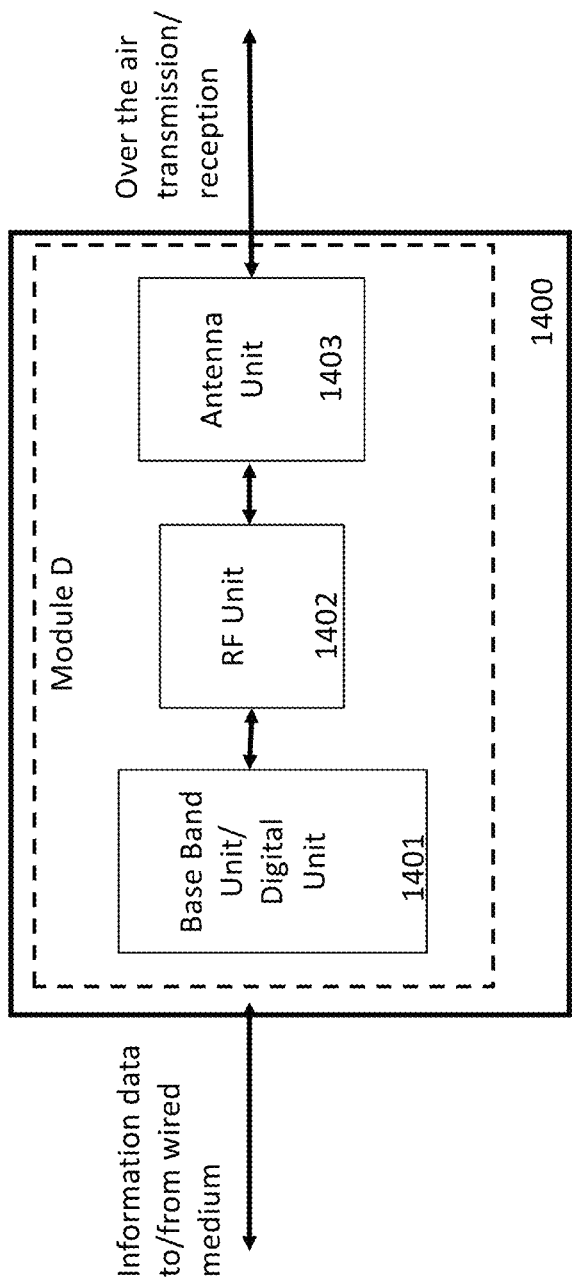
FIG. 14 depicts another example wireless communication node comprising a module, in accordance with various aspects of this disclosure.

Referring to FIG. 14, another possible embodiment of wireless communication node 131 of FIG. 1 is shown as wireless communication node 1400. Wireless communication node 1400 comprises a single module labeled as "Module D." Module D comprises base band unit or digital unit 1401 which runs the physical layer level protocol including digital modulation/demodulation (modem) and other higher layer protocols such as MAC layer, etc. Base band unit 1401 interacts with other nodes of the communication network that are external to the wireless communication node 1400 via wired medium.

Module D also includes RF unit 1402, which among other things processes intermediate frequency (IF) signals and defines the frequency range of the radio signals that can be transmitted or received with the Module D. RF unit 1402 is capable of operating over a wide range of frequencies (e.g., 5 Ghz band frequencies ranging from 5 Ghz to 6 Ghz).

Further, as shown, Module D also comprises antenna unit 1403 which performs the transmission and reception of over the air radio signals. Antenna unit 1403 is capable of transmitting and receiving extremely narrow beam of signals. Antenna unit 1403 may be constructed with either 1-dimensional or 2-dimensional antenna element arrays that have excellent properties of controlling the directionality of radio signals using beam forming and can propagate even in a non-line of sight environment. Module D with the help of antenna unit 1403 is capable of establishing ptmp links with a tower capable of performing massive MIMO (multiple input multiple output) beams. In one embodiment, Module D can be designed and manufactured at least in part using ASIC (Application specific integrated circuit) and an integrated RF unit called RFIC.

Figure 15:
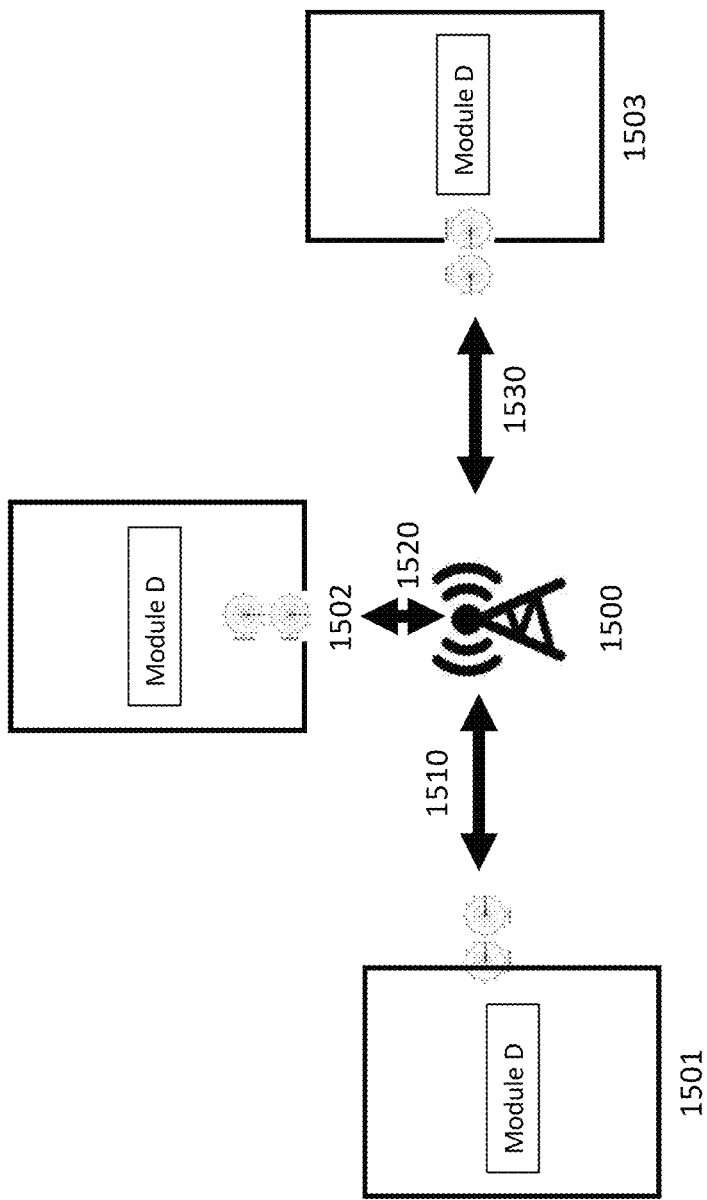
FIG. 15 depicts an example of multiple modules connected to a tower, in accordance with various aspects of this disclosure.

Referring to FIG. 15, an example of multiple Module Ds connected to a tower 1500 is shown. Specifically, wireless communication node 1501 hosting a Module D described above is connected to tower 1500 via massive MIMO beam link 1510 that can be both line-of-sight and non-line-of-sight, wireless communication node 1502 hosting a Module D described above is connected to tower 1500 via massive MIMO beam link 1520 that can be both line-of-sight and non-line-of-sight, and wireless communication node 1503 hosting a Module D described above is connected to tower 1500 via massive MIMO beam link 1530 that can be both line-of-sight and non-line-of-sight. The tower 1500 is equipped with a Massive MIMO module that can create multiple bi-directional narrow beam links simultaneously in all directions with 360 degrees of coverage area. In one embodiment, tower 1500 can operate in the 5 Ghz band including frequencies ranging from 5000 Mhz to 6000 Mhz. In other embodiments, tower 1500 and associated wireless communication nodes 1501, 1502 and 1503 can operate within a different frequency band.

It should be understood that while FIG. 15 shows only one tower and three wireless communication nodes hosting Module D in the network, a given network can have multiple towers similar to tower 1500 and these towers can each be connected to a large number of wireless communication nodes hosting various other modules.

In accordance with the present disclosure, the route that a particular packet takes from a source to a destination may be dynamically selected based on factors including but not limited to link quality, loading, latency etc. For example, referring to FIG. 16, communication system 1600 is shown that is similar to communication system 100 and has all the components described in the context of FIG. 1. Additionally, system 1600 of FIG. 16 includes a tower 1610 which is similar to tower 1500 described in the context of FIG. 15. In contrast to communication system 100 in FIG. 1, wireless communication nodes 131, 132, 133, 134 and 135 host an additional Module D besides Module A/Module B or Module C that enables these wireless communication nodes to optionally establish bi-directional links with features described in the context of FIGS. 14-15 with tower 1610 using massive MIMO beamforming capabilities. Such links labeled as 1601, 1602, 1603, 1604 and 1605 can work in both line-of-sight and non-line of sight environment and can provide alternate communication path to wireless communication nodes 131, 132, 133, 134 and 135 in an event where ptp or ptmp links that connect one wireless communication node to a peer wireless communication node to form a mesh network fails or experience performance degradation due to various reasons including but not limited to change on the line-of-sight profile of millimeter wave link between two wireless communication nodes.

Figure 16:
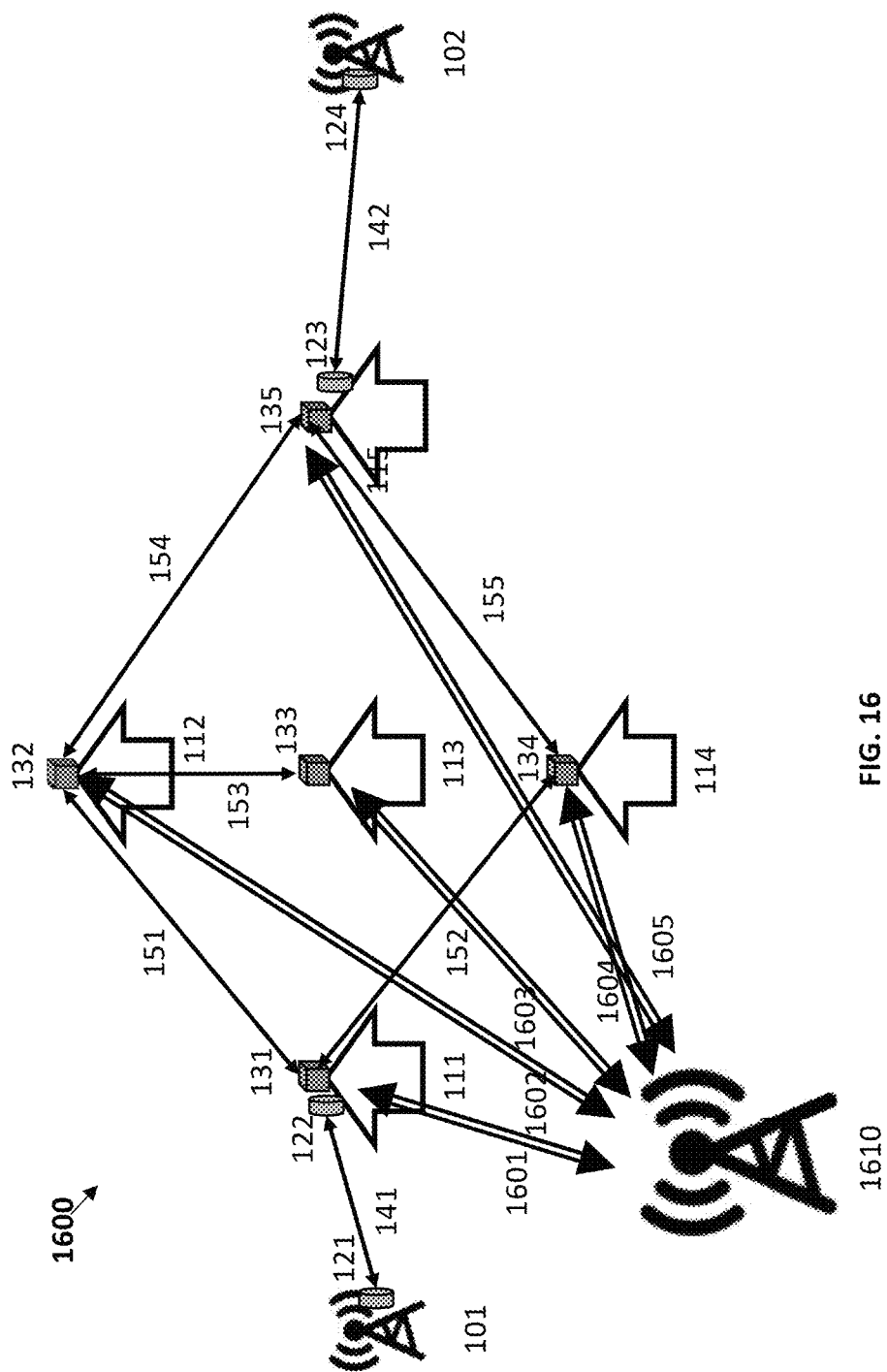
FIG. 16 depicts another example diagram relating to a wireless networking and communication system, in accordance with various aspects of this disclosure.

In FIG. 16, only one tower (i.e., tower 1610) capable of massive MIMO ptmp communication is shown to be connected to five wireless communication nodes 131-135. However, it should be understood that a communication system can also have more than one tower, each connected to multiple different wireless communication nodes hosting various other modules.

In areas within tower 1500's (and other towers of same type) coverage area, a given communication network can initially start in a ptmp manner, where tower 1500 (and other towers of same type) provides access to individual customers using sub 6 Ghz massive MIMO point-multipoint beams. Later, nodes in the given communication network can opportunistically connect with other nodes using regular modules (e.g., Module A/Module B/Module C) in the presence of line-of-sight. This way, the given communication network may evolve into a mesh network with ptp and ptmp connection between nodes in addition to each communication node having a path directly (non-line-of-sight) to tower 1500 (and other towers of same type) that fall within the coverage area.

One of ordinary skill in the art will appreciate that a route a given packet takes from a source to a destination in this network may be optimized by considering various factors including latency, congestion, reliability etc. One of ordinary skill in the art will also appreciate that a given communication network can later add seed homes (e.g., seed homes 111 and 115 in FIG. 1) along with tower/fiber access points 101 and 102 to provide alternate backhaul as per need basis.

In another embodiment, instead of providing massive MIMO ptmp networking capability using a terrestrial tower, ptmp massive MIMO capability to networks wireless communication nodes can also be provided by a satellite for example a low earth orbit (LEO) satellite. For example, referring to FIG. 17, communication system 1700 is shown that is similar to communication system 100 and has all the components described in the context of FIG. 1. Additionally, system 1700 of FIG. 17 includes a satellite 1710 which is capable of massive MIMO transmission and reception on frequencies including but not limited to 5-6 Ghz, similar to tower 1500 described in the context of FIG. 15. In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1710 using massive MIMO beamforming capabilities. Such links labelled as 1701, 1702, 1703, 1704 and 1705 can provide alternate communication path to wireless communication nodes 131, 132, 133, 134 and 135 in an event where ptp or ptmp links that connect one wireless communication node to a peer wireless communication node to form a mesh network fails or experience performance degradation due to various reasons including but not limited to change on the line-of-sight profile of millimeter wave link between two wireless communication nodes.

Figure 17:
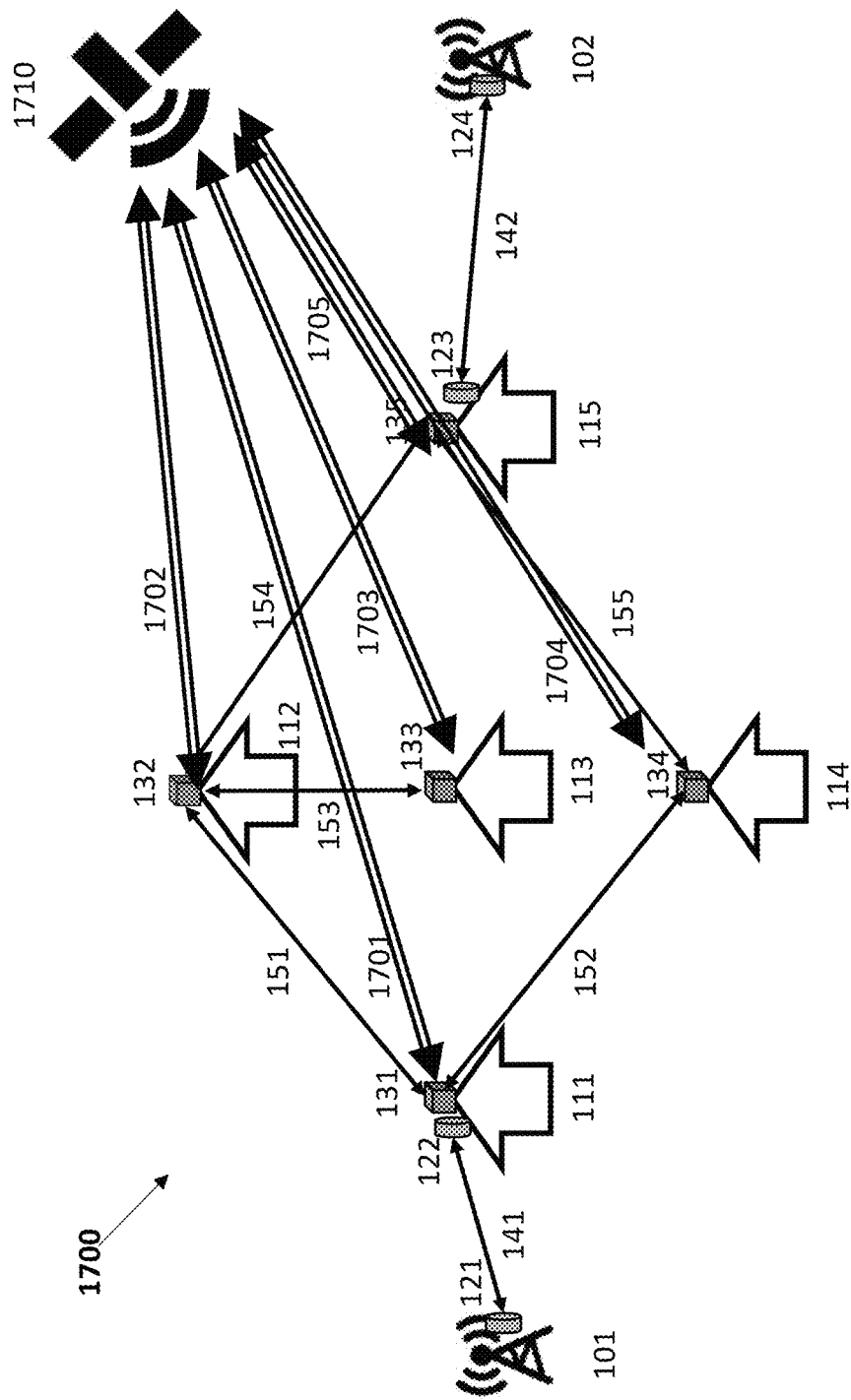
FIG. 17 depicts yet another example diagram relating to a wireless networking and communication system, in accordance with various aspects of this disclosure.

In FIG. 17, only one satellite 1710 capable of massive MIMO ptmp communication is shown to be connected to five wireless communication nodes 131-135. However, it should be understood that a communication system can also have more than one satellite, each connected to multiple different wireless communication nodes hosting various other modules.

In another embodiment, some of the wireless communication nodes that provide backhaul functionality can be equipped with multiple communication modules that enable these wireless communication nodes to provide transport backhaul data between an end user and a network using multiple different types of communication links. For example, referring to FIG. 18, communication system 1800 is shown that is similar to communication system 100 and has all the components described in the context of FIG. 1. Additionally, system 1800 of FIG. 18 includes a satellite 1810 which is capable of massive MIMO transmission and reception on frequencies including but not limited to 5-6 Ghz, similar to tower 1500 described in the context of FIG. 15. System 1800 also includes a massive MIMO cable tower 1820 which is also similar to tower 1500 described in the context of FIG. 15.

Figure 18:
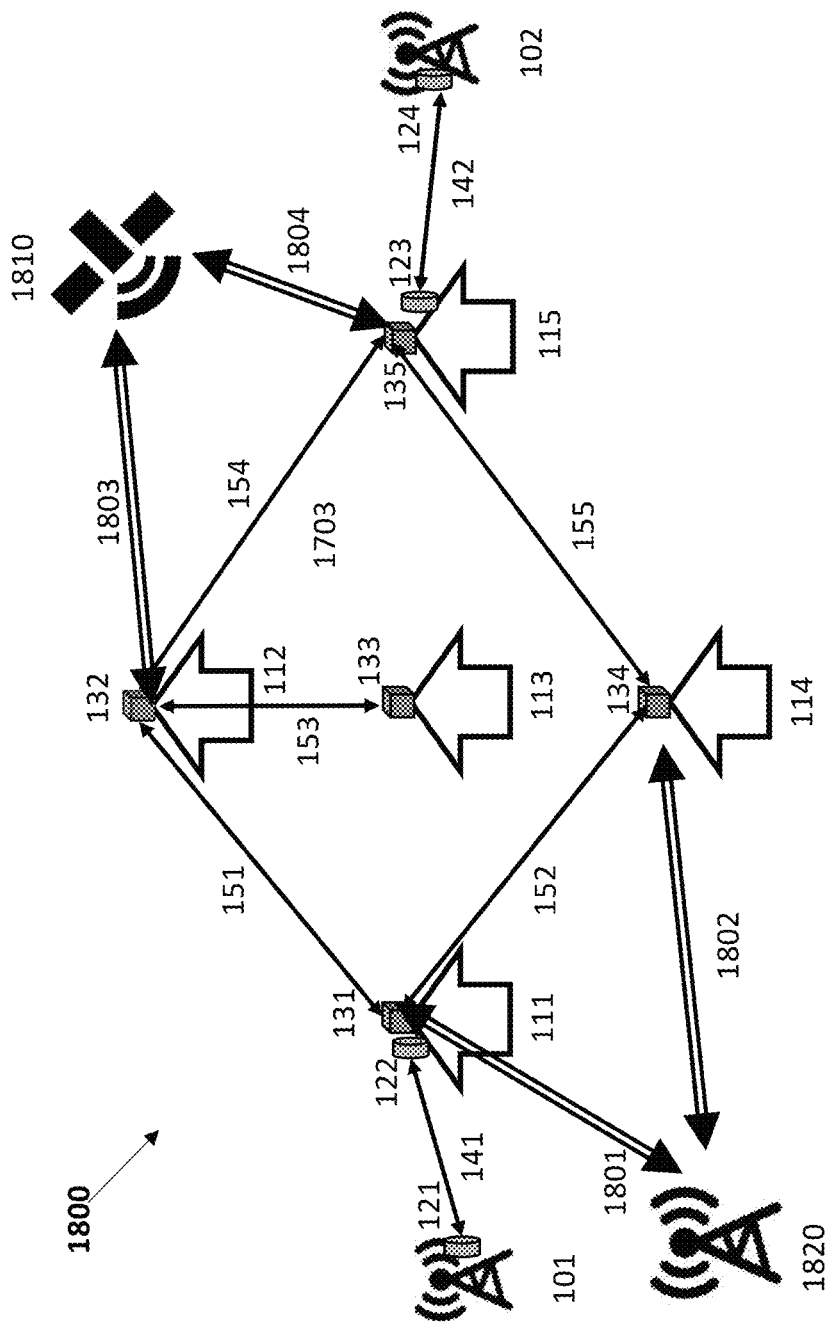
FIG. 18 depicts still another example diagram relating to a wireless networking and communication system, in accordance with various aspects of this disclosure.

In contrast to communication system 100 in FIG. 1, wireless communication nodes 131, 132, 133, 134 and 135 host an additional Module D (besides Module A/Module B or Module C) that enables these wireless communication nodes to optionally establish bi-directional links with features described in the context of FIGS. 14-15 with satellite 1810 and tower 1820 using massive MIMO beamforming capabilities. Such links labeled as 1801, 1802, 1803 and 1804 can provide an alternate communication path to wireless communication nodes 131, 132, 133, 134 and 135 in an event where ptp or ptmp links that connect one wireless communication node to a peer wireless communication node to form a mesh network fails or experience performance degradation due to various reasons, including but not limited to change in the line-of-sight profile of a millimeter wave link between two wireless communication nodes. Specifically, satellite 1810 in FIG. 18 is connected to seed home 115 using wireless communication node 135 via link 1804 and to anchor home 112 using wireless communication node 132 via link 1803. Seed home 115 thus has multiple options to route backhaul traffic to the network.

In one embodiment, seed home 115 using wireless communication node 135 at a given time can pick a satellite link 1804 to transport backhaul data, and based on some trigger at a different time, instruct wireless communication module 135 to switch links for backhaul data transmission from 1804 to a ptp or ptmp millimeter wave (e.g., E-band) based link coupled to tower/fiber access point 102. Such trigger may include latency, bandwidth, packet loss requirements, etc. of a particular application.

FIG. 18 also shows an end user home 113 where wireless communication node 133 transports the data using anchor home 112's wireless communication node 132. Wireless communication node 132 is shown to have multiple options to transport end user data of home 113, including direct satellite link connection using 1803, in-direct satellite link connection using 1804 via anchor node 135, or though point to point/point-multi-point connections using millimeter wave through towers 101 or 102 via seed homes 111 and 115 respectively, among other options.

In one embodiment, wireless communication node 132 can dynamically switch its connection link to route data to and from end user home 113. For example, due to some trigger similar to the triggers described above, wireless communication node 132 can dynamically switch from satellite link 1803 to satellite link 1804 via wireless communication node 135 to transport data to and from end user home 113.

It should be understood that links 1803 and 1804 can be part of same massive MIMO beam or links 1803 and 1804 can be part of different massive MIMO beams. It should also be understood that satellite links 1802 and 1804 can use the same frequency range of communications or can operate in different frequency ranges. Further, while FIG. 18 shows only one satellite (i.e., satellite 1810) capable of massive MIMO ptmp communication that is connected to two wireless communication nodes 132 and 135, it should be understood that a communication system can also have more than one satellite, each connected to multiple different wireless communication nodes hosting various other modules.

As further shown in FIG. 18, tower 1820 is connected to seed home 111 using wireless communication node 135 via link 1804 and to anchor home 112 using wireless communication node 131 via link 1801 and to anchor home 114 using wireless communication node 134 via link 1802. This provides anchor home 114 with options to route packets to the network in multiple ways including (a) through ptp or ptmp millimeter wave-based links 152 or 155, and (b) via direct massive MIMO based link to tower 1820 via link 1802.

Similarly, seed home 111 has multiple options to route backhaul traffic to the network. In one embodiment, seed home 111 using wireless communication node 131 at a given time can pick a satellite link 1801 to transport backhaul data and based on some trigger at a different time, instruct wireless communication module 131 to switch links for backhaul data transmission from 1801 to a ptp or ptmp millimeter wave (e.g., E-band) based link coupled to tower/fiber access point 101. Such trigger may include latency, bandwidth, packet loss requirements, etc. of a particular application.

In FIG. 18, only one tower (i.e., tower 1820) capable of massive MIMO ptmp communication is shown to be connected to two wireless communication nodes 131 and 134. However, it should be understood that a communication system can also have a different number of massive MIMO towers, each connected to multiple different wireless communication nodes hosting various other modules.

In another embodiment, one or more wireless communication nodes described above and discussed with respect to FIGS. 1-18 may additionally be an edge computing node by hosting a processor (separate or shared), memory, digital contents, software, and storage, among other components for computing, and other required operations for edge computing, in addition to the high speed low latency networking capability that has already been described above. This enables a given communication system to provide cloud services in a distributed manner closer to an end user as wireless communication nodes are distributed across the network and provide an interface between the network and an end-user. This memory unit can store a copy of local digital contents and can additionally store portions of digital content that that are not local. The non-local digital contents among other things can include digital content belonging to other nodes. This provides content redundancy in a communication system. Hence, when an end user of a communication system requests for digital content, then this edge computing mechanism allows a request to be fulfilled in a variety of different ways, including a request processed by a local node and/or remote node based on various criteria including but not limited to latency, network congestion, etc. of the application making the request.

In another embodiment, one or more wireless communication nodes described above and discussed with respect to FIGS. 1-18 can additionally be a blockchain node by hosting a computer comprising at least one processor, memory, digital content, software, etc., which is connected to a blockchain network comprising a client that is capable of storing, validating and/or relaying transactions in addition to the high-speed low latency networking capability that has already been described above. This enables the communication system and its nodes described in this disclosure and discussed in the context of FIGS. 1-18 to provide an ideal platform for blockchain databases, enterprise blockchain databases, permissioned/private blockchains, hybrid and other similar types of databases given that (1) file/data/record storage space is inherently distributed as wireless communication nodes are distributed across the geographical coverage area and (2) low latency communication between the nodes and across the network due to high speed wireless links enable improved latency and improves the transaction throughput of the blockchain based databases.

In another preferred embodiment, one or more wireless communication nodes can additionally act as blockchain-based distributed data storage node by adding dedicated or shared storage capacity capability to these nodes. One key advantage of implementing blockchain-based distributed data storage on a given communication system and the wireless communication nodes described in this disclosure is that storage nodes are inherently distributed, and due to the low latency and high bandwidth of the wireless communication links between the wireless communication node described above and the proximity of the storage location nodes to an end-user, accessing the data content can be faster compared to other approaches.

In accordance with the present disclosure, the wireless mesh network node equipment (ptp link modules, ptmp link modules, multiple ptp link modules, combination of multiple ptp and ptmp links, antennas for cellular small cells/CPEs and mmWave equipment, cable, mounts, power supply boxes, etc.) that gets deployed and installed on a rooftop of a private infrastructure such as a single-family home can be consumer financed. For instance, in case of a customer meeting a certain credit score threshold (or any other credit checking criteria), the equipment required to add a millimeter wave mesh node at the customer's premises (i.e., to add the customer to the wireless mesh network) and provide high speed internet service may be financed by a bank on the behalf of the customer, and the customer may agree with the financing bank to re-pay the amount financed by the bank over a certain time period by making periodic (e.g. monthly) payments based on the terms and conditions of the agreement. This way, the customer becomes owner of the equipment (a wireless mesh network node) once the full financed amount is made to the financing bank. This customer can in one embodiment lease back the wireless mesh network node equipment installed on its property to the wireless mesh network operator that installed the wireless mesh network equipment on its property and provide high speed internet data service. In another embodiment, this customer can lease back the wireless mesh network node equipment installed on its property to the wireless mesh network operator that installed the wireless mesh network equipment on its property and provide high speed internet data service for a certain term (e.g., 18 months, 24 months, 36 months, etc.).

In some instances, this customer may be required to lease back the equipment to only that operator which originally installed the equipment at the customer location and provided high speed internet data services. In other instances, this customer can lease back the equipment to any wireless internet network operator. In another instance, lease back of the equipment to an operator other than the operator which originally installed the network equipment at the customer location may only occur with the permission of the wireless internet network operator that originally installed that equipment at customer location. In yet another instance, such lease back to a different wireless internet network operator may only occur after expiration of the lease term with the original wireless internet network operator.

For a wireless internet network operator building and operating a wireless mesh network, the type of customer financing-based network deployment described above becomes a crowd sourcing or crowdfunding-based infrastructure roll out mechanism, where instead of one or few large entities, CAPEX is sourced from a pool of individuals who in some instances are the customers of the wireless mesh network operator. Such customers can get high speed internet data service from the wireless mesh network operator (operating using ptp/ptmp modules, other communication nodes and equipment and various variations discussed earlier in this disclosure) at a subsidized/discounted rate. In certain cases, such customers may get two separate bills periodically, one for the high-speed internet data service and other for the equipment financing from bank. In another case, customers can get a single consolidated bill from a wireless mesh operator.

In some instances, all customers of a wireless mesh operator can be based on consumer financing explained above in a neighborhood or market where wireless mesh operator offers its high-speed internet data service. In other instances, wireless mesh network's customers in a market or neighborhood can be financed through a variety of different ways including operator financing where wireless mesh operator pays for the equipment of the wireless mesh node, financed through bundling with a private utility or service that has a relatively smaller market size (e.g. home security/automation, solar energy, etc.) compared to market size of the high speed internet where a bundled service is offered and wireless mesh operator uses the marketing/sales commission received from the private utility or service provider to fund the wireless mesh node equipment, financed through the revenue generated from running blockchain platform based services on the wireless mesh network nodes along with the consumer/customer based financing that is explained earlier in the disclosure.

Further, in accordance with the present disclosure, the communications equipment including various types of ptp/ptmp modules, cellular small cell, etc. that were described above can be used to establish multiple ptp and/or point-to-multiple links where both network nodes of a wireless link, one from where a link originates and the second from where a link terminates (in general, nodes can switch roles dynamically between link originator and link terminator based on the direction of data flow), are located at the different customer locations and providing high speed internet service to the dwellers of the property where wireless mesh network node is deployed and installed. In some cases, one of the two nodes of the link can be at a location where the deployed equipment provides high speed internet service to the dwellers of the property at that location. In other instances, both nodes of the link may be at a location where the deployed equipment does not provide high speed internet service to the dwellers of the property at that location.

It should be understood that the length of the communication links of a wireless mesh network describe above may vary. For instance, the length of the communication links of a wireless mesh network established with the help of the various communication modules and equipment described above may be less than 300 meters on average. Alternatively, the length of the communication links of a wireless mesh network can be greater than 300 meters on average as well.

In accordance with the present disclosure, further disclosed herein are communication modules that employ direct RF (microwave/millimeter wave)-to-optical and direct Optical-to-RF (microwave/millimeter wave) conversion. In one example implementation, the high-speed photo detectors can be used that directly translate an optical signal into a microwave signal. One of ordinary skill in the art will appreciate that other approaches can be used for direct optical-to-RF conversion. Similarly, a dipole antenna directly coupled to a plasmonic modulator allows direct conversion from the RF to the optical world. One of ordinary skill in the art will appreciate that different approaches can be used for direct conversion of RF signals to optical signals. This direct optical-to-RF and direct RF-to-Optical conversion modules eliminate the need of the use of analog to digital and digital to analog (ADC/DAC) modules that are required by traditional modem implementations. These mixed signal components (i.e., ADC/DAC) consume high amount of power and also increase the cost as each antenna is required to be connected to a separate ADC/DAC module.

Figure 19:
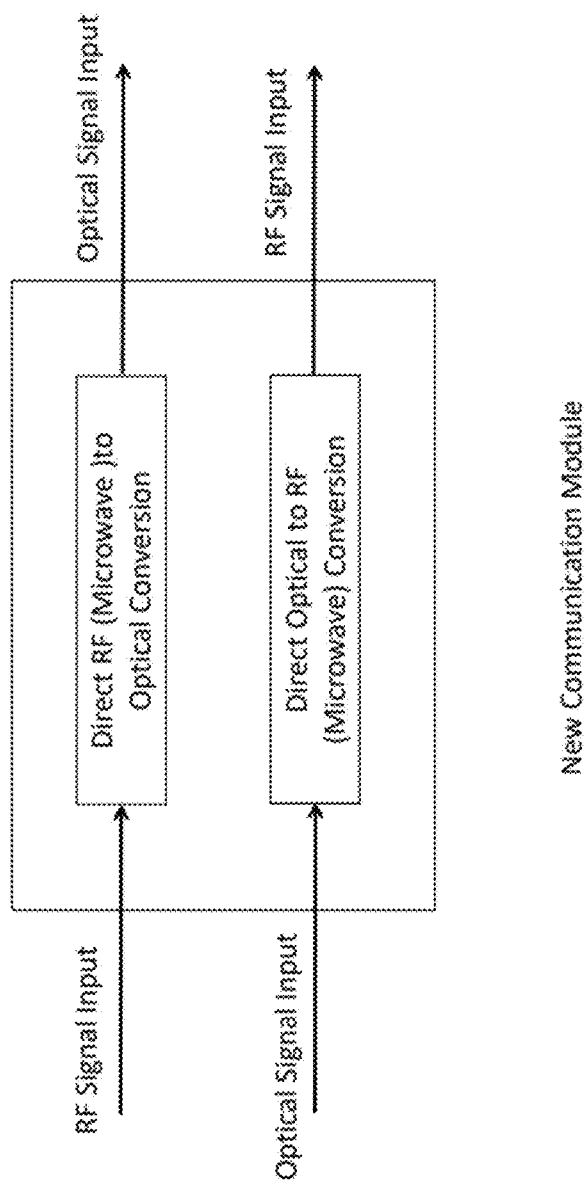
FIG. 19 depicts an example communication module based on direct RF-to-Optical and direct Optical-to-RF conversion, in accordance with various aspects of this disclosure.

FIG. 19 shows a communication module based on direct RF-to-Optical and direct Optical-to-RF conversion. Communication module of FIG. 19 contains a single direct RF-to-Optical sub-module and a single Optical-to-RF sub-module. However, communication module of FIG. 19 can host any integer number of direct RF-to-Optical sub-modules greater than or equal to zero and any integer number of direct Optical-to-RF sub-modules greater than or equal to zero. In one example embodiment, this direct RF-to-Optical and direct Optical-to-RF conversion technology can be implemented is an integrated Circuit (IC) or chip.

Figure 20:
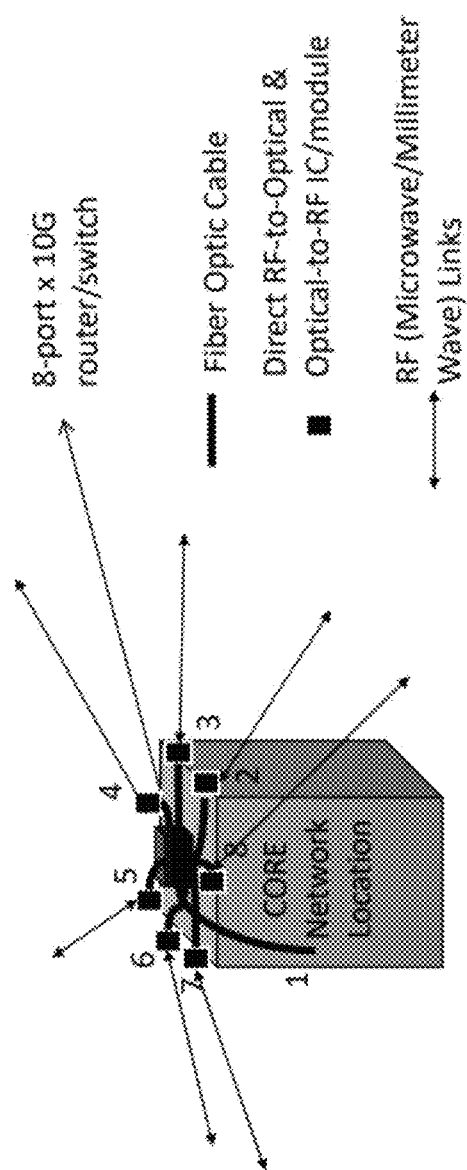
FIG. 20 depicts an example router/switch, in accordance with various aspects of this disclosure.

Based on the above explanation with respect to the example communication module of FIG. 19, in an example embodiment, the core of the wireless mesh network can be a wireline optical or wired router/switch where each port is mapped, either through a direct connection or over optical/wired line, to an individual direct conversion Optical-to-RF or RF-to-Optical chip that then focuses, on both receiver and transmitter side, all RF energy into a high gain narrow beam that can be both fixed or steerable. In one example embodiment, a standard 8-port×10G router/switch could be used, with one port being used as a data drop to local building/site and the other 7 ports being connected over a fiber optic cable to various Optical-to-RF or RF-to-Optical end points that are located at multiple distributed locations external (and/or internal) on/in the building/site as shown in FIG. 20. One of ordinary skill in the art will understand that the router/switch can have a different number of ports as well.

These multiple distributed locations can be determined in advance based on the use of connection potentiality optimization algorithms, where the algorithm understands the relationship between end point placement and potentially connection partners. Also, the individual ptp beams can be dynamically steered among potential ptp connection partners to facilitate path optimization algorithms and/or to respond to network congestion and/or network element failures. In one embodiment, these Optical-to-RF or RF-to-Optical end points that establish ptp/ptmp beams can be placed below a roofs eaves and in other embodiments, these end points can be placed above a roof's eaves. In some other embodiments, some of the Optical-to-RF or RF-to-Optical end points can be placed below a roof's eaves and some can be placed above a roofs eaves and actual placement may depend upon the line-of-sight profile of the location/site.

It should be understood that the example communication module discussed in the context of FIGS. 19-20 can be implemented in other communication modules that were discussed in the context of FIGS. 1-18. For instance, the modules discussed in the context of FIGS. 1-18 can have direct RF-to-Optical and direct Optical-to-RF technology embedded such that the narrow beam, extremely narrow beam, and/or ptp/ptmp/multiple ptp links can be established without the need for ADC/DAC mixed signal circuitry that consumes a high amount of power and requires to be connected individually with each antenna.

In accordance with the present disclosure, a modified version of the communication nodes discussed earlier for building a wireless mesh network will now be discussed. In one embodiment, a communication node can be a flexible millimeter wave radio equipment capable of establishing multiple ptp and/or ptmp links operating over millimeter wave frequencies and can comprise 3 different sub-modules: (1) digital/network module, (2) ptp radio module, and (3) ptmp radio module. A digital/network module is responsible for interfacing the above millimeter wave radio box (communication node) with a backhaul or fiber network. Specifically, it provides switching capability to direct traffic between the ptp or ptmp radio modules of the millimeter wave radio box (communication node) and the fiber or backhaul network. The connectivity between a single or multiple ptp and/or ptmp radio modules of the millimeter wave radio box and the backhaul or fiber network can be based over a variety of interfaces including but not limited to PCI/PCI express bus interface and ethernet.

In one embodiment, PCI/PCIe can be used when a ptp or ptmp radio that needs to be connected is enclosed in the same box with a digital/network module and separation between the digital/network module and the ptp module is limited to few inches such as 3-6 inches or less.

In one embodiment, a digital/network module provides connectivity to a single ptp or ptmp module over a single PCI/PCIe bus interface. In a different embodiment, a digital/network module provides connectivity to 3 ptp or 3 ptmp or a combination of 3 ptp/ptmp modules over three separate PCI/PCIe bus interfaces. In another embodiment, a digital/network module provides connectivity to N ptp or N ptmp or a combination of N ptp/ptmp modules over N separate PCI/PCIe bus interfaces, where N is a positive integer number greater than zero.

An ethernet interface such as an RJ45 port with multi-gigabit support, including but not limited to 1 Gb, 2.5 Gb, 5 Gb, 10 Gb, etc., can be used to connect ptp or ptmp radio modules with a digital/network module. In one embodiment, an ethernet interface can be used when the ptp or ptmp radio that needs to be connected is not enclosed in the same box with a digital/network module and separation between digital/network module and the ptp module is greater than 3-6 inches. In some embodiments, the length can be 10 meters or more.

In one embodiment, a digital/network module provides capability of connecting up to 4 ptp/ptmp radios or up to 3 ptp/ptmp radio and a small cell over 4 ethernet interfaces. In a different embodiment, a digital/network module provides capability of connecting up to N ptp/ptmp radios or up to N-1 ptp/ptmp radio and a small cell over N ethernet interfaces, where N is a positive integer number greater than zero. Digital/network module also contains SFP/SFP+ interface or any other interface to connect digital/network module with fiber/backhaul network.

The ptmp radio module of the communication node discussed above is responsible for establishing ptmp millimeter wave based bi-directional links to connect to peer millimeter wave radios in the network. ptmp radio module comprises a baseband sub-module and RF module. Baseband module handles the baseband processing and among other aspects is responsible for baseband processing related to beamforming. RF module contains phased antenna array that works in conjunction with baseband module to generate ptmp millimeter wave beams.

The ptp radio module of the communication node described above is responsible for establishing ptp millimeter wave based bi-directional links to connect to a peer millimeter wave radio in the network. The ptp radio module comprises a baseband sub-module, RF module and beam narrowing module. The baseband module handles the baseband processing and, among other aspects, is responsible for baseband processing related to beamforming. RF module contains phased antenna array that works in conjunction with baseband module to generate ptp millimeter wave beam. A beam narrowing module is responsible for narrowing the beam by focusing most of the radiated signal energy in the desired direction and lowering the antenna side lobes to minimize the interference in a mesh network.

In one embodiment, the beam narrowing module can be a lens antenna integrated with an RF module. In another embodiment, the beam narrowing module can be a parabolic antenna integrated with an RF module. In yet another embodiment, the beam narrowing module could be a module other than a lens or parabolic antenna and rely on a different approach to narrow the beam originating from a phased array based RF module.

Figure 21:
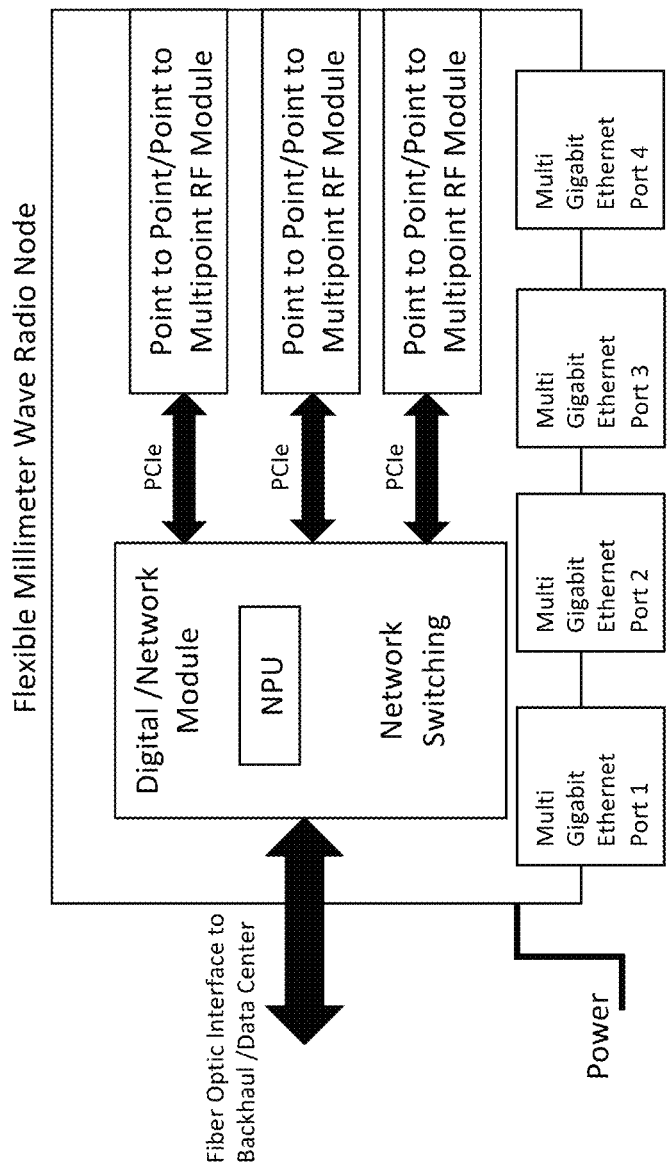
FIG. 21 depicts an example block diagram of a communication module, in accordance with various aspects of this disclosure.

Referring to FIG. 21, a logical block diagram of the communication module described above is shown. As explained earlier, a flexible millimeter wave radio node contains within an enclosure (typically outdoor) a digital/network module that has a network processing unit and is configured to provide network switch operations between the fiber optic backhaul interface and the ptp or ptmp radio modules either connected via PCI/PCIe interface or via multi gigabit ethernet ports. A flexible millimeter wave radio module also contains within the enclosure 3 ptp or ptmp radios. For providing mesh network deployment flexibility, a node can also be connected to external ptp/ptmp radios via ethernet ports. A node can be solar powered or can be powered via electric power outlet of the home where the node is installed. FIG. 21 also shows that this flexible millimeter wave radio node may only need a single network processing unit (NPU) that controls all the ptp or ptmp RF modules either connected via a PCI/PCIe interface or via a multi gigabit ethernet interface. Hence this example flexible millimeter wave radio node removes the need for using a dedicated NPU for each ptp/ptmp RF module.

Figure 22:
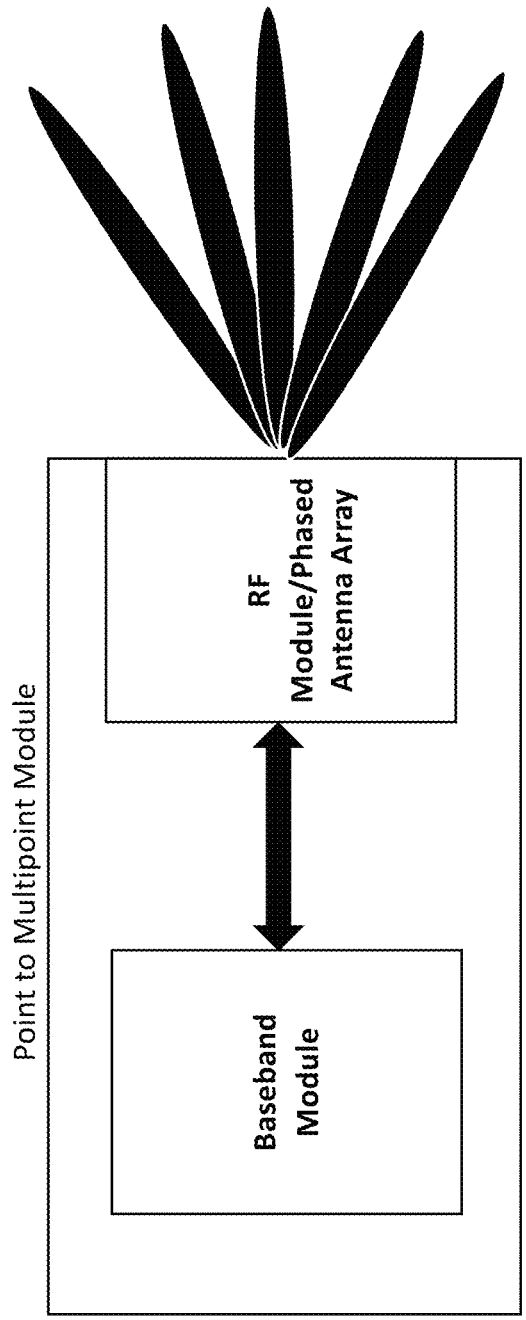
FIG. 22 depicts an example block diagram of a ptmp radio module of a communication node, in accordance with various aspects of this disclosure.

FIG. 22 shows a block diagram of a ptmp radio module of the communication node described above. As shown, this radio module contains a baseband module and a RF module that has the phased antenna array for providing beamforming capability.

Figure 23:
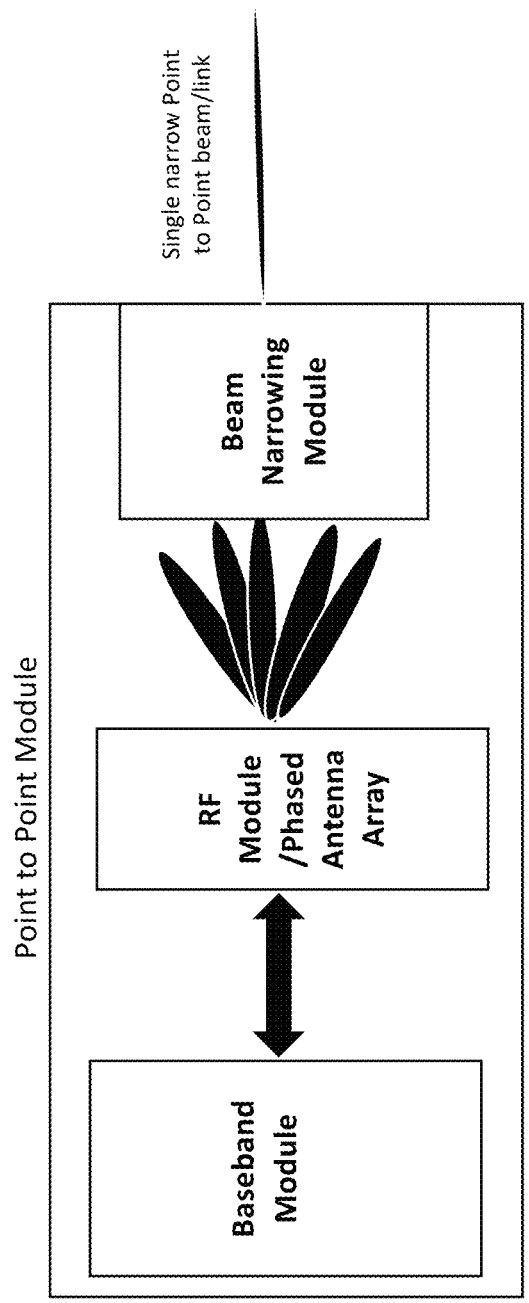
FIG. 23 depicts an example block diagram of a ptp radio module of a communication node, in accordance with various aspects of this disclosure.

FIG. 23 shows a block diagram of the ptp radio module of the communication node discussed above. This radio module contains a baseband module, an RF module that has the phased antenna array for providing beamforming capability, along with a beam narrowing module. The beam narrowing module, based on various techniques discussed earlier, narrows the beam generated by the phased antenna array of the RF module.

Figure 24:
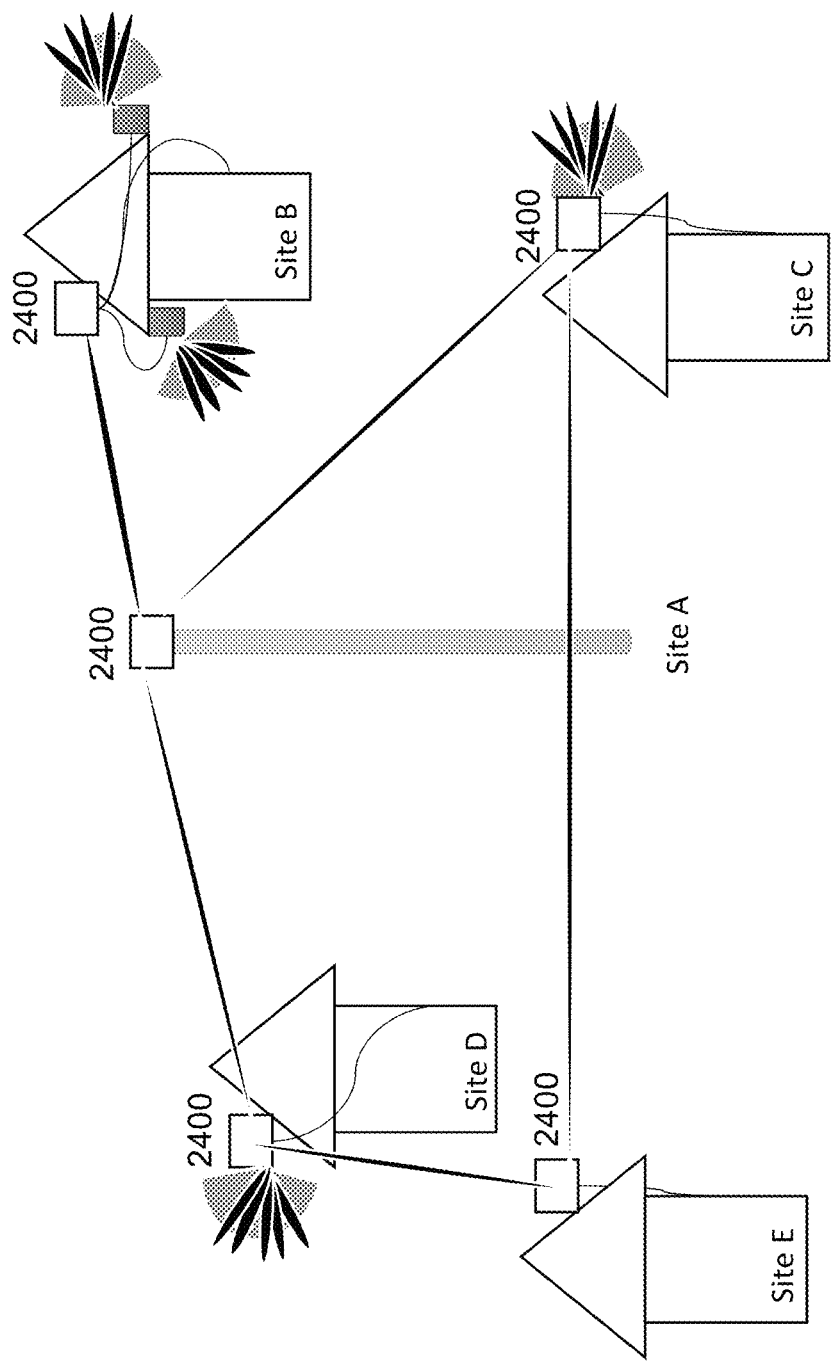
FIG. 24 depicts an example mesh network comprising a plurality of communication nodes, in accordance with various aspects of this disclosure.

Referring to FIG. 24, various different use cases of the communication node described above and explained in the context of FIGS. 21-23 is shown. FIG. 24 shows a mesh network comprising 5 communication nodes 2400. Communication nodes 2400 may each be a flexible millimeter wave communication node that has been discussed earlier.

At "Site A" of the mesh network, a communication node 3700 may be solar powered and mounted on the pole. This node 2400 at Site A may have 3 ptp links generated by 3 ptp radio modules integrated with the digital/network module. At "Site B," a communication node 2400 may be powered with an electric power outlet of the home and may have one ptp link via a single integrated ptp radio module and 2 ptmp links via two ptmp radio modules that are not integrated with a digital/network module but instead connected via ethernet interface to the communication node. Similarly, at "Site C," a communication node 2400 may be powered with an electric power outlet of the home and may have two ptp links via two integrated ptp radio module and one ptmp radio module integrated with a digital/network module. At "Site E," a communication node 2400 may be powered with an electric power outlet of the home and may have two ptp links via two integrated ptp radio module. Further, at "Site D," a communication node 2400 may be powered with an electric power outlet of the home and may have two ptp links via two integrated ptp radio module and one ptmp radio module integrated with the digital/network module.

Referring to FIG. 25A, another use case of the communication node described above is shown. In particular, FIG. 25A shows an example mesh network that includes communication nodes 2400 at the 5 sites previously described with respect to FIG. 24, as well as an additional communication node 2400 at "Site A2." Similar to communication node 2400 at "Site A," communication node 2400 at "Site A2" may be mounted on a pole (among other possibilities).

Based on the preceding disclosure (e.g., the disclosure in connection with FIGS. 5-7, 9-11, 13, and 16-18), one of ordinary skill in the art will appreciate that each communication node 2400 at a given site may have the capability to communicate with multiple other communication nodes at multiple other sites. For instance, communication node 2400 at "Site B" may have the capability to communicate with the respective communication nodes 2400 at both "Site A" and communication node 2400 at "Site A2." Similarly, the respective communication node 2400 at each of "Site C," "Site D," and "Site E" may have the capability to communicate with the respective communication nodes 2400 at both of "Site A" and "Site A2."

Furthermore, based on the preceding disclosure (e.g., the disclosure in connection with FIGS. 5, 11, and 18), one of ordinary skill in the art will appreciate that each communicate node 2400 at a given site (e.g., communication node 2400 at "Site B") may have the capability to dynamically switch its active communication link from a first communication node 2400 at a first site (e.g., communication node 2400 at "Site A") to a second communication node 2400 at a second site (e.g., communication node 2400 at "Site A2") based on some trigger that is similar to the triggers described above (e.g., changes in link condition such as a change from a LOS path to a non-LOS path due to a change in environment, increased interference, instructions from higher layers, latency, bandwidth, and/or packet loss requirements of a particular application, etc.).

For instance, in the scenario shown in FIG. 25A, the respective communication node 2400 at each of "Site B," "Site C," "Site D," and "Site E" may initially be configured to actively communicate with the communication node 2400 at "Site A" (which may function to route backhaul traffic to and/or from such other sites). However, at some later point in time, the communication node 2400 may dynamically switch its active communication link from the communication node 2400 at "Site A" to the communication node 2400 at "Site A2" (which may also function to route backhaul traffic to and/or from such other sites) due to some trigger similar to the triggers described above. Such a scenario is shown in FIG. 25B.

Figure 25:
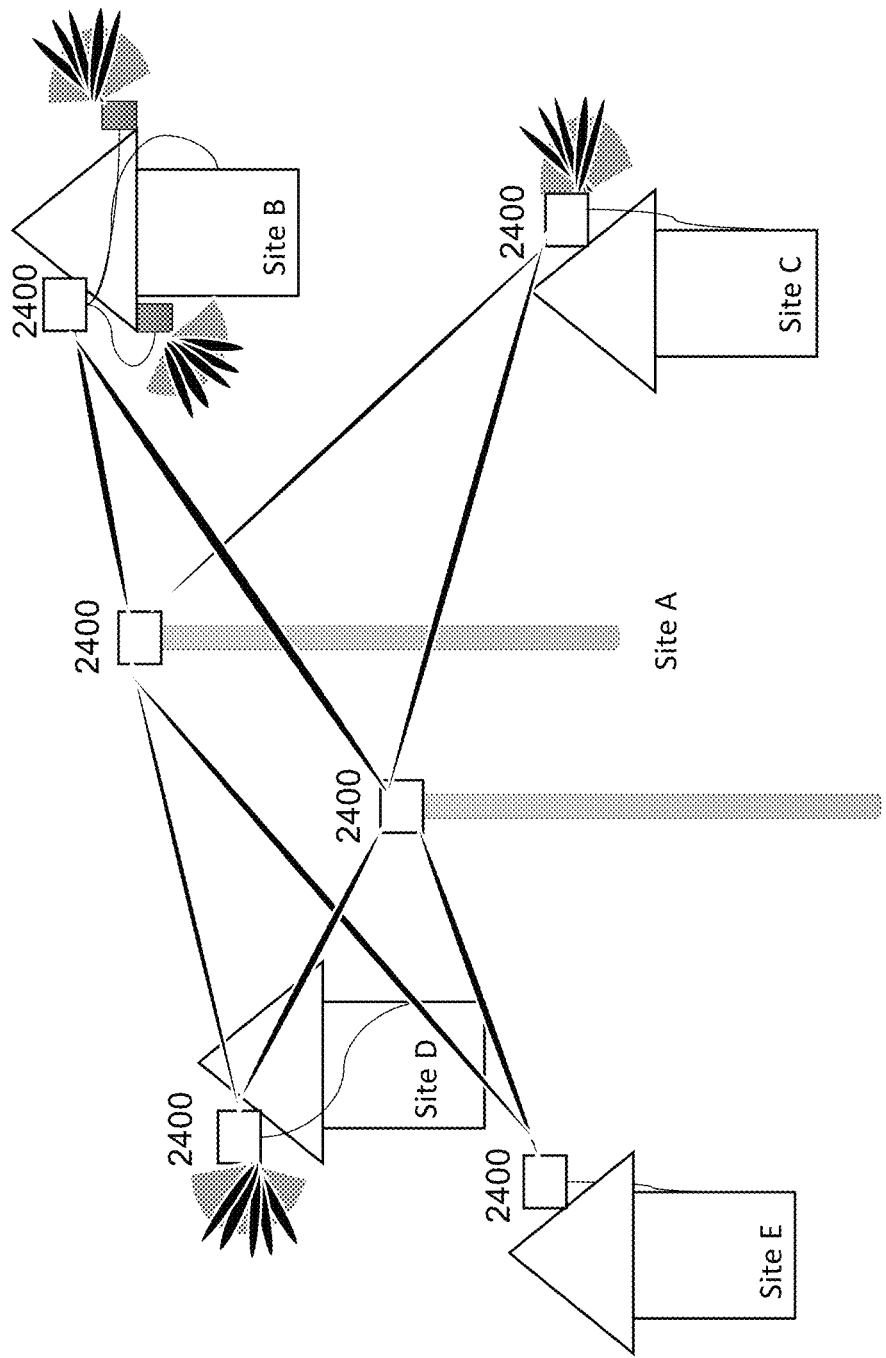
FIG. 25A depicts another example mesh network comprising a plurality of communication nodes, in accordance with various aspects of this disclosure.
FIG. 25B depicts yet another example mesh network comprising a plurality of communication nodes, in accordance with various aspects of this disclosure.
Figure 25B:
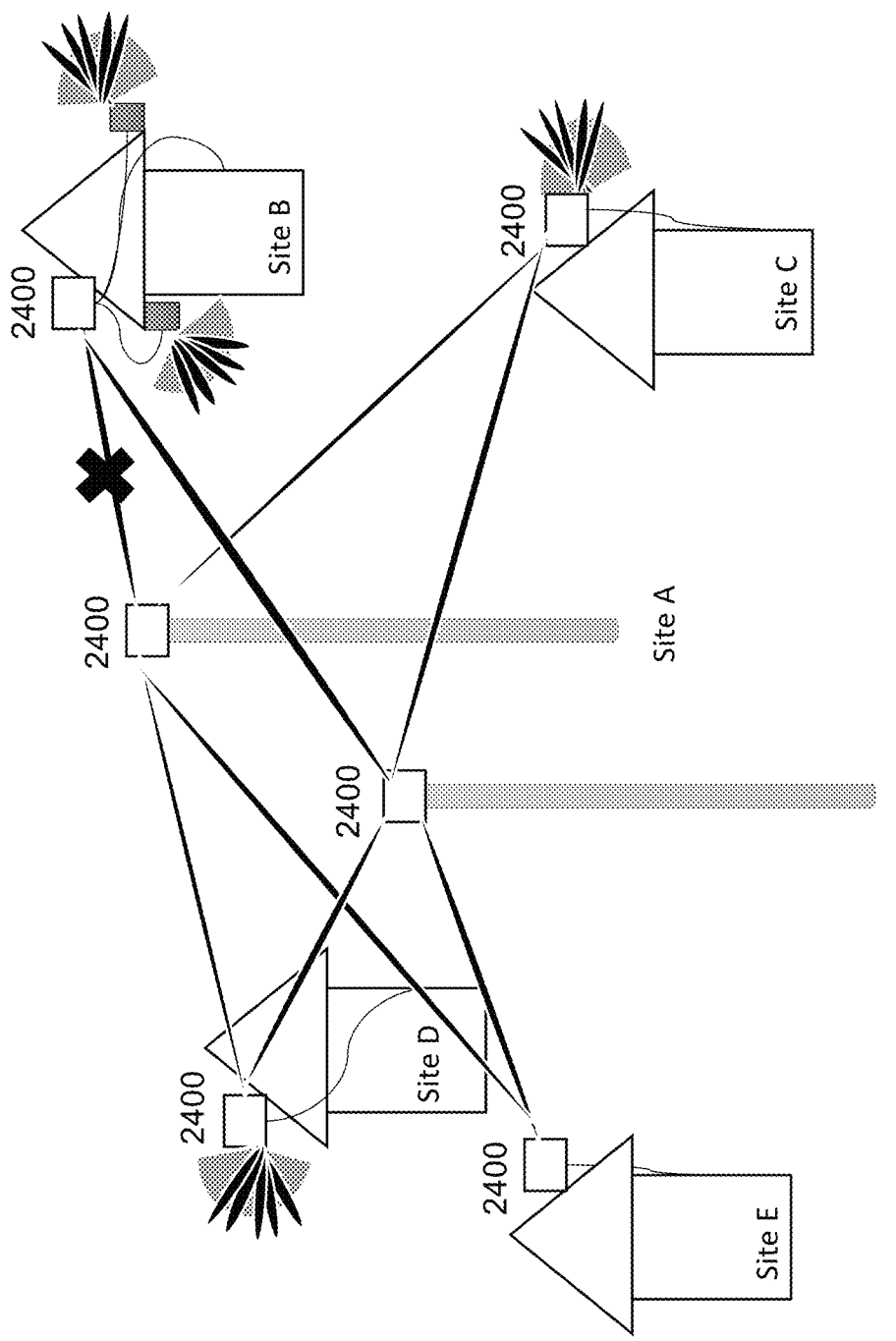

It should be understood that FIGS. 24-25 are described in such a manner for the sake of clarity and explanation and that the example mesh networks described in FIGS. 24-25 may take various other forms as well. For instance, the example mesh networks may include more or less communication nodes, and a given communication node may take various other forms and may be mounted in various other manners and/or mounted on various other objects as well (e.g., mounted on a pedestal). Further, in line with the preceding disclosure, one or more of the communication nodes (e.g., the communication nodes 2400 at "Site A" and "Site A2") may be mounted to an object that is at or near a fiber access point. Further yet, the example mesh networks may have various different configurations of ptp or ptmp modules either integrated or connected via an ethernet interface and powered via various different power options.

Another important aspect of communication node 2400 is that the integrated radio modules can be pluggable. In other words, based on a specific use case, the number and types of radio modules integrated with a digital/network module via PCI/PCIe interface can easily be changed by plugging in the desired number and type of radio modules with full flexibility instead of having one specific configuration.

So far the modified version of communication nodes discussed above and also described in the context of FIGS. 21-25 assumes that the ptp or ptmp modules connected to a digital/network module with an NPU via a high speed interface (e.g., PCI/PCIe/Thunderbolt) are also located inside a same enclosure. It should be understood that the ptp or ptmp modules connected to a digital/network module via high speed interface can also be located outside the digital/network module with the NPU and inside an independent box/enclosure connected via an outdoor cable supporting the PCI/PCIe/Thunderbolt high speed communication protocol to the enclosure of the digital/network module.

Figure 26:
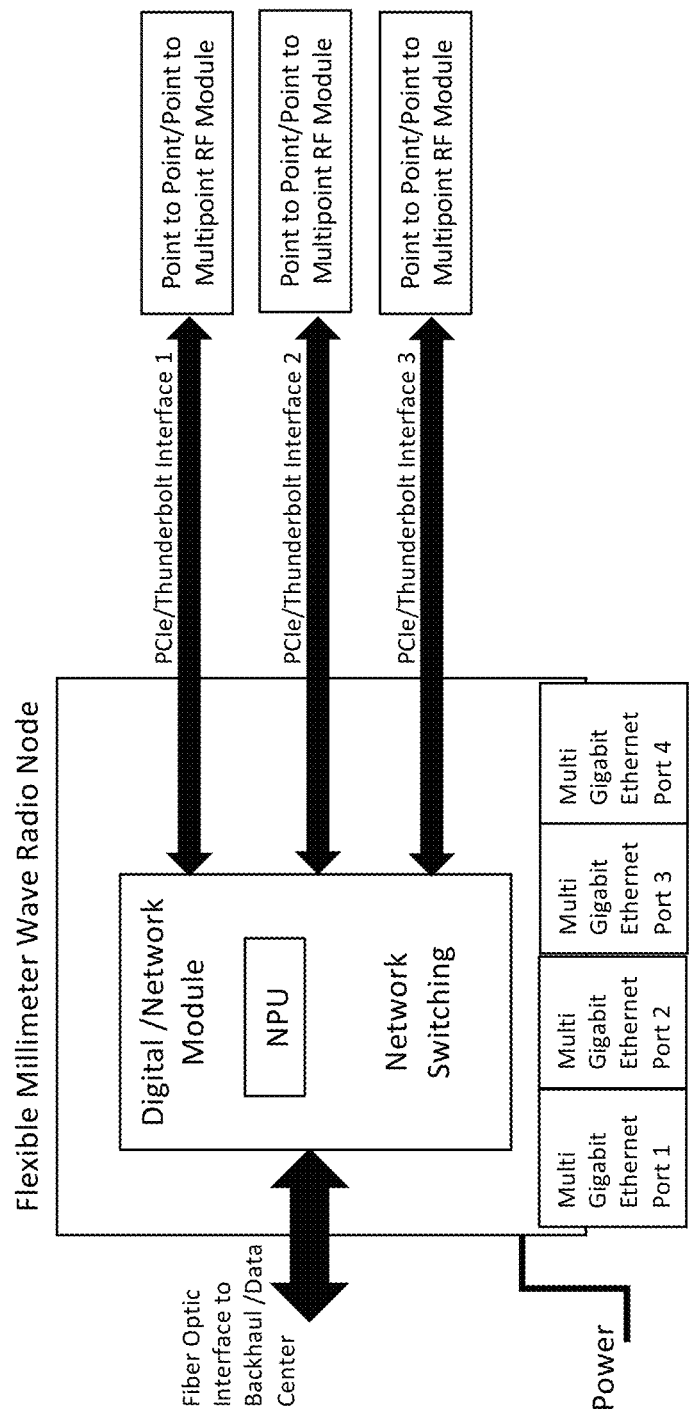
FIG. 26 depicts an example modified version of a flexible millimeter wave radio box, in accordance with various aspects of this disclosure.

As one example, FIG. 26 depicts a modified version of a flexible millimeter wave radio box, where the ptp or ptmp RF modules are located outside a digital/network module with NPU enclosure and inside separate independent box/enclosure and connected via an outdoor wired cable capable of supporting high speed communication interface (e.g., PCI/PCIe/Thunderbolt Interface). As shown, 3 ptp or ptmp modules are connected via PCIe/Thunderbolt interfaces to the digital/network module with the NPU using a compatible outdoor cable.

In general, it should be understood that N number of ptp or ptmp modules in separate independent enclosures can be connected via a PCIe/Thunderbolt compatible outdoor cable, where N is an integer greater than zero. It should also be understood that the length of the outdoor cable compatible with high speed communication protocol, such as PCIe/thunderbolt, depends on the maximum limit defined by the technology. In one embodiment, PCIe/thunderbolt cable can be up to 3 meters. In other embodiments, the length of the outdoor PCI/PCIe/thunderbolt compatible cable can be less than or greater than 3 meters.

In yet another embodiment of the present disclosure, a wireless mesh network may include ultra-high-capacity nodes that are capable of establishing ultra-high-capacity links (e.g., ptp or ptmp bi-directional communication links) using a millimeter wave spectrum, including but not limited to 28 Ghz, 39 Ghz, 37/42 Ghz, 60 Ghz (including V band), or E-band frequencies, as examples. These ultra-high-capacity links may have a larger range as compared to other ptp or ptmp links, including but not limited to ptp or ptmp links of the type discussed above with reference to FIGS. 1-26.

For instance, as one possibility, a ptp or ptmp link of the type discussed above with reference to FIGS. 1-26 may have an average range of up to 100 meters, whereas an ultra-high-capacity link may have a range of more than 100 meters. As another possibility, a ptp or ptmp link of the type discussed above with reference to FIGS. 1-26 may have an average range of up to 500 meters, whereas an ultra-high-capacity link may have a range of more than 500 meters. As yet another possibility, a ptp or ptmp link of the type discussed above with reference to FIGS. 1-26 may have an average range of up to 1000 meters, whereas an ultra-high-capacity link may have a range of more than 1000 meters.

However, in other implementations, it is possible that the length of an ultra-high-capacity link may be similar to the length of a ptp or ptmp links of the type discussed above with reference to FIGS. 1-26, but may nevertheless provide higher capacity such that a fewer number of ultra-high-capacity nodes/links may be used (as compared to the ptp or ptmp nodes/links of the type discussed above with reference to FIGS. 1-26) to build a main high capacity backbone through the mesh (i.e., the ultra-high-capacity nodes/links may be sparser).

The higher capacity and/or extended range of these ultra-high-capacity nodes/links may be achieved via various advanced signal processing techniques, including but not limited to multiple input multiple output (MIMO) such as 2×2 MIMO, 4×4 MIMO, 8×8 MIMO or an even higher order MIMO, use of vertical and horizontal polarization (V & H), higher switch capacity of the digital network module due to higher processing power such as support of 8×25 Gbps port (200 Gbps aggregate traffic flow), higher order modulation including 16QAM, 64QAM, 256QAM, 512 QAM, 1024 QAM, orbital angular momentum (OAM) multiplexing, and/or higher antenna gains, among other possibilities. Further, in some implementations, the higher capacity and/or extended range of these ultra-high-capacity nodes/links can be achieved using a subset of the advanced signal processing techniques mentioned above.

These ultra-high-capacity nodes/links may be used in conjunction with other ptp and/or ptmp links, including but not limited to ptp or ptmp links of the type discussed above with reference to FIGS. 1-26, to design a multi-layer wireless mesh network.

Figure 27:
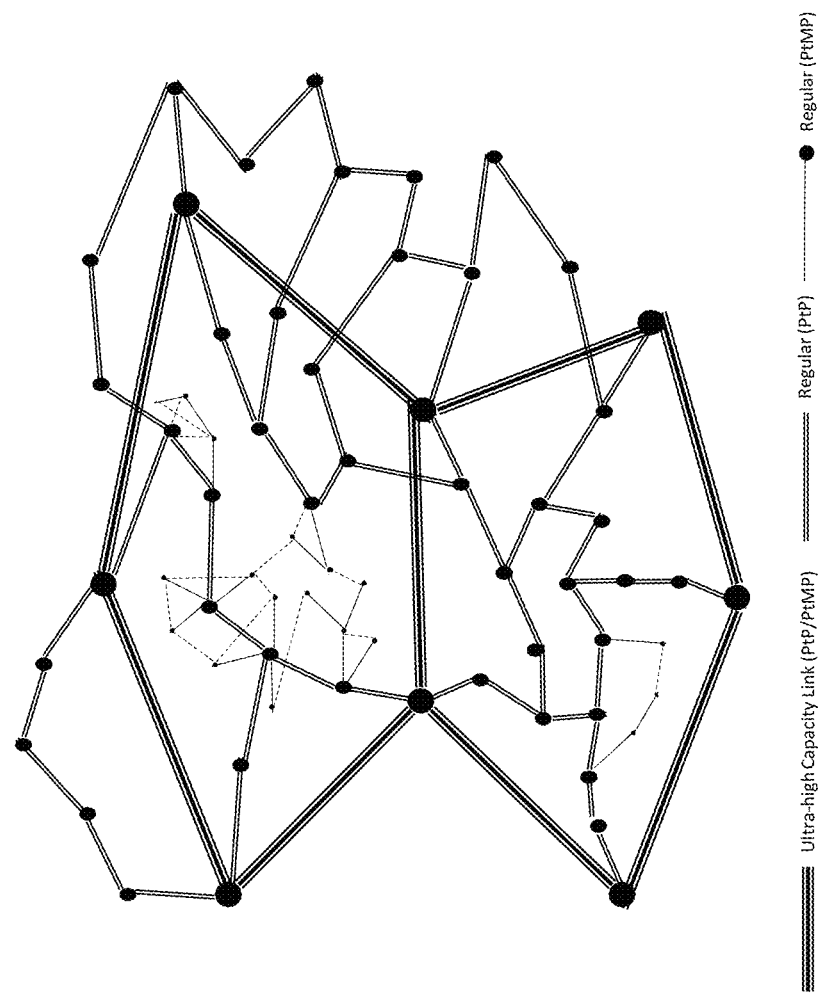
FIG. 27 depicts an example of a multi-layer wireless mesh network, in accordance with various aspects of this disclosure.

To illustrate with an example, FIG. 27 shows one example of a multi-layer wireless mesh network in which triple-compound links represent the ultra-high-capacity links described above, double-compound rings represent ptp links of the type discussed above with reference to FIGS. 1-26, and single-line links represent ptmp links of the type discussed above with reference to FIGS. 1-26.

As shown in FIG. 27, longer ultra-high-capacity links may be used bring a high level of capacity to the wireless mesh network, which can then be delivered to an end user/customer via a shorter ptp or point to multi point link (which may not be ultra-high-capacity). It should also be understood that while the ptmp links may primarily serve to provide flexibility in building the wireless mesh network due to the capability of beam steering and ability to establish multiple links from a single radio, these ptmp links may also be used to indirectly connect two ptp links via multiple ptmp link hops that can add additional reliability to the network.

Further, it should be understood that a multi-layer wireless mesh network such as the one illustrated in FIG. 27 can be deployed in various manners. For instance, in one implementation, different layers of the multi-layer mesh network can be deployed in parallel. In another implementation, different layers of the multi-layer wireless mesh network can be deployed in different phases. For example, a deployment approach for a multi-layer wireless mesh network may involve first building a core network backbone (e.g., an ultra-high-speed network) using ultra-high-capacity nodes/ links and then densifying the network during one or more subsequent phases using other types of ptp or ptmp nodes/ links, including but not limited to ptp or ptmp radio links of the type discussed above with reference to FIGS. 1-26. In another example, a deployment approach for a multi-layer wireless mesh network may involve first building a network of ptp nodes/links that are not ultra-high capacity and then later upgrading capacity by adding ultra-high-capacity nodes/links. A multi-layer wireless mesh network can be deployed in other manners as well.

Figure 28:
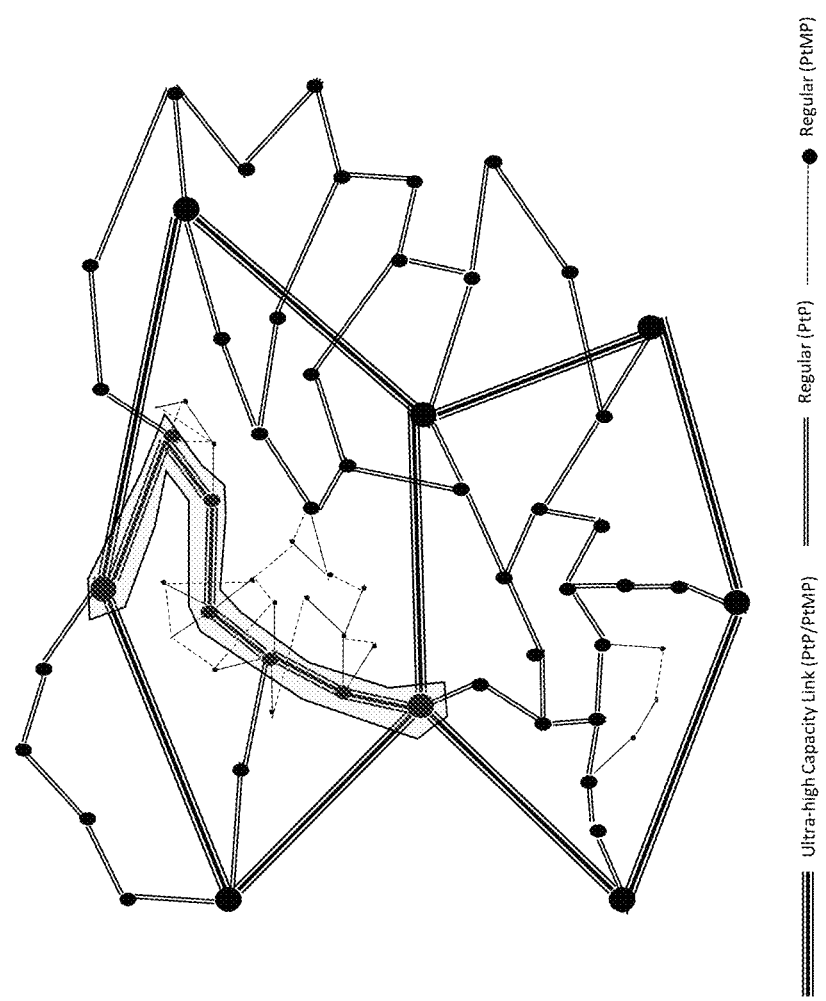
FIG. 28 depicts another example of a multi-layer wireless mesh network, in accordance with various aspects of this disclosure.

One variation of the multi-layer mesh architecture described above is that the ultra-high-capacity links can be designed to create specific paths based on a traffic requirement and/or some other criteria defined by the operator. To illustrate with an example, FIG. 28 shows another example of a multi-layer wireless mesh network in which some of the preexisting, non-ultra-high-capacity ptp links included in the example multi-layer wireless mesh network of FIG. 27 are replaced by ultra-high-capacity links (shown as triple-compound links) to provide ultra-high capacity to specific segments of the wireless mesh network. This can be done either by supplementing the hardware of the preexisting, non-ultra-high-capacity nodes at the customer location with new hardware (e.g., a new radio or other associated hardware) capable of establishing ultra-high-capacity links or by replacing the hardware of the preexisting, non-ultra-high-capacity nodes at the customer location with new hardware (e.g., a new radio or other associated hardware) capable of establishing ultra-high-capacity links.

Another variation of the multi-layer mesh architecture described above is that different layers of the wireless mesh network may be deployed at different heights, which may create physical-link separation by allowing re-use of the available frequency spectrum. For instance, in one implementation, a multi-layer wireless mesh network can have at least 2 layers of ultra-high-capacity links operating in the same frequency range, but at different heights. To illustrate with an example, a first layer of ultra-high-capacity links can be deployed at a lower height, such as by installing the required hardware at a lower height within a structure hosting the wireless mesh hardware (e.g., on a lower floor of a building), and a second layer of the ultra-high-capacity links can be deployed at a higher height, such as by installing the required hardware at a higher height of the structure hosting the wireless mesh hardware (e.g., at higher floor of the building). In this respect, the deployment of these different layers of ultra-high-capacity links at different heights may serve to increase the capacity of the multi-layer wireless mesh network.

While the foregoing example involves the deployment of multiple different layers of ultra-high-capacity links at multiple different heights, it should be understood that this example is merely provided for purposes of illustration, and that multiple layers of wireless mesh links of any type may be deployed at different heights in order to enhance the overall capacity of the multi-layer wireless mesh network, including but not limited to layers of ultra-high-capacity links, non-ultra-high-capacity ptp links, and/or non-ultra-high-capacity ptmp links.

Yet another variation of the multi-layer mesh architecture described above is that the ptmp links that are not ultra-high capacity (which are shown in FIGS. 27 and 28 as single-line links) may be replaced by wired links, such as a coaxial wire loop, fiber loop or some other type of wired link. To illustrate with an example, a multi-layer mesh network may include wired links that comprise the coaxial portion of the HFC (Hybrid Fiber Coax) used by the cable companies, in which case this coaxial portion of the HFC may bring mesh network connectivity to end users while the fiber portion of the HFC may bring the high-speed internet to the neighborhood. In this respect, the wireless mesh links consisting of ultra-high-capacity links (which are shown in FIGS. 27 and 28 as triple-compound links) and/or non-ultra-high-capacity ptp links may play the role of the fiber equivalent portion of the HFC by bring high capacity from a fiber POP to the neighborhood.

As discussed above, depending on the particular type of wireless communication system, it may be preferred or even necessary to have a clear LOS between wireless communication nodes of a wireless communication system to enable transmission and reception of wireless signals. For instance, the wireless communication nodes that are part of a given wireless communication system may communicate along wireless access paths that are highly directional and may function properly only under perfect or near perfect LOS conditions. Any interruption to these wireless access paths may result in loss of communication and/or network failure.

Interruptions to wireless access paths may be caused by various events. Such events may include, as some examples, loss of an intermediary node along the wireless access path, new construction within or surrounding the area of the wireless network, or vegetation growth within or around the area of the wireless network. LOS conditions of a large-scale wireless mesh network in an area of moderate to high vegetation can be adversely impacted, resulting in single or multiple link failures or interruptions, especially during seasons when foliage is dense. In some instances where LOS conditions are adversely impacted, a large number of field technicians may need to be dispatched to fix these LOS issues, which may involve determining which links were impacted, identifying corresponding wireless communication nodes, and re-adjusting and/or re-aligning wireless mesh communication network radios (if such re-aligning is even possible) of the wireless communication nodes to re-establish LOS in order to re-connect the wireless mesh communication nodes to the wireless mesh communication network.

Accordingly, for such wireless communication systems, there is a need for equipment and techniques that enable wireless communication nodes of a wireless communication system to be deployed at their respective deployment sites in a manner that allows wireless links having sufficient LOS conditions to be established and maintained.

To address these and other needs, also disclosed herein are example mounting apparatuses for wireless communication equipment (e.g., one or more wireless communication nodes and their respective components) that is used to facilitate wireless communications within a wireless communication system.

In accordance with the present disclosure, a first type of mounting apparatus for a wireless communication node may be designed to securely affix the wireless communication node to a rooftop of a building (or another comparable mounting location that provides for improved LOS conditions) without requiring any penetration to the rooftop's surface (i.e., the mounting apparatus may be non-penetrating). For example, the first type of mounting apparatus disclosed herein may be able to achieve non-penetrative affixation by using a distributed weight system coupled with one or more support struts. In this way, the first type of mounting apparatus disclosed herein may allow the wireless communication node to be mounted on a rooftop or other comparable mounting location that provides for improved LOS conditions, which may help to reduce interruptions to connections with other wireless communication nodes in a wireless communication system, while also protecting the rooftop's surface from penetrative damage and thereby maintaining the rooftop's structural integrity and avoiding the time, labor, and cost that may be associated with installing a penetrative mount.

In practice, the first type of mounting apparatus disclosed herein could be used to mount a wireless communication node that takes any of various forms, including but not limited to a wireless communication node comprising equipment for establishing one or more ptp wireless links and/or equipment for establishing one or more ptmp wireless links within a wireless communication system, among various other possibilities. Some examples of equipment for establishing ptp and/or ptmp links that may be mounted using the first type of mounting apparatus disclosed herein have been described above. However, it should be understood that the first type of mounting apparatus may be used to mount other types of wireless communication equipment as well.

Figure 29:
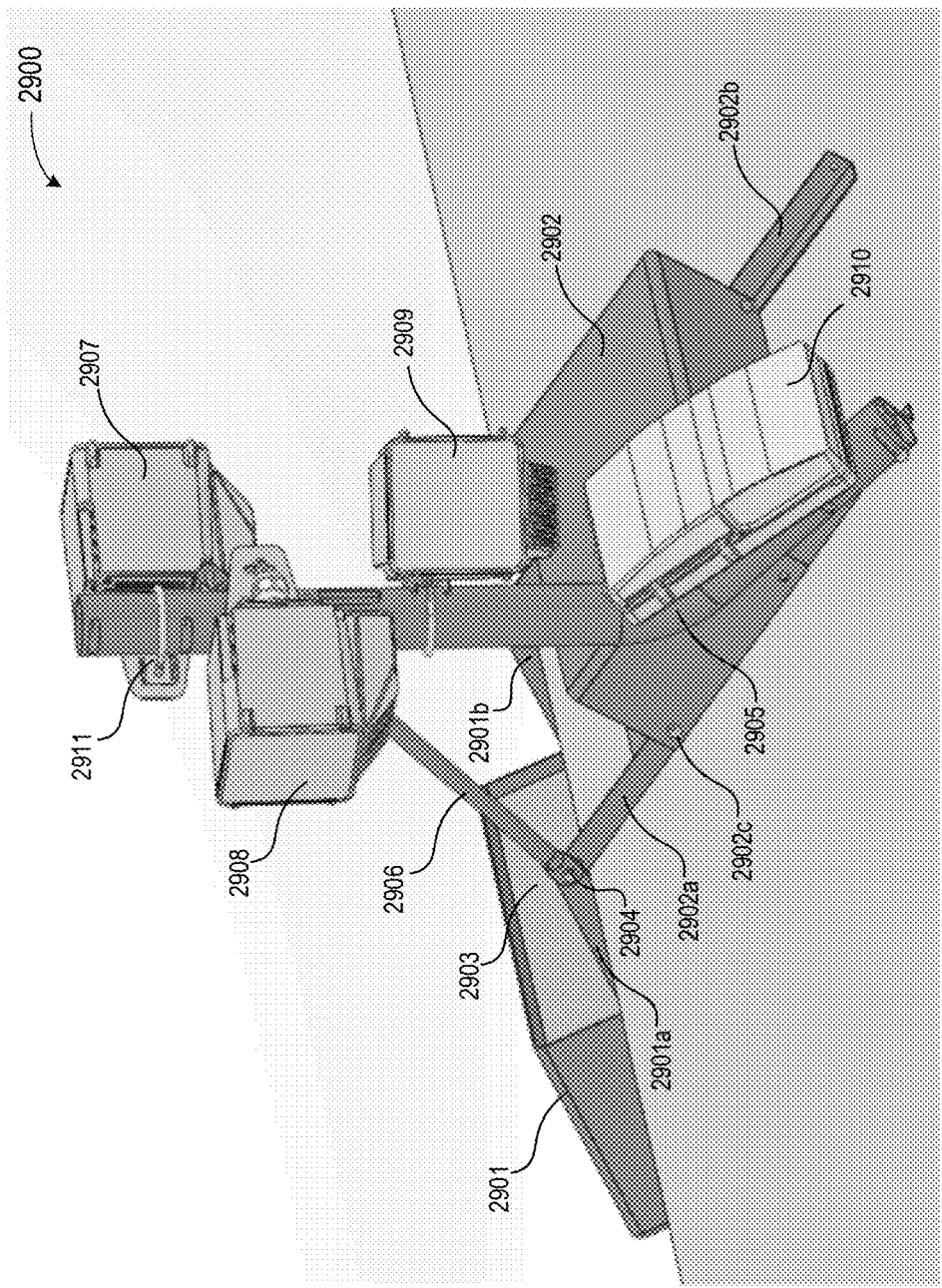
FIG. 29 depicts an example mounting apparatus for facilitating wireless communication according to various aspects of this disclosure.

An example implementation of the first type of mount apparatus disclosed herein is illustrated in FIG. 29. As shown, an example mounting apparatus 2900 of the first type disclosed herein may include a first enclosure 2901 for a first weighting element (e.g., a ballast) and a second enclosure 2902 for a second weighting element (e.g., a ballast). Enclosures 2901 and 2902 may be adapted to house various types of weighting elements. For example, as shown in FIG. 29, enclosures 2901 and 2902 may be adapted to house weighting elements that take the form of rectangular cinder blocks, of which cinder block 2903 is shown as an example. However, it should be understood that the form of the weighting elements (e.g., the material, shape, and/or size)—and thus the form of enclosures 2901 and 2902—may differ from what is shown in FIG. 29. For example, in some implementations, enclosures 2901 and 2902 may be adapted to house circular weighting elements and may thus take a circular shape, among other possibilities. Further, as shown in FIG. 29, enclosures 2901 and 2902 may be designed to conform with aesthetic elements of the location where the mount is positioned. For example, the example mounting apparatus 2900 may be mounted at a rooftop mounting location, and enclosures 2901 and 2902 may be designed to conform with rooftop vents or other rooftop elements so as to maintain aesthetic uniformity. Enclosures 2901 and 2902 may take other forms as well.

Each of the enclosures 2901 and 2902 of mounting apparatus 2900 may be attached to one or more respective connector elements that serve to connect the enclosure with one or more other components of the mounting apparatus 2900. The one or more connector elements for a given enclosure may be formed as rails or channels (e.g., an L-shaped channel as shown in FIG. 29) made from steel, among other possible materials and configurations. The one or more connector elements (e.g., a set of connector elements) may be attached to an enclosure in various ways. As one possibility, the one or more connector elements may be attached to an enclosure via one or more screws, brackets, and/or fasteners. As another possibility, the one or more connector elements may be welded to an enclosure. As yet another possibility, the one or more connector elements may be integrally formed with the enclosure and may extend from the enclosure itself In some embodiments, the one or more connector elements for a given enclosure may be collectively referred to as a connector assembly, regardless of how the respective connector elements are attached to the enclosure. Other examples are also possible.

As shown in FIG. 29, enclosure 2901 may be attached to two connector elements, 2901a and 2901b. Similarly, enclosure 2902 may be attached to two connector elements, 2901a and 2902a. Each enclosure may be attached to its respective connector elements via one or more respective fasteners, of which screw 2902c is shown as an example. Connector elements 2901a and 2902a and connector elements 2901b and 2902b may be connected to each other via respective mount joints, of which mount joint 2904 is shown as one example. The two mount joints may enable the enclosures to be positioned at a desired angle. For example, as shown in FIG. 29, the two mount joints may be adapted to sit atop the peak of a sloped rooftop mounting location, allowing the enclosures 2901 and 2902 and their respective weighting elements to be angled in a rested position on either side of the sloped rooftop and thereby securing the mounting apparatus 2900 in a fixed position. This may prevent further movement of mounting apparatus 2900 resulting from, for example, harsh weather conditions. The mount joints may enable the enclosures to rest in a flat position as well.

As shown, mounting apparatus 2900 may include a post 2905 (which may also be referred to as a "pole") that is adapted to host equipment for a wireless communication node. As shown in FIG. 2, post 2905 may be affixed to a rear end of connector element 2902a of enclosure 2902, but it should be understood that post 2905 may be affixed alternatively, or additionally, to other components of mounting apparatus 2900. Post 2905 may be affixed to a connector element, an enclosure for a weighting element, or another component of mounting apparatus 2900, in a number of ways. As one possibility, post 2905 may be attached to an enclosure or other component of the mounting apparatus 2900 via a screw and/or a bracket (among other types of fasteners). As another possibility, post 2905 may be welded to an enclosure or other component of the mounting apparatus 2900. As yet another possibility, post 2905 may be attached to an enclosure or one or more other components of mounting apparatus 200 via a combination of fixtures and welding. Other examples are also possible. Depending on the implementation, post 2905 may have various shapes and/or sizes and may be constructed from different types or combinations of material.

Mounting apparatus 2900 may further include at least one support strut for post 2905, of which support strut 2906 is shown as one example. As shown in FIG. 29, support strut 2906 may be connected at one end to mount joint 2904 and at another end to a given position near the middle of post 2905 (e.g., between the equipment enclosures for the wireless communication node). However, it should be understood that support strut 2906 may be connected to post 2905 at other positions as well, such as at the top of post 2905 (e.g., above the equipment enclosures for the wireless communication node) or at the bottom of post 2905 (e.g., below the equipment enclosures for the wireless communication node). Furthermore, support strut 2906 may be connected to other components of mounting apparatus 2900 as well. Support strut 2906 may be connected to mount joint 2904, post 2905, and/or another component of mounting apparatus 2900 in various ways. As one example, support strut 2906 may be connected to mount joint 2904, post 2905, and/or another component via a fastening such as a hinge or bracket. As another example, support strut 2906 may be welded to mount joint 2904, post 2905, and/or another component of mounting apparatus 2900. Other examples are also possible. Further, depending on the implementation, support strut 2906 may take various forms. For example, support strut 2906 may comprise a gas strut capable of supporting and balancing large weights. Other examples are also possible.

As noted above, the post 2905 may be adapted to host equipment for a wireless communication node. Such equipment may take various forms. As one example, such equipment may take the form of one or more radio enclosures, such as radio enclosures 2907, 2908, and 2909 shown in FIG. 29. Each of the radio enclosures 2907-2909 may be adapted to house a radio module for the wireless communication node, such as a ptp or ptmp radio module, various examples of which are described above. In some implementations, the radio enclosures may also be adapted to house a corresponding NPU (which may sometimes be referred to as a digital/network module) for the radio module, which may include a processor, data storage, and a communication interface. The radio enclosures may be adapted to house other components as well. In such an implementation, a radio module and corresponding NPU within a radio enclosure may be connected via a high-speed communication interface. Such an interface may include, as some examples, a PCI, a PCIe, and/or a Thunderbolt interface. In other implementations, mounting apparatus 2900 may include a separate NPU enclosure, such as NPU enclosure 2910 shown in FIG. 29, which may be adapted to house an NPU, separately from the radio enclosures 2907-2909, that is configured to control the radio modules housed within radio enclosures 2907-2909. In such an implementation, the radio modules may be connected to the separate NPU via an outdoor wired cable capable of supporting the high-speed communication interface.

Radio enclosures 2907-2909 and NPU enclosure 2910 may be connected to post 2905 in various manners. As one example, each of radio enclosures 2907-2909 may be affixed to post 2905 via a fastening such as a bracket 2911, which may support movement of radio modules 2907-2909 as necessary, for example to lower one or more of the radio modules to prevent network interference. As another example, NPU enclosure 2910 may be welded to post 2905. However, it should be understood that radio enclosures 2907-2909 and/or NPU enclosure 2910 may be connected to post 2905 in other manners as well.

Other implementations of the disclosed mounting apparatus may be possible as well. For instance, while example mounting apparatus 2900 is shown in FIG. 29 as including one support strut 2906, it is possible that the disclosed mounting apparatus may include more than one support strut, each of which may be connected to different components of the mounting apparatus. As one possible example to illustrate, the disclosed mounting apparatus may include (i) a first support strut that is connected between a first mount joint and a first position on a post of the mount apparatus and (ii) a second support strut that is connected between a second mount joint and a second position on the post of the mount apparatus. Other examples of strut configurations are possible as well.

Further, while example mounting apparatus 2900 is shown in FIG. 29 as including one post 2905, it is possible that the disclosed mounting apparatus may include more than one post, each of which may be adapted to host equipment for the wireless communication node. As one possible example to illustrate, the disclosed mounting apparatus may include (i) a first post that is adapted to host a first set of equipment for a wireless communication node (e.g., a first set of ptp and/or ptmp radio modules) and (ii) a second post that is adapted to host a second set of equipment for the wireless communication node (e.g., a second set of ptp and/or ptmp radio modules). Other examples of post configurations are possible as well.

Further yet, while example mounting apparatus 2900 is shown in FIG. 29 as including one enclosure for a weighting element on each side of the mount joints, it is possible that the disclosed mounting apparatus may include more than one enclosure for weighting elements on each side of the mount joints, where the multiple enclosures on a given side may be arranged in various different manners. For example, the disclosed mounting apparatus may include multiple enclosures on a given side of a mount joint that are arranged in either a serial (or "vertical") configuration, a parallel (or "horizontal") configuration, or some combination thereof.

FIGS. 30A-C, 31A-B, 32, 33A-B, 34A-B, 35, and 36 depict various other embodiments and perspectives of the first type of disclosed mounting apparatus.

Figure 30C:
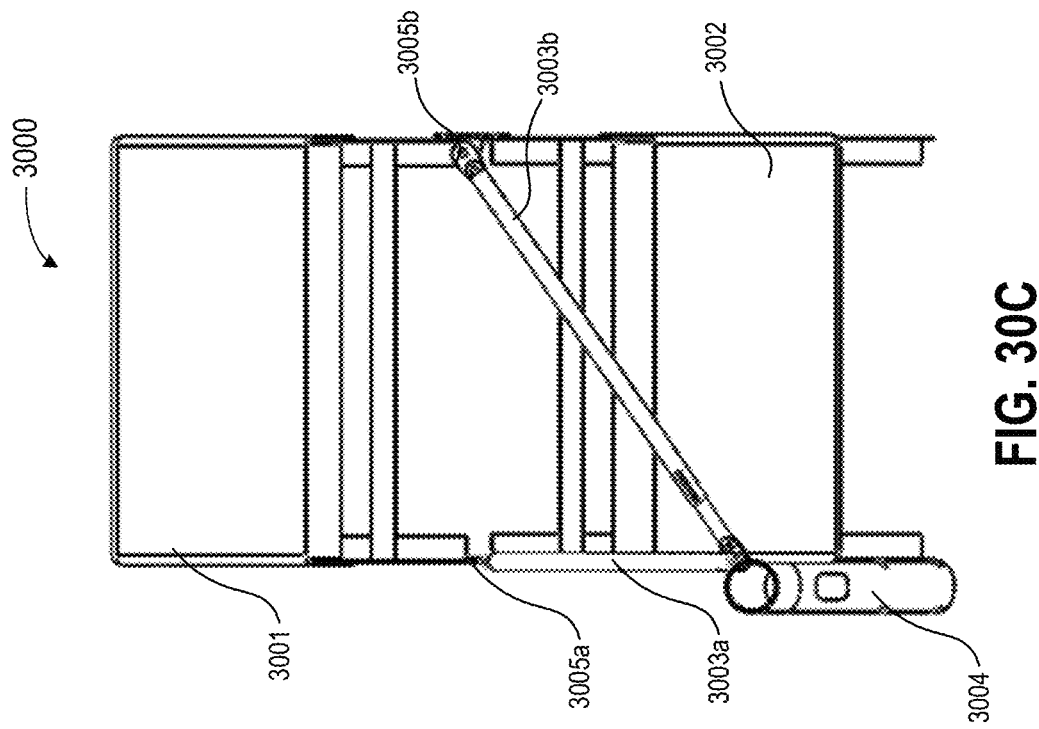
FIGS. 30A-30C depict another example mounting apparatus for facilitating wireless communication according to various aspects of this disclosure.
Figure 30A:
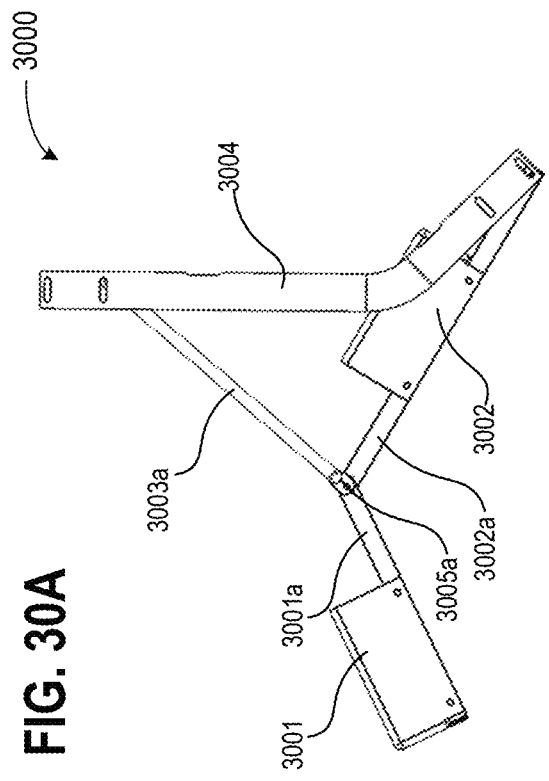
Figure 30B:
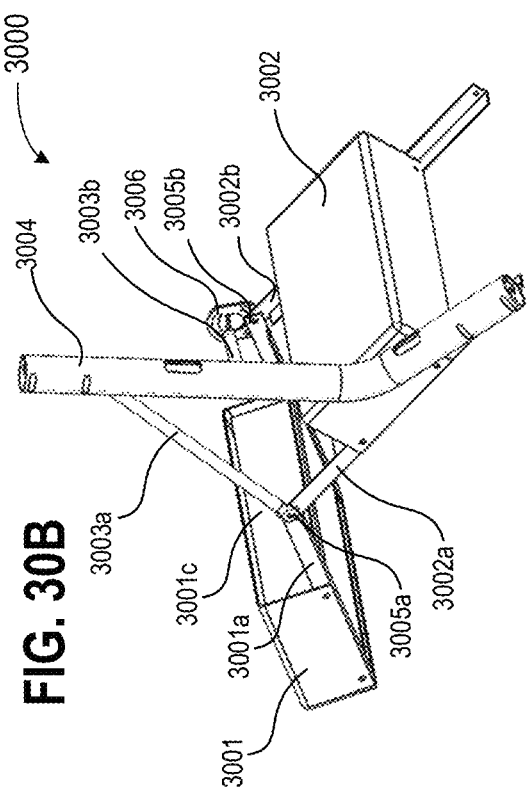

For instance, FIGS. 30A, 30B, and 30C illustrate different perspective views of another example mounting apparatus 3000 of the first type disclosed herein. As shown, the example mounting apparatus 3000 may include a single enclosure 3001 $f$ and a single enclosure 3002 on each side of two mount joints 3005$a$ and 3005$b$. Enclosures 3001 and 3002 may each be adapted to house a respective weighting element that takes the form of a rectangular cinder block, of which cinder block 3001$c$ is shown as an example. Further, enclosures 3001 and 3002 may each be attached to two respective connector elements, 3001$a$ and 3001$b$, and 3002$a$ and 3002$b$. Connector elements 3001$a$ and 3001$b$ of enclosure 3001 may be connected to connector elements 3002$a$ and 3002$b$ of enclosure 3002 via mount joints 3005$a$ and 3005$b$, respectively. The example mounting apparatus 3000 may further include a single post 3004 attached to one of the enclosures and/or connector elements, such as a rear end of connector element 3002$a$ of enclosure 3002 via a bracket piece. The example mounting apparatus 3000 may further include two support struts 3003$a$ and 3003$b$. Support strut 3003$a$ may be connected at a first end to a position near the top of the post 3004 and at a second end to mount joint 3005$a$. Support strut 3003$b$ may be connected at a first end to a position near the middle of the post 3004 and at a second end to a fastener 3006 that is also coupled to mount joint 3005$b$. The post 3004 of the mounting apparatus 3000 may be adapted to host wireless communication equipment for a wireless communication node, some examples of which have been previously discussed. For example, the post 3004 may host one or more radio enclosures (not shown in FIG. 30) that may each be adapted to house a respective radio module, such as a ptp or a ptmp radio module, and a corresponding NPU, as discussed above with reference to FIG. 29. In some implementations, the example mounting apparatus 3000 may include a separate NPU enclosure for housing an NPU separately from the one or more radio enclosures. The example mounting apparatus 3000 may be adapted to host other wireless communication equipment as well.

Figure 31A:
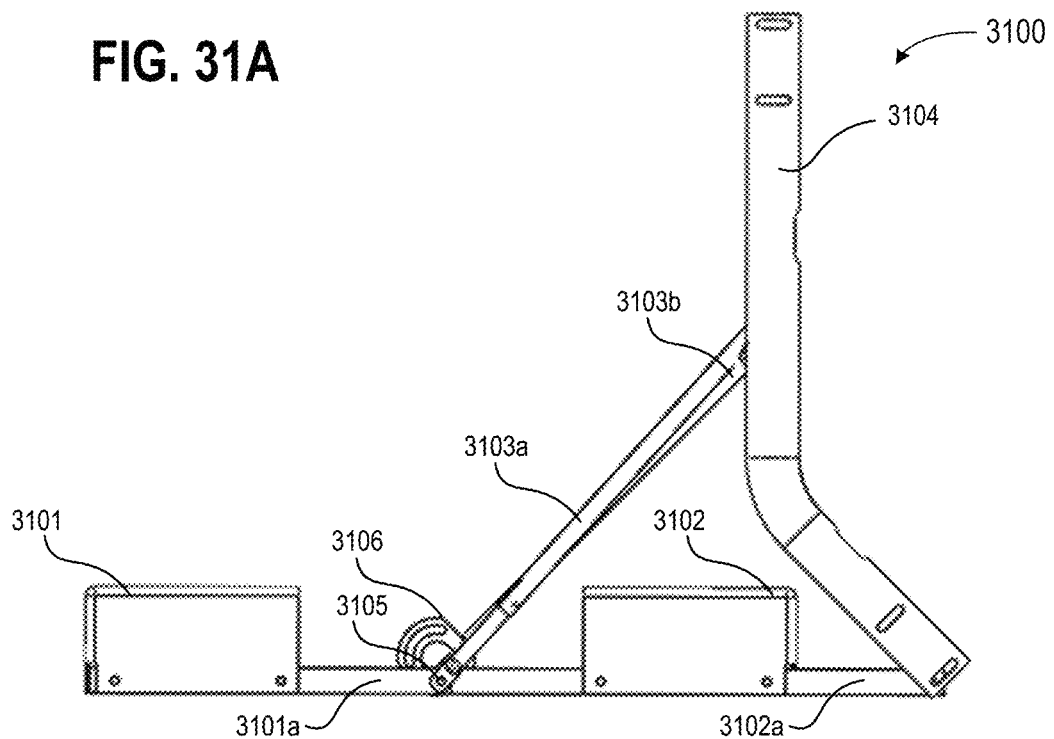
FIGS. 31A-31B depict yet another example mounting apparatus for facilitating wireless communication according to various aspects of this disclosure.
Figure 31B:
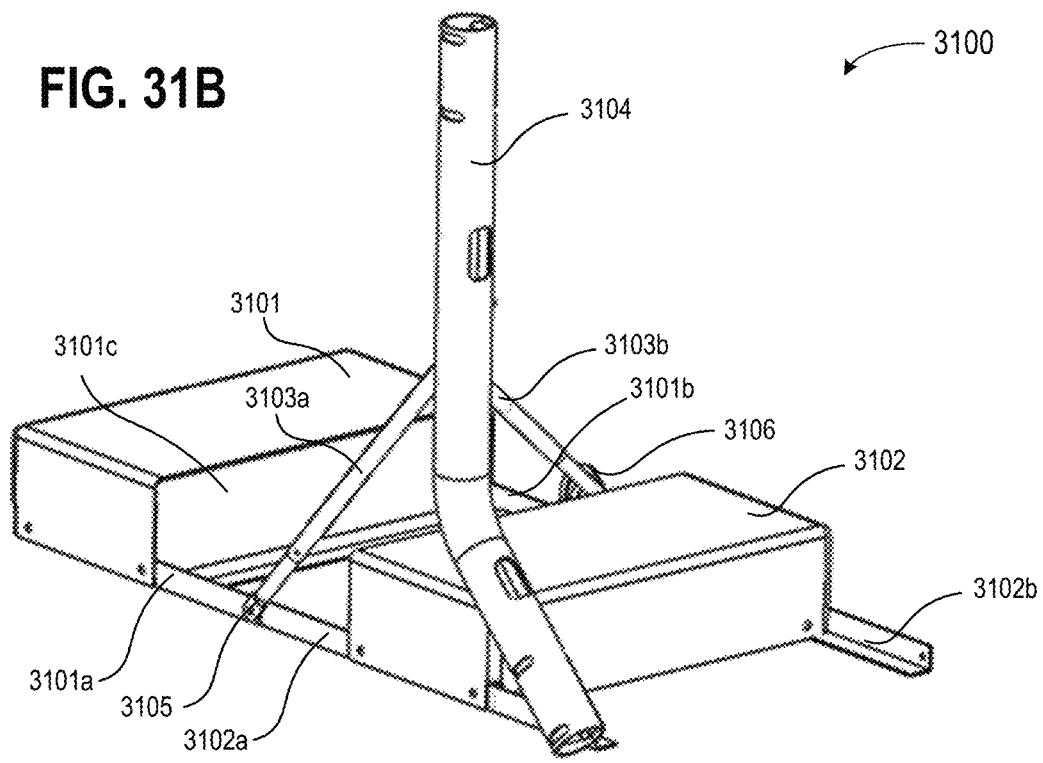

FIGS. 31A and 31B illustrate different perspective views of another example mounting apparatus 3100 of the first type disclosed herein. As shown, the example mounting apparatus 3100 may include a single enclosure 3101 and a single enclosure 3102 on each side of two mount joints, of which mount joint 3105 is shown as one example. Enclosures 3101 and 3102 may each be adapted to house a respective weighting element that takes the form of a rectangular cinder block, of which cinder block 3101c is shown as one example. Further, enclosures 3101 and 3102 may each be attached to two respective connector elements, 3101a and 3101b, and 3102a and 3102b, that serve to connect each enclosure with one or more other components of the example mounting apparatus 3100. Connector elements 3101a and 3101b of enclosure 3101 may be connected to connector elements 3102a and 3102b of enclosure 3102 via respective mount joints, of which mount joint 3105 is shown. The example mounting apparatus 3100 may further include a single post 3104 that may be attached to a rear end of connector element 3102a via a bracket piece. The example mounting apparatus 3100 may further include two support struts 3103a and 3103b. Support strut 3103a may be connected at a first end to a position near the middle of the post 3104 and at a second end to the mount joint 3105. Support strut 3103b may be connected at a first end to a position near the middle of the post 3104 and at a second end to a fastener 3106 that is also coupled to a second mount joint (not shown) of the example mounting apparatus 3100. The post 3104 of the example mounting apparatus 3100 may be adapted to host wireless communication equipment for a wireless communication node, some examples of which have been previously discussed. For example, the post 3104 may host one or more radio enclosures (not shown in FIG. 31) that may each be adapted to house a respective radio module, such as a ptp or a ptmp radio module, and a corresponding NPU, as discussed above with reference to FIG. 29. In some implementations, the example mounting apparatus 3100 may include a separate NPU enclosure for housing an NPU separately from the one or more radio enclosures. The example mounting apparatus 3100 may be adapted to host other wireless communication equipment as well.

Figure 32:
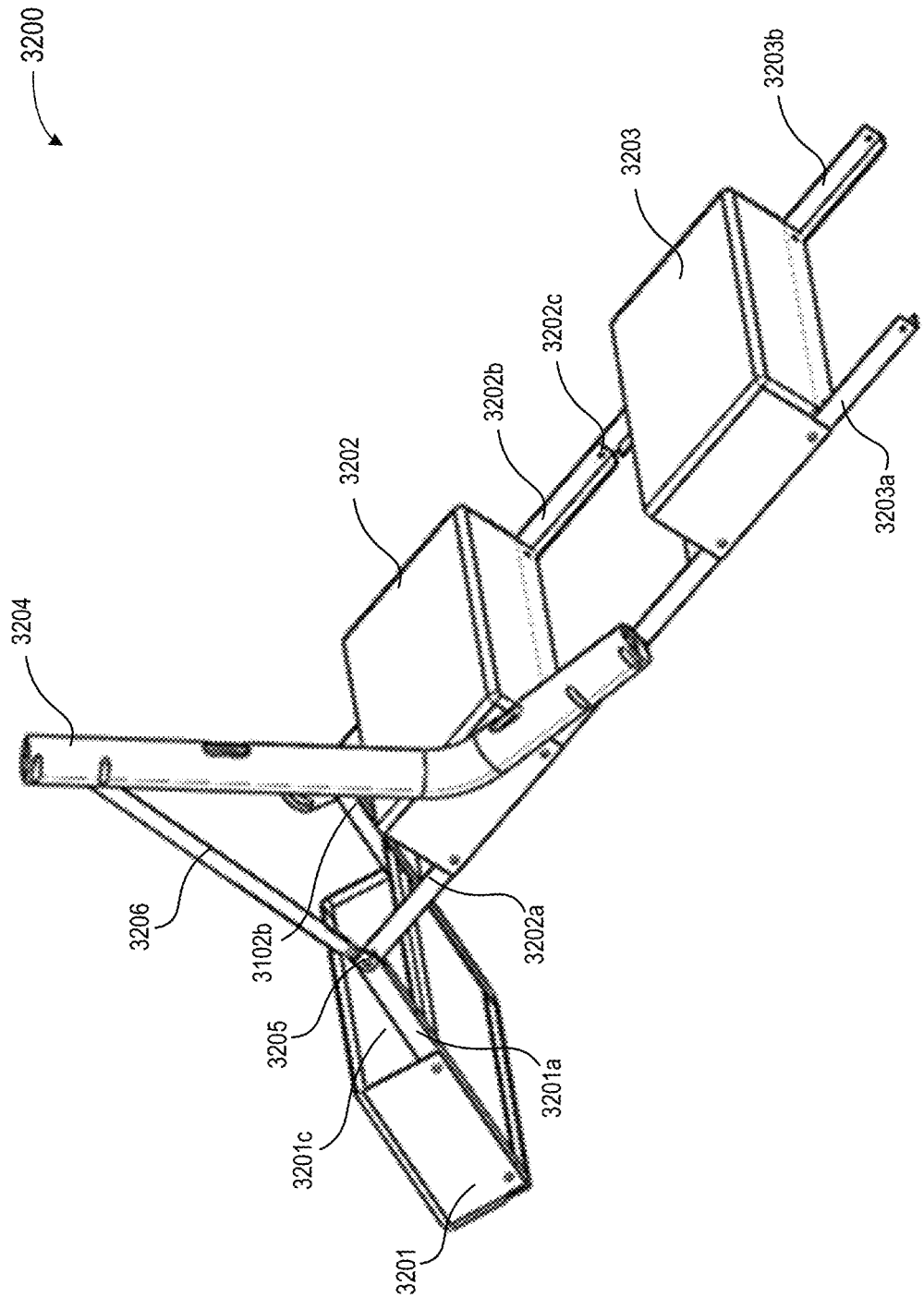
FIG. 32 depicts yet another example mounting apparatus for facilitating wireless communication according to various aspects of this disclosure.

FIG. 32 illustrates another example mounting apparatus 3200 of the first type disclosed herein. As shown, the example mounting apparatus 3200 may include two enclosures 3202 and 3203 that are connected on one side of two mount joints, of which mount joint 3205 is shown as one example, in a colinear configuration with a single enclosure 3201 on the other side of the two mount joints (e.g., arranged in a vertical configuration when placed on a sloped rooftop). Each enclosure may be adapted to house a respective weighting element that takes the form of a rectangular cinder block, of which cinder block 3201c is shown as one example. Further, each enclosure may be attached to a respective pair of connector elements that may serve to connect to one or more other components of the example mounting apparatus 3200. Enclosures 3201, 3202, and 3203 may each be attached to two respective connector elements, 3201a and 3201b, 3202a and 3202b, and 3203a and 3203b, that serve to connect each enclosure with one or more other components of the example mounting apparatus 3200. For example, as shown, connector elements 3202a and 3202b of enclosure 3202 may be connected at one end to connector elements 3201a and 3201b of enclosure 3201 via the two mount joints, and at another end to connector elements 3203a and 3203b of enclosure 3203 via respective fasteners, of which screw 3202c is shown as an example. The example mounting apparatus 3200 may further include a single post 3204 attached to a respective connector element of one or both of the enclosures 3202 or 3203 in the vertical configuration via a bracket piece, such as the connector element 3202a, as shown. The example mounting apparatus 3200 may also include a single support strut 3206 connected at a first end to the post 3204 and at a second end to one of the mount joints, such as mount joint 3205. The post 3204 of the example mounting apparatus 3200 may be adapted to host wireless communication equipment for a wireless communication node, some examples of which have been previously discussed. For example, the post 3204 may host one or more radio enclosures (not shown in FIG. 32) that may each be adapted to house a respective radio module, such as a ptp or a ptmp radio module, and a corresponding NPU, as discussed above with reference to FIG. 29. In some implementations, the example mounting apparatus 3200 may include a separate NPU enclosure for housing an NPU separately from the one or more radio enclosures. The example mounting apparatus 3200 may be adapted to host other wireless communication equipment as well.

Figure 33A:
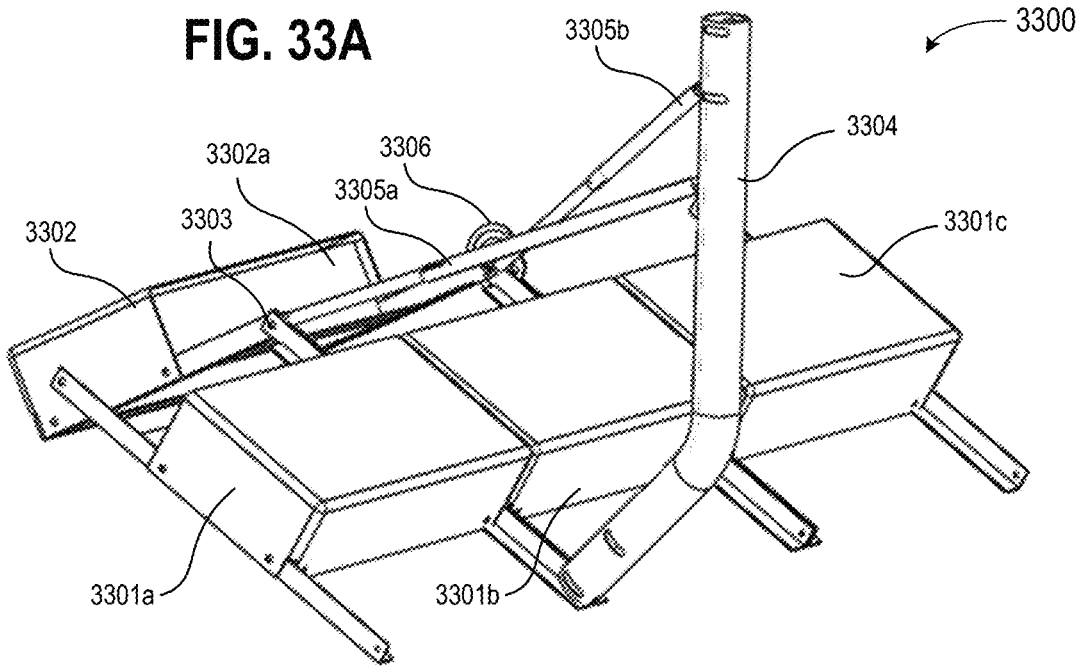
FIGS. 33A-33B depict yet another example mounting apparatus for facilitating wireless communication according to various aspects of this disclosure.
Figure 33B:
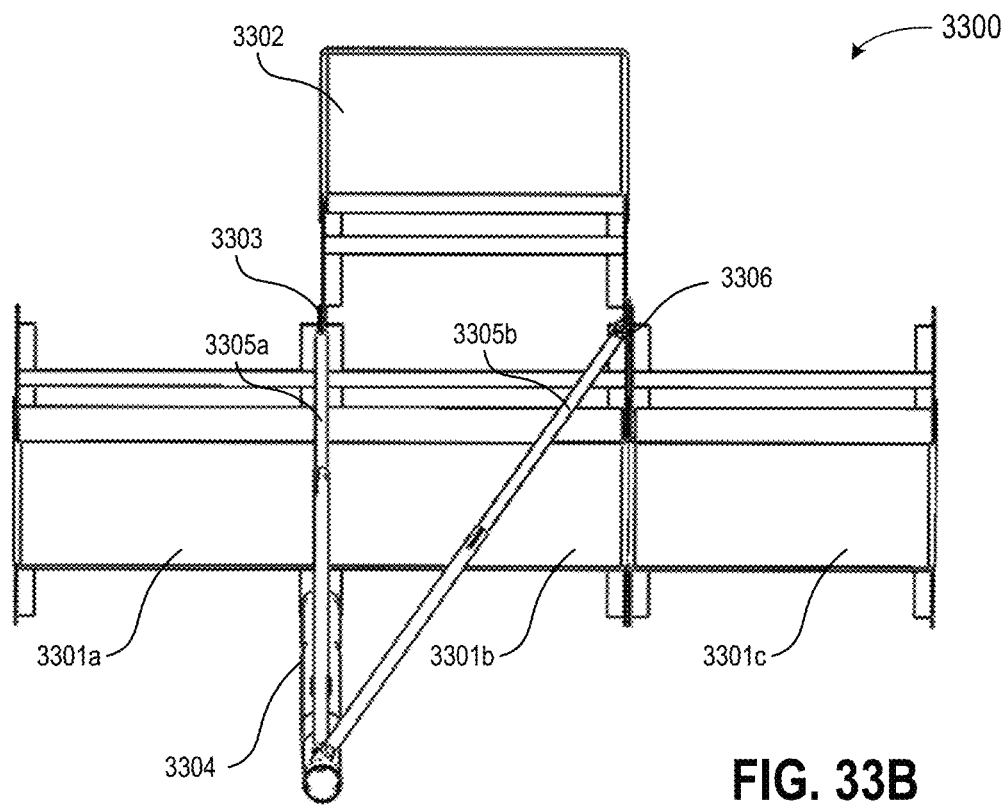

FIGS. 33A and 33B illustrate different perspective views of another example mounting apparatus 3300 of the first type disclosed herein. As shown, the example mounting apparatus 3300 may include three enclosures 3301a, 3301b, and 3301c that are connected on one side of two mount joints, of which 3303 is shown as an example, in a lateral configuration with respect to one enclosure 3302 on the other side of the two mount joints (e.g., connected in a horizontal configuration when placed on a sloped rooftop). Each enclosure may be adapted to house a respective weighting element that takes the form of a rectangular cinder block, of which cinder block 3302a is shown as an example. Further, each enclosure may be attached to two respective connector elements that serve to connect the enclosure to one or more other components of the example mounting apparatus 3300. Further, the example mounting apparatus 3300 may include a single post 3304 attached to respective connector elements of two of the enclosures in the horizontal configuration, 3301a and 3301b, via respective bracket pieces. Still further, the example mounting apparatus 3300 may include two support struts 3305a and 3305b. The support strut 3305a may be connected at a first end to the post 3304 and at a second end to the mount joint 3303. The support strut 3305b may be connected at a first end to the post 3304 and at a second end to a fastener 3306 which may also be coupled to another mount joint (not shown) of the example mounting apparatus 3300. The post 3304 of the example mounting apparatus 3300 may be adapted to host wireless communication equipment for a wireless communication node, some examples of which have been previously discussed. For example, the post 3304 may host one or more radio enclosures (not shown in FIG. 33) that may each be adapted to house a respective radio module, such as a ptp or a ptmp radio module, and a corresponding NPU, as discussed above with reference to FIG. 29. In some implementations, the example mounting apparatus 3300 may include a separate NPU enclosure for housing an NPU separately from the one or more radio enclosures. The mounting apparatus 3300 may be adapted to host other wireless communication equipment as well.

Figure 34A:
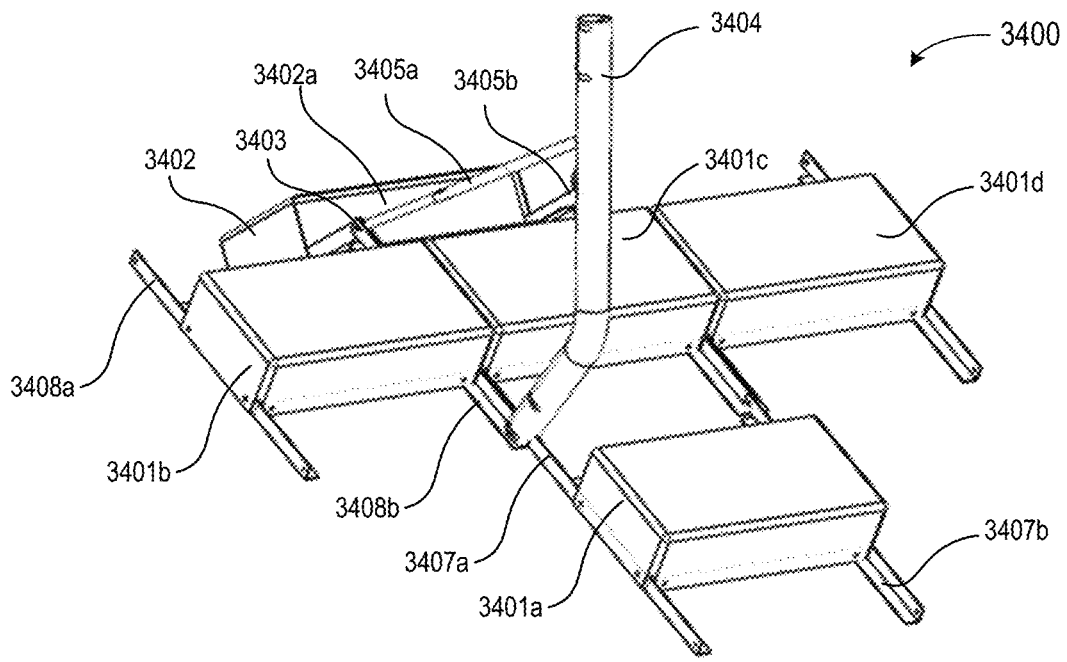
FIGS. 34A-34B depict yet another example mounting apparatus for facilitating wireless communication according to various aspects of this disclosure.
Figure 34B:
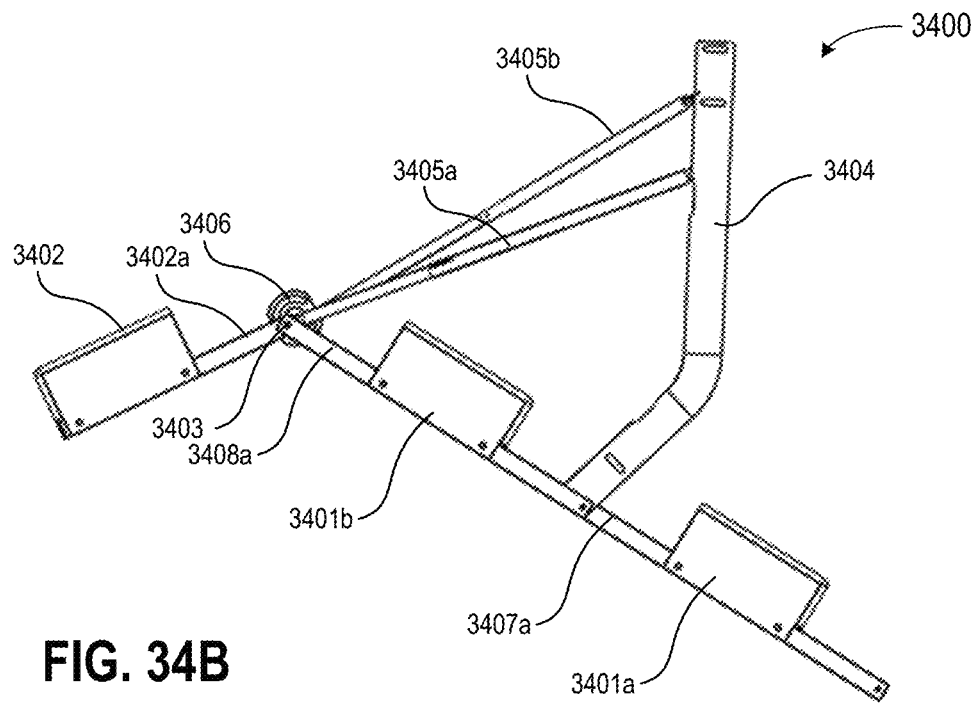

FIGS. 34A and 34B illustrate different perspective views of another example mounting apparatus 3400 of the first type disclosed herein. As shown, the example mounting apparatus 3400 may include four enclosures 3401a, 3401b, 3401c, and 3401d that are arranged in hybrid horizontal/vertical configuration on one side of two mount joints, of which mount joint 3403 is shown as an example, and one enclosure 3402 on the other side of the mount joints 3403. Each enclosure may be adapted to house a respective weighting element that takes the form of a rectangular cinder block, of which cinder block 3402a is shown as an example. Further, each enclosure may be attached to two respective connector elements that serve to connect the enclosure to one or more other components of the example mounting apparatus 3400. As shown in FIG. 34, enclosure 3401a may be attached to connector elements 3407a and 3407b, enclosure 3401b may be attached to connector elements 3408a and 3408b, and enclosure 3402 may be attached at least to connector element 3402a. Further, the example mounting apparatus 3400 may include a single post 3404 attached to respective connector elements of two or more of the enclosures in the horizontal part of the configuration, such as 3401a, 3401b, and 3401c, via respective bracket pieces. Still further, the example mounting apparatus 3400 may include two support struts 3405a and 3405b. Support strut 3405a may be connected at a first end to the post 3404 and at a second end to mount joint 3403. Support strut 3405b may be connected at a first end to the post 3404 and at a second end to a fastener 3406 that may also be coupled to another mount joint (not shown) of the example mounting apparatus 3400. The post 3404 of the example mounting apparatus 3400 may be adapted to host wireless communication equipment for a wireless communication node, some examples of which have been previously discussed. For example, the post 3404 may host one or more radio enclosures (not shown in FIG. 34) that may each be adapted to house a respective radio module, such as a ptp or a ptmp radio module, and a corresponding NPU, as discussed above with reference to FIG. 29. In some implementations, the example mounting apparatus 3400 may include a separate NPU enclosure for housing an NPU separately from the one or more radio enclosures. The mounting apparatus 3400 may be adapted to host other wireless communication equipment as well.

Figure 35:
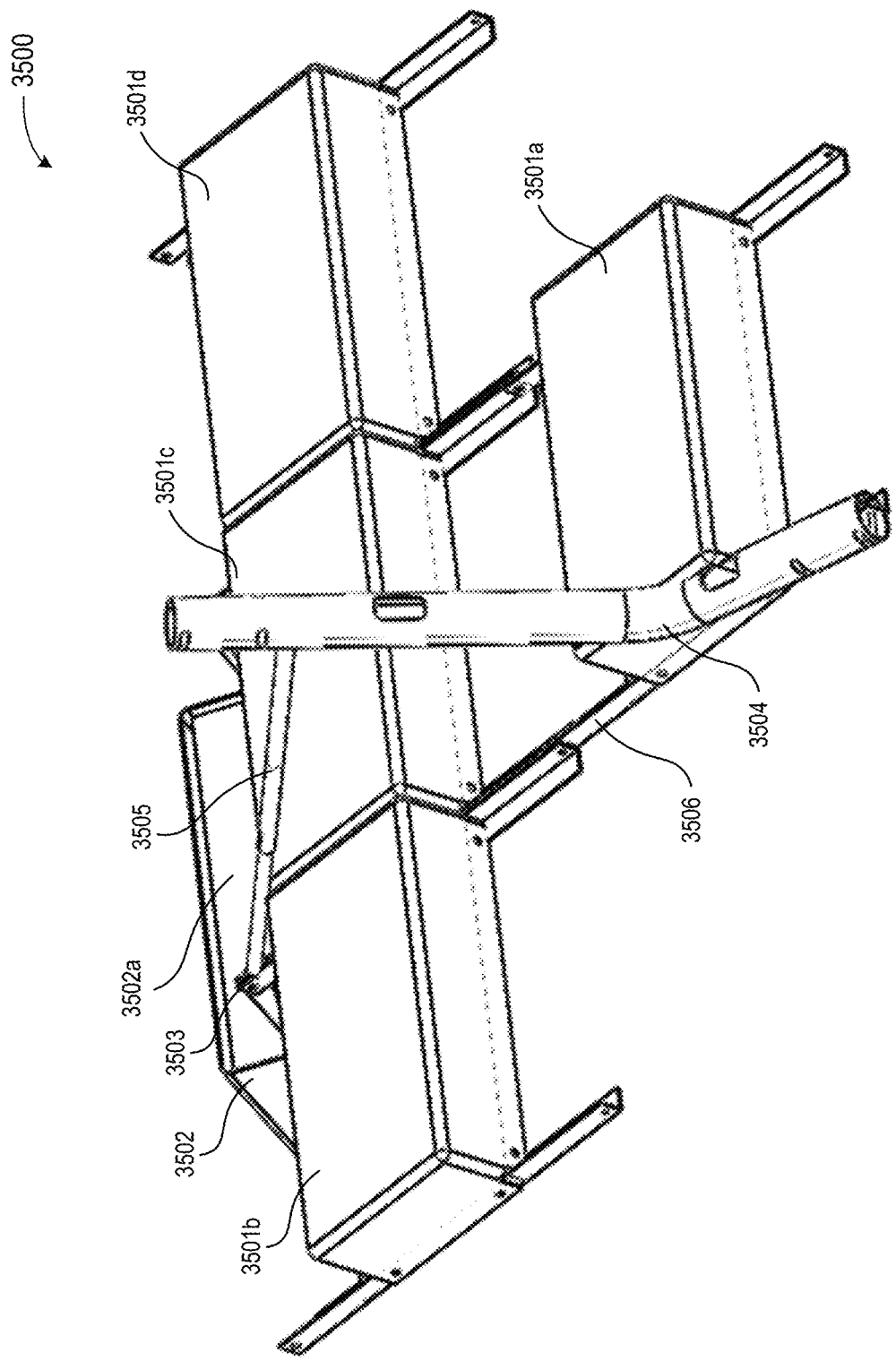
FIG. 35 depicts yet another example mounting apparatus for facilitating wireless communication according to various aspects of this disclosure.

FIG. 35 illustrates another example mounting apparatus 3500 of the first type disclosed herein. As shown, the example mounting apparatus 3500 may include four enclosures 3501a, 3501b, 3501c, and 3501d that may be arranged in a hybrid horizontal/vertical configuration on one side of two mount joints, an example of one of which is shown as mount joint 3503, and one enclosure 3502 on the other side of the two mount joints. Each enclosure may be adapted to house a respective weighting element that takes the form of a rectangular cinder block, of which cinder block 3502a is shown as an example. Further, each enclosure may be attached to two respective connector elements that serve to connect the enclosure to one or more other components of the example mounting apparatus 3500. The example mounting apparatus 3500 may further include a single post 3504 attached to a rear end of a connector element 3506 of the enclosure 3501a in the vertical part of the configuration via a bracket piece, and one support strut 3505 connected at a first end to the post 3504 and at a second end to one of the two mount joints, such as mount joint 3503, as shown. The post 3504 of the example mounting apparatus 3500 may be adapted to host wireless communication equipment for a wireless communication node, some examples of which have been previously discussed. For example, the post 3504 may host one or more radio enclosures (not shown in FIG. 35) that may each be adapted to house a respective radio module, such as a ptp or a ptmp radio module, and a corresponding NPU, as discussed above with reference to FIG. 29. In some implementations, the example mounting apparatus 3500 may include a separate NPU enclosure for housing an NPU separately from the one or more radio enclosures. The example mounting apparatus 3500 may be adapted to host other wireless communication equipment as well.

Figure 36:
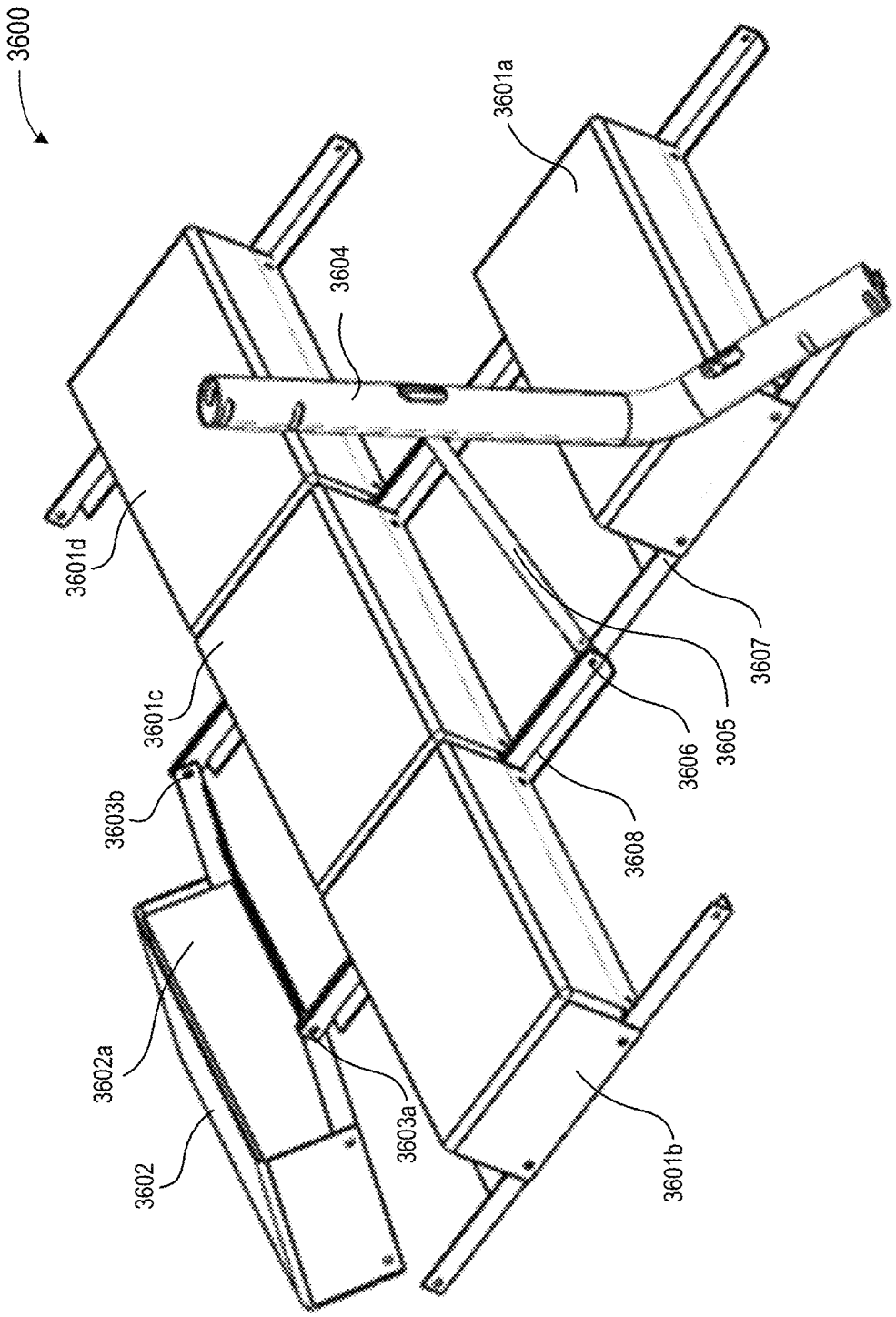
FIG. 36 depicts yet another example mounting apparatus for facilitating wireless communication according to various aspects of this disclosure.

FIG. 36 illustrates another example mounting apparatus 3600 of the first type disclosed herein. As shown, the example mounting apparatus 3600 may include four enclosures 3601a, 3601b, 3601c, and 3601d that are arranged in hybrid horizontal/vertical configuration on one side of two mount joints 3603a and 3603b, and one enclosure 3602 on the other side of the two mount joints 3603a and 3603b. Each enclosure may be adapted to house a respective weighting element that takes the form of a rectangular cinder block, of which cinder block 3602a is shown as an example. Further, each enclosure may be attached to two respective connector elements that serve to connect the enclosure to one or more other components of the example mounting apparatus 3600. The example mounting apparatus 3600 may further include a single post 3604 that may be attached to a connector element 3607 of the enclosure 3601a in the vertical part of the configuration via a bracket piece. The example mounting apparatus 3600 may also include a support strut 3605 connected at a first end to the post 3604 and at a second end to one of the joints that connects the respective connector elements of two or more enclosures in the vertical part of the configuration, such as joint 3606 (as opposed to one of the mount joints 3603a and 3603b). The post 3604 of the example mounting apparatus 3600 may be adapted to host wireless communication equipment for a wireless communication node, some examples of which have been previously discussed. For example, the post 3604 may host one or more radio enclosures (not shown in FIG. 36) that may each be adapted to house a respective radio module, such as a ptp or a ptmp radio module, and a corresponding NPU, as discussed above with reference to FIG. 29. In some implementations, the example mounting apparatus 3600 may include a separate NPU enclosure for housing an NPU separately from the one or more radio enclosures. The example mounting apparatus 3600 may be adapted to host other wireless communication equipment as well.

The first type of mounting apparatus disclosed herein may include other components and/or be arranged in other manners as well.

As mentioned earlier, some types of wireless communication nodes may also include equipment that is capable of changing the direction of the node's one or more radiation beams, which is often referred to as beam steering or beam forming. For instance, ptmp radio modules that include phased antenna arrays, such as those described above (e.g., Module B), may be configured to engage in electronic beam steering. Typically, such a phased antenna array may have multiple antenna elements that can each transmit signals at a specific phase, and, based on the values of the signal phases at phased antenna elements, the overall beam that is emitted from the phased antenna array can be electronically steered in a desired direction vertically (elevation), horizontally (azimuth), or in both directions.

Further, although the 3 dB beam width of an individual beam produced by a phased antenna array is typically narrow (e.g., from 1~2 degrees to 10~12 degrees), the phased antenna array with the help of multiple distinct narrow beams pointing in different directions (e.g., horizontally and/or vertically) can provide coverage to an entire sector (e.g., coverage of 90 degrees). It should be understood that the phased antenna array can have a different sector coverage as well (e.g., a coverage greater or less than 90 degrees). For example, a phased antenna array can have 60-degree coverage or 120-degree coverage with the help of multiple narrow individual beams within the 60-degree or 120-degree range, respectively. In order to provide 360 degree coverage, four wireless mesh communication radios with phased antenna arrays may be required.

Because it generates multiple, distinct narrow beams, a phased array antenna can be used for fine re-alignment of a wireless communication module within a wireless communication node (e.g., a wireless mesh radio module) in the event of partial or complete LOS failures. For instance, due to growth of a tree branch, LOS between the respective wireless communication modules (e.g., wireless mesh radio modules) of two wireless communication nodes within a wireless communication network may be partially impacted, which may result in signal degradation that impacts bi-directional traffic throughput of the wireless communication link established between the wireless communication modules and possibly an entire segment of the wireless communication network depending on the specific topology of the network. In such instances, a phased antenna array at one or both ends of the wireless communication link may try multiple different narrow beams generated by the phased antenna array and select a given narrow beam that provides the best signal strength for transmission and/or reception.

While a phased antenna array may be used to re-align a wireless communication node as described above, there may be instances where LOS is impacted by circumstances and/or obstacles (e.g., vegetation) such that none of the possible narrow beams generated at one or both ends of a wireless communication link is able to produce an acceptable signal strength for signal transmission and/or reception. In such instances, the wireless communication node at the impacted site may need to have the direction of one or more of its radiation beams changed to point towards a different wireless communication node that may be outside the sector coverage of the phased antenna array of the wireless communication node. Consequently, the phased antenna array of a ptmp radio module may be unable to mitigate a LOS disruption using electronic beam steering alone, and the ptmp radio module may need to be further adjusted in order to direct the beams generated by the phased antenna array in a different direction.

As described above, electronic beam steering could also be employed by certain ptp radio modules, such as those described above (e.g., Module A), in order to steer the direction of the ptp radio module's single radiation beam from one wireless communication node to another wireless communication node (e.g., due to a trigger such as a change in link condition). However, as with the electronic beam steering employed by ptmp radio modules, there may be circumstances where electronic beam steaming alone cannot perform the necessary adjustment of the ptp radio module's beam direction, which may give rise to a need for the ptp radio module to be further adjusted in order to direct the beam generated by a ptp radio module in a different direction.

To address these additional needs, also disclosed herein is a second type of mounting apparatus for a wireless communication node that is configured to mechanically rotate one or more of the radio modules of the wireless communication node (e.g., one or more ptp and/or ptmp radio modules for a wireless mesh network) in any of various different directions (e.g., different horizontal directions) in response to a command signal, which may enable a particular radio module to be rotated independently of any other radio module of the wireless communication node on an "as needed" basis. As described below, this command signal may be issued by a computing device that is connected to the mount, such as an NPU for the wireless communication node, which may function to instruct the mounting apparatus to rotate a particular radio module in response to various triggering events, including but not limited to receiving a command message from a remote computing system or locally determining that an adjustment to direction of the particular radio module is needed.

The second type of mounting apparatus may include various components. The second type of mounting apparatus may include a base portion that is connected to a post (or a pole). The base portion may be adapted to house various components, such as an NPU (or the like), which may include a processor, data storage, and a communication interface, perhaps along with other components, and one or more cables for the wireless communication node, as will be explained in more detail below. The base portion may also house a set of one or more connectors to couple the NPU (or the like) to the one or more cables. The base portion may house other components as well.

The post may be affixed to the base portion (e.g., at a center of the base portion) and may be adapted for mounting one or more radio enclosures. Each radio enclosure may be capable of housing a respective radio module of the wireless communication node and may be connected to the post using one or more brackets and/or fasteners that enable the radio enclosure to be rotated circumferentially relative to the post.

The second type of mounting apparatus may further include, for each radio enclosure, a respective motor that is coupled to at least one bracket of the radio enclosure and serves to rotate the bracket, and thereby the radio enclosure, so as to mechanically adjust the direction of the one or more radiation beams of the radio module housed by the radio enclosure. The motor may take the form of an electric motor that enables controlled rotation of the radio enclosure, such as a stepper motor, among other possibilities. Each radio enclosure's respective motor may be electrically connected to and controlled by the NPU via one or more cables. The one or more cables for each radio enclosure and its respective radio module housed within may pass through an opening of the post and run down through a hollow interior of the post, such that the cables are contained and protected from exterior elements (e.g., harsh weather, wildlife, etc.), and protrude through a bottom end of the post and into the base portion, where the cables may be coupled to the NPU via the set of one or more connectors. In this regard, the radio modules and the NPU may be coupled together via a high-speed communication interface, such as a PCI, a PCIe, and/or a Thunderbolt interface, among other possibilities.

The second type of mounting apparatus may also include a cover portion that may be placed over the top of the post and one or more radio enclosures. The cover portion may provide improved aesthetics and protection for the wireless equipment that is being mounted by the mounting apparatus.

FIGS. 37A-37H depict various perspectives of an example mounting apparatus 3700 of the second type disclosed herein. Beginning with reference to FIG. 37A, example mounting apparatus 3700 is shown to include a base 3701 and a post 3702 affixed to the base 3701. In line with the discussion above, the base 3701 may house an NPU (or the like) for the wireless communication node. The post 3702 may be adapted to house radio enclosures 3703, 3704, 3705, and 3706, which may each house a respective radio module for the wireless communication node as described above. Each of the radio enclosures 3703-3706 may be attached to the post 3702 via a respective set of one or more brackets and/or fasteners. Each set of brackets may include a top bracket and a bottom bracket. For example, as shown, radio enclosure 3706 may be connected to the post 3702 via a set of brackets 3706a. Each of the other radio enclosures 3703-3705 may be attached to the post 3702 in a similar way.

Figure 37A:
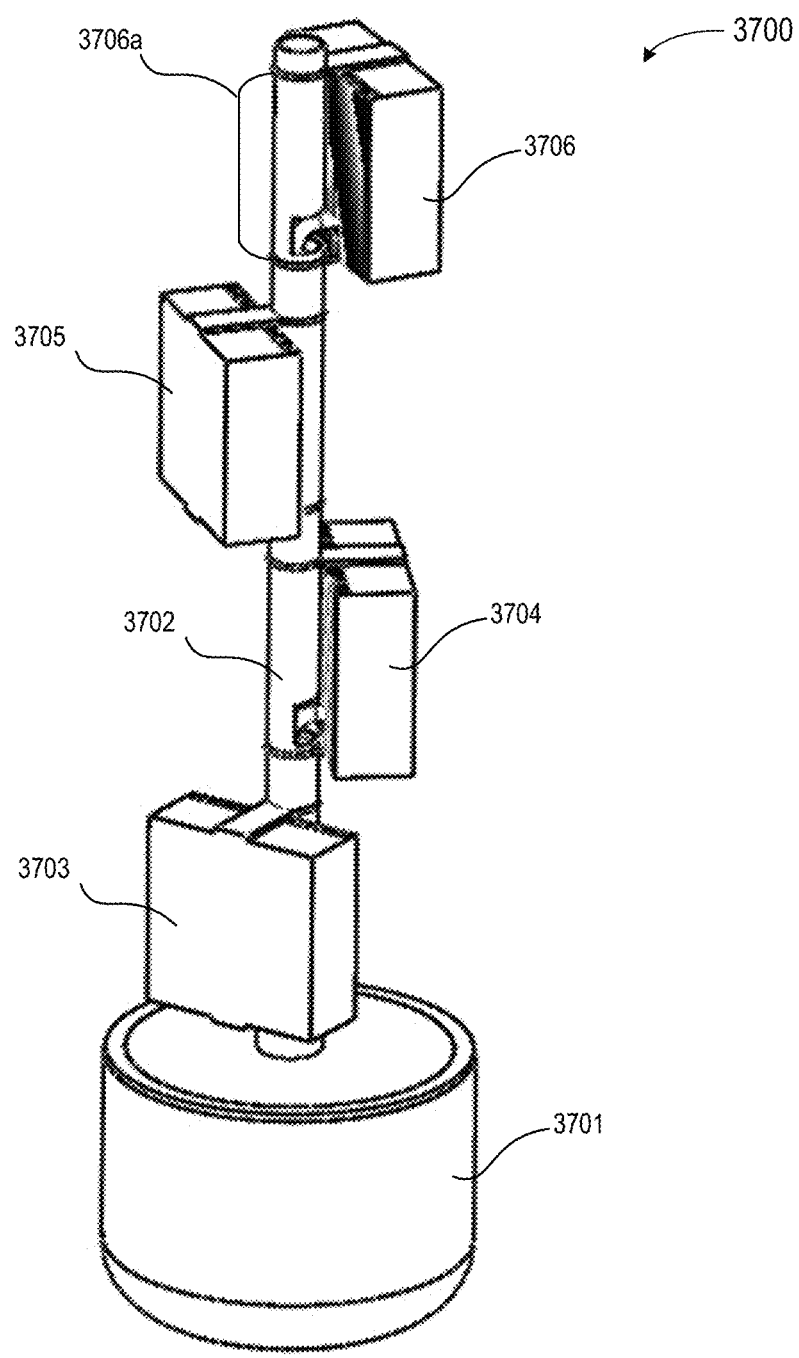
FIG. 37A depicts yet another example mounting apparatus for facilitating wireless communication according to various aspects of this disclosure.
Figure 37C:
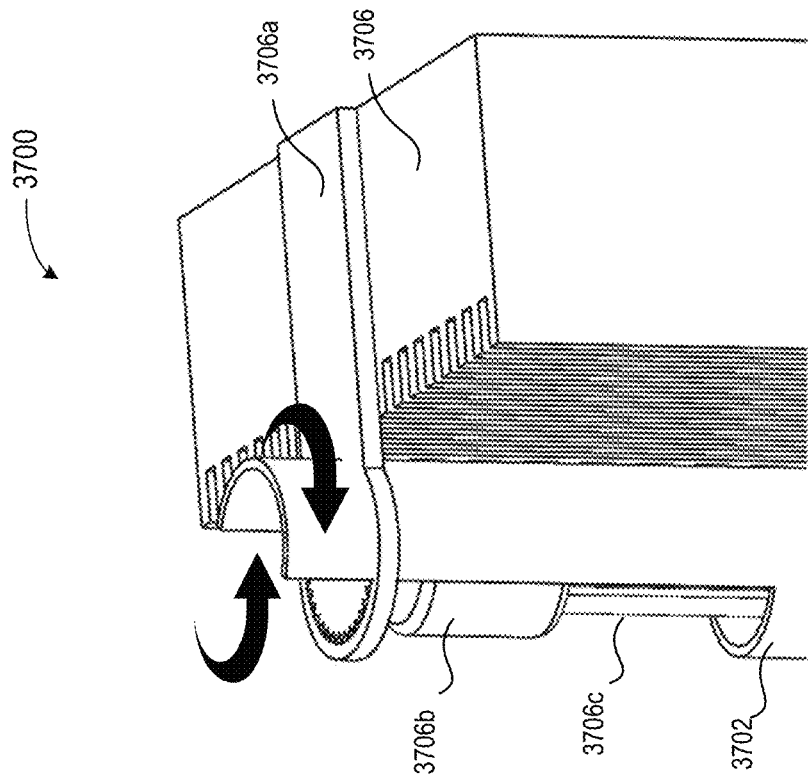
FIGS. 37B-37C depict close-up views of a top portion of the example mounting apparatus of FIG. 37A according to various aspects of this disclosure.
Figure 37B:
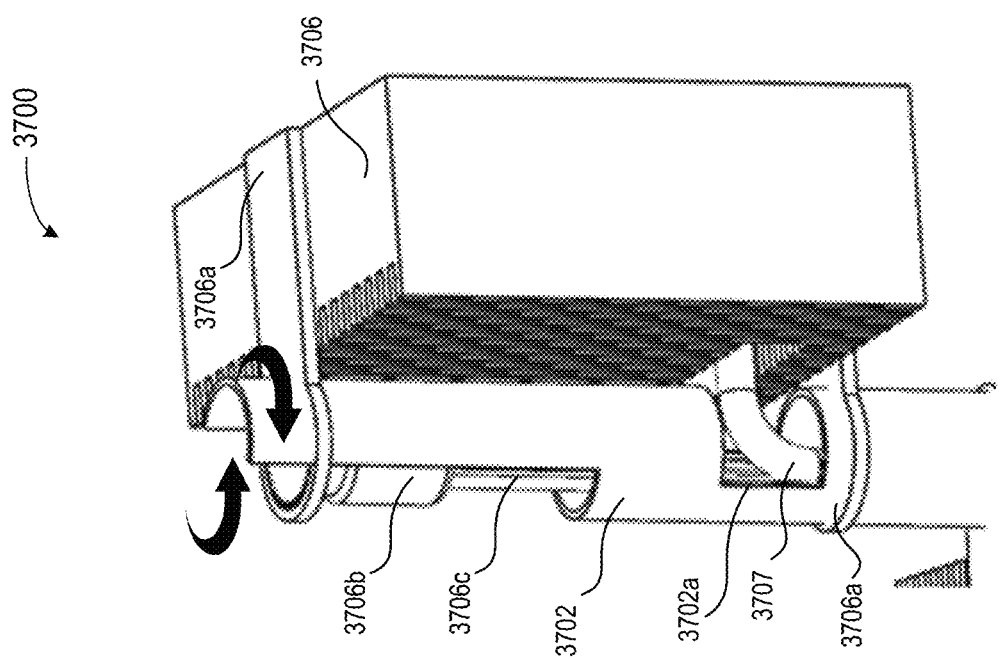

FIG. 37B depicts a close-up view of the radio enclosure 3706 and the post 3702 of the example mounting apparatus 3700, and FIG. 37C depicts a further magnified view of the top portion of the radio enclosure 3706 and the post 3702 as shown in FIG. 37B. As shown in FIGS. 37B and 37C, the radio enclosure 3706 may be attached to the post 3702 via the set of brackets 3706a. The set of brackets 3706a may further be coupled to a stepper motor 3706b. More specifically, the top bracket in the set of brackets 3706a may be directly coupled to the stepper motor 3706b. The bottom bracket in the set of brackets 3706a may serve to secure a bottom portion of the radio enclosure 3706 in place and may also enable rotation of the radio enclosure 3706 as driven by the rotation of the stepper motor 3706b and consequent movement of the top bracket. In general, a stepper motor may, based on receiving an electrical signal, rotate in a given direction in discrete, one-step movements. The stepper motor 3706b may have one or more corresponding cables 3706c that carry electrical signals to and from the stepper motor 3706a. The cables 3706c may run from the stepper motor 3706b through the interior of the post 3702 and may then connect to an NPU (or the like) that may be housed in the base 3701 previously shown in FIG. 37A. The stepper motor 3706b may then be configured to rotate circumferentially to the pole 3702 in response to receiving a command signal from the NPU (or the like) via its one or more cables, where that command signal may specify a particular direction of rotation and/or a particular amount of the rotation (e.g., a particular number of "steps" of rotation). As the stepper motor 3706b rotates, the set of brackets 3706a, which is coupled to both the stepper motor 3706b and the radio enclosure 3706, may rotate in line with the movement of the stepper motor 3706b and may thereby rotate the radio enclosure 3706. In this way, the radio enclosure 3706 may be mechanically aligned to a desired horizontal position such that a radio module housed within the radio enclosure 3706 may generate one or more beams in a given direction.

As further shown in FIG. 37B, the post 3702 may include an opening 3702a for receiving one or more cables 3707 for a radio module housed within radio enclosure 3706, which may also run through the interior of the post 3702 to connect to an NPU (or the like) housed in the base 3701. The opening 3702a may enable the set of brackets 3706a and radio enclosure 3706 to rotate without being restricted or impeded by the one or more cables 3707 and/or 3706c. In this way, the mounting apparatus 3700 may be able to achieve up to a cumulative 360-range of rotation for each radio enclosure. More specifically, the opening 3702a may provide slack for the one or more cables 3707 and thereby facilitate rotation of the radio enclosure 3706 in a 180-degree range in each direction (e.g., 180-degrees left and 180-degrees right from a starting point of 0-degrees).

Similarly, each of the other radio enclosures 3703-3705 of the mounting apparatus 3700 may be configured as described with reference to FIG. 37B. For example, each of the radio enclosures 3703-3705 may be attached to the post 3702 via a respective set of brackets, and each radio enclosure's top bracket may further be coupled to a respective stepper motor that may serve to rotate the radio enclosure's top bracket and thereby the radio enclosure itself. The respective stepper motor of each of the radio enclosures 3703-3705 may have one or more corresponding cables that may run through the interior of the post 3702 and connect the respective stepper motor to an NPU (or the like) housed in the base 3701. Further, the post 3702 may have a respective opening for receiving one or more cables of a respective radio module housed within each of the radio enclosures 3703-3705.

Figure 37D:
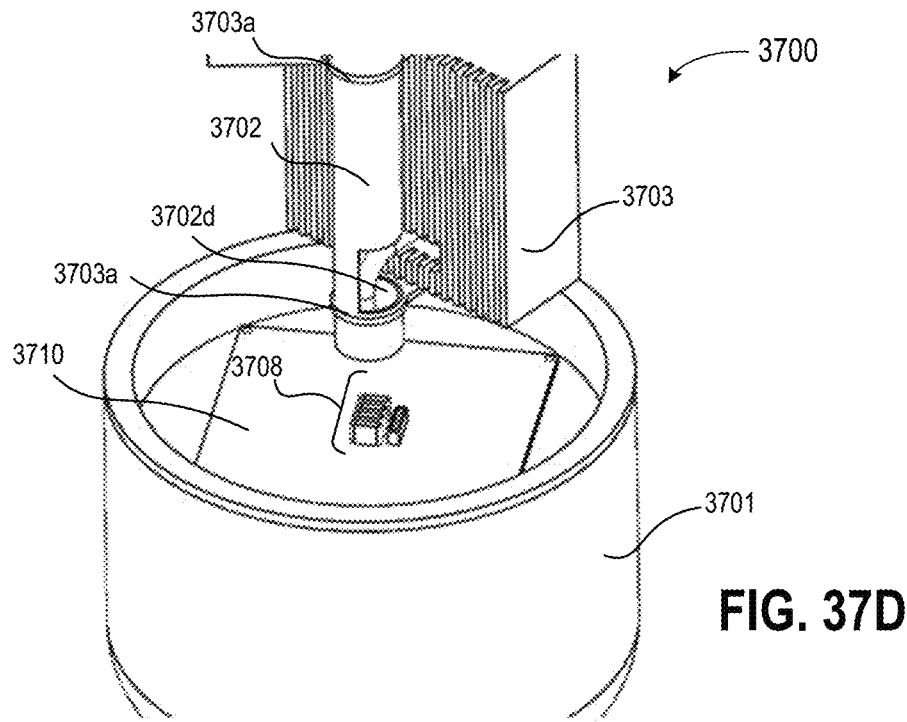
FIGS. 37D-37E depict close-up views of a bottom portion of the example mounting apparatus of FIG. 37A according to various aspects of this disclosure.

Turning to FIG. 37D, a close-up view of the base 3701 (with its top support structure removed) and the radio enclosure 3703 of the example mounting apparatus 3700 is shown, where radio enclosure 3703 is the bottom-most radio enclosure of the mounting apparatus 3700 that is nearest to the base 3701. As shown, radio enclosure 3703 may be attached to the post 3702 via a set of brackets 3703a having a top bracket and a bottom bracket. The set of brackets 3703a may be coupled to a respective stepper motor (not shown) that may serve to rotate the set of brackets 3703a and thereby the radio enclosure 3703 as described above. The respective stepper motor for radio enclosure 3703 may have one or more cables that may run through the interior of the post 3702. Furthermore, one or more cables for a radio module housed within radio enclosure 3703 may pass through an opening 3702d of the post 3702. Although not shown in FIG. 37D, these cables, along with the cables for the respective stepper motors and radio modules of each other radio enclosure, may run through and protrude from the bottom end of the post 3702 and into the base 3701 to connect to an NPU (or the like) housed within the base 3701. As shown, there may also be a set of connectors 3708 housed within the base 3701 atop a plate 3710 that may facilitate a connection between the cables and an NPU (or the like), which is not shown in FIG. 37D but may be housed within the base 3701 and positioned below the plate 3710.

Figure 37E:
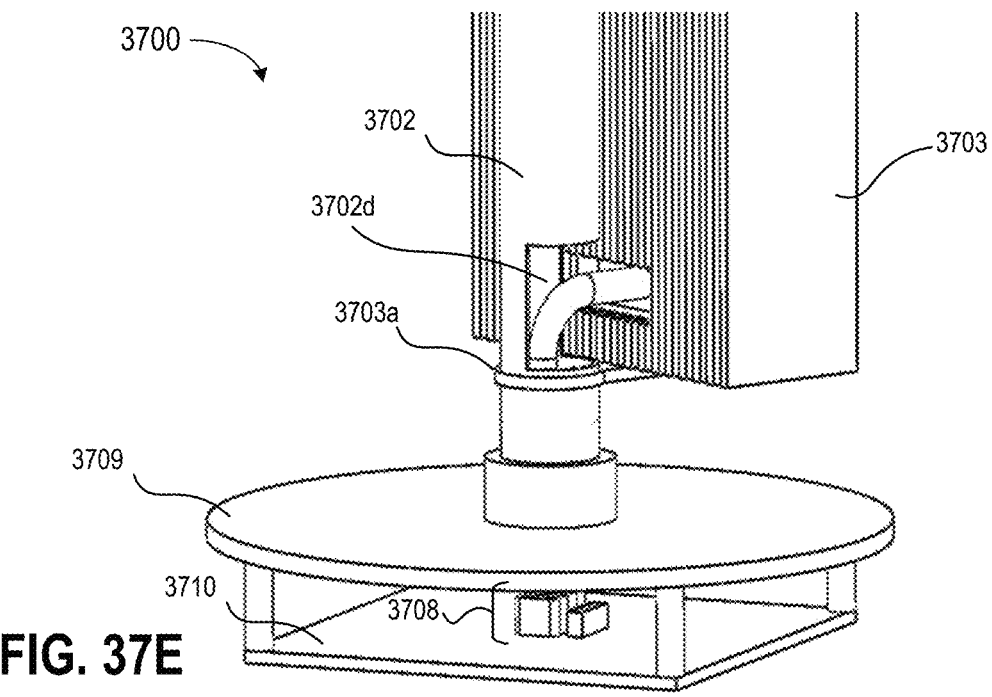

FIG. 37E depicts an interior view of the base 3701. The post 3702 and the set of connectors 3708 may be separated by a top support structure 3709. The post 3702 may be affixed atop the top support structure 3709, which may provide support for the post 3702 (and its attached radio enclosures) and shield the set of connectors 3708 and any equipment that may be housed in the base 3701 (e.g., an NPU) from bearing the weight of the post 3702 and the other attached equipment. The set of connectors 3708 may be aligned vertically with the post 3702 to facilitate a connection between the one or more cables that may protrude from the bottom of the post 3702 and an NPU (not shown), which may be positioned below the plate 3710 within the base 3701.

Figure 37H:
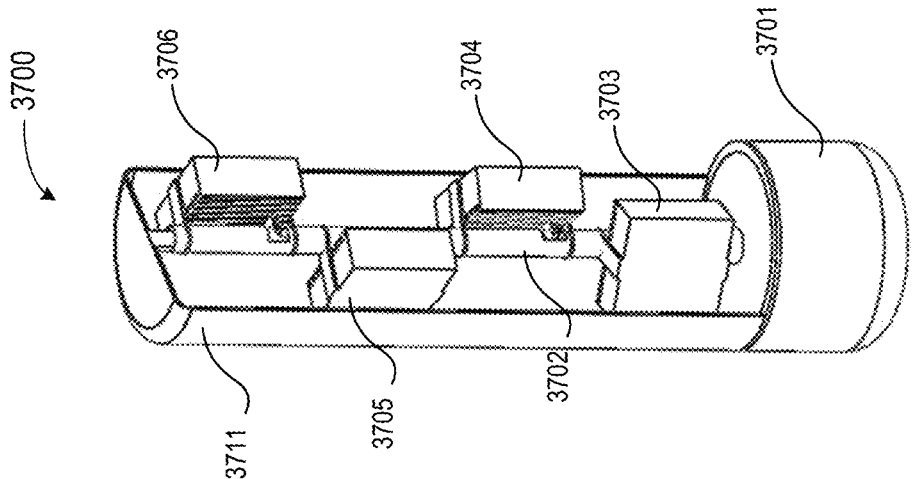
FIG. 37F-37H depict different views of a cover portion of the example mounting apparatus of FIG. 37A according to various aspects of this disclosure.
Figure 37G:
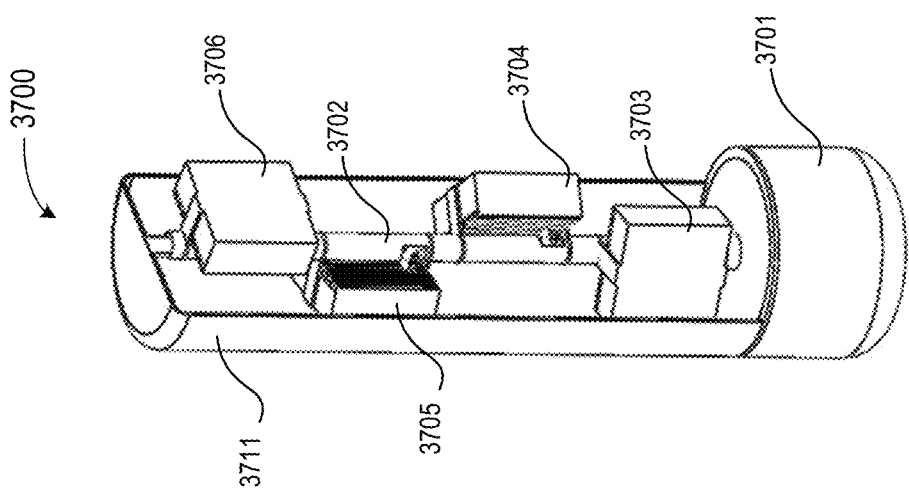
Figure 37F:
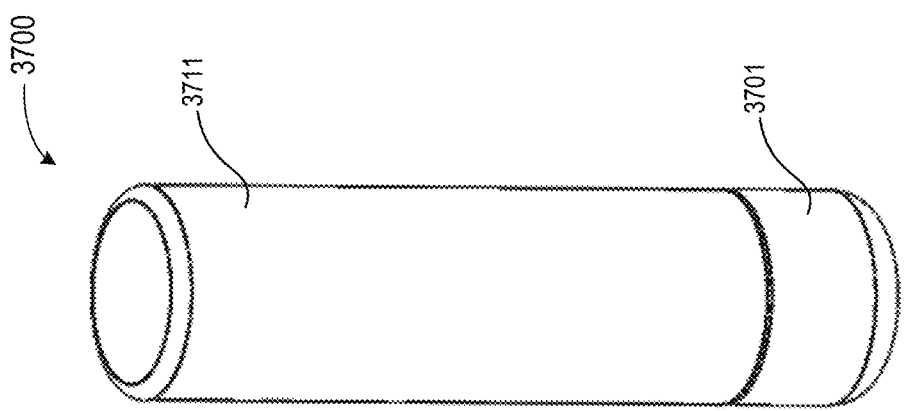

FIG. 37F depicts a cover portion 3711 that may be placed over the post 3702 and radio enclosures 3703-3706 of the example mounting apparatus 3700 and may connect securely to the base 3701. FIGS. 37G and 37H depict cross-sectional views of the mounting apparatus 3700 when the cover 3711 has been secured atop the base 3701. The cover 3711 may provide an aesthetic appeal to the example mounting apparatus 3700. In some implementations, the cover may be designed to conform with the aesthetic environment of the mounting location of the mounting apparatus. The cover 3711 may also serve to protect the wireless communication equipment housed by the mounting apparatus 3700 from external elements, such as harsh weather and wildlife, among other possibilities.

As described herein, the second type of mounting apparatus may be configured to mechanically rotate each of one or more radio modules of a wireless communication node independently of the other radio modules based on one or more command signals received from a computing device such as an NPU of the wireless communication node, which may be housed within a base portion of the mounting apparatus. More specifically, the NPU may send a command signal instructing a given motor of the mounting apparatus to rotate a corresponding radio enclosure such that a given radio module housed within the corresponding radio enclosure may be rotated in a desired manner (e.g., in a desired direction and by a desired amount). The command signal may embody one or more instructions for the given motor to rotate in a given direction and by a given amount (e.g., given number of degrees or given number of "steps"), thereby enabling alignment of the given radio module to a desired position.

The NPU may issue such a command signal in response to various triggering events. As one possibility, the NPU may issue a command signal to a given radio module's controlling motor in response to receiving a message over a data network from a remote computing system, such as a network monitoring system. For instance, a network monitoring system for a wireless communication system (e.g., a wireless mesh network) may monitor signal quality of radio modules of wireless communication nodes within the wireless communication system, one of which may be the wireless communication node that is mounted using a mounting apparatus of the second type disclosed herein. In such an arrangement, the network monitoring system may determine that a direction of a given radio module of the wireless communication node may require adjustment and may then send a command message to the NPU of the wireless communication node indicating the adjustment that is required. In turn, the NPU may send a command signal to a given motor corresponding to the given radio module (e.g., a stepper motor that is coupled via a set of brackets to a radio enclosure housing the given radio module) instructing the motor to rotate in a certain direction (e.g., left or right) by a certain amount (e.g., a given number of "steps" by the stepper motor).

As another possibility, the NPU for the wireless communication node may issue a command signal to a given radio module's controlling motor in response to locally determining that a directional adjustment of the given radio module is needed. For instance, the NPU may locally determine that a directional adjustment of a given radio module is needed based on a signal quality metric that is reported by the given radio module, and the NPU may then send a command signal to the given radio module's controlling motor that instructs the motor to rotate in a certain direction (e.g., left or right) by a certain amount (e.g., a given number of "steps" by the stepper motor).

The NPU for the wireless communication node may issue a command signal to a given radio module's controlling motor in response to other triggering events as well.

While the base and the cover are shown in FIGS. 37A-37H to take a cylindrical form, it should be understood that the base and the cover of the second type of mounting apparatus may take the form of other shapes and/or designs. The second type of mounting apparatus may be mounted at a location such as the rooftop of a building or another comparable mounting location that provides for acceptable LOS conditions. Although not shown in FIGS. 37A-37H, the second type of mounting apparatus may also include additional hardware components that may be used to facilitate mounting of the second type of mounting apparatus to a surface, such as a rooftop or other mounting location that that provides for improved LOS conditions. Such hardware may include penetrative and non-penetrative hardware.

The second type of mounting apparatus may take various other forms as well. In another implementation, the second type of mounting apparatus may take the form of a mounting apparatus of the first type. For instance, the mounting apparatus may take the form of a mounting apparatus of the first type, such as one of the example mounting apparatuses of FIGS. 29-36, that further includes a motor and/or additional bracketing elements of the second type of mounting apparatus as described above that enable the radio enclosures of the mounting apparatus to mechanically rotate in a desired manner (e.g., in a desired direction and by a desired amount).

CONCLUSION

Example embodiments of the disclosed innovations have been described above. At noted above, it should be understood that the figures are provided for the purpose of illustration and description only and that various components (e.g., modules) illustrated in the figures above can be added, removed, and/or rearranged into different configurations, or utilized as a basis for modifying and/or designing other configurations for carrying out the example operations disclosed herein. In this respect, those skilled in the art will understand that changes and modifications may be made to the embodiments described above without departing from the true scope and spirit of the present invention, which will be defined by the claims.

Further, to the extent that examples described herein involve operations performed or initiated by actors, such as humans, operators, users or other entities, this is for purposes of example and explanation only. Claims should not be construed as requiring action by such actors unless explicitly recited in claim language.

I claim:

1. A wireless communication node of a wireless communication system, the wireless communication node comprising:
 a wireless communication module including a radio, wherein the radio is configured to communicate with a satellite; and
 a mounting assembly for mounting the wireless communication module at a ground-based installation site, wherein the mounting assembly is configured to mechanically rotate the wireless communication module in response to receiving a command signal, wherein the wireless communication node is configured to deliver a high-speed Internet service to the ground-based installation site, wherein the radio has electronic beamsteering capability, and wherein the wireless communication node at the ground-based installation site is configured to establish a communication link with the satellite by utilizing electronic beamsteering of the radio for fine alignment and mechanical rotation of the mounting assembly for coarse alignment.

2. The wireless communication node of claim 1, wherein the radio is configured to communicate with the satellite via a multiple input multiple output (MIMO) beam.

3. The wireless communication node of claim 1, wherein the radio is configured to communicate with the satellite over frequencies of at least 5 Gigahertz (Ghz).

4. The wireless communication node of claim 1, wherein the radio comprises an antenna element array.

5. The wireless communication node of claim 1, wherein the satellite comprises a low earth orbit (LEO) satellite.

6. The wireless communication node of claim 1, wherein the ground-based installation site comprises a residential or commercial building.

7. The wireless communication node of claim 1, wherein the mounting assembly is placed exterior to the residential or commercial building.

8. The wireless communication node of claim 1, further comprising:
   a processor that is configured to control the wireless communication module.

9. The wireless communication node of claim 8, wherein the command signal comprises a command signal issued by the processor.

10. The wireless communication node of claim 1, wherein the command signal specifies one or both of (i) a direction of rotation or (ii) an amount of rotation.

11. The wireless communication node of claim 1, wherein the radio comprises an antenna.

12. The wireless communication node of claim 11, wherein the radio comprises transmitters and receivers that are capable of beamforming and creating multiple beams simultaneously in different directions.

13. The wireless communication node of claim 12, wherein the radio further comprises a processor configured to process intermediate frequency (IF) signals and define a frequency range of radio signals that can be transmitted or received.

14. A wireless communication system comprising:
   a plurality of satellites; and
   a plurality of wireless communication nodes, wherein each respective wireless communication node of the plurality of wireless communication nodes comprises:
      a respective wireless communication module including a respective radio, wherein the respective radio is configured to communicate with at least one satellite of the plurality of satellites; and
      a respective mounting assembly for mounting the respective wireless communication module at a respective ground-based installation site, wherein the respective mounting assembly is configured to mechanically rotate the respective wireless communication module in response to receiving a command signal, wherein the respective wireless communication node is configured to deliver a high-speed Internet service to the respective ground-based installation site, wherein the respective radio has electronic beamsteering capability, and wherein the respective wireless communication node at the respective ground-based installation site is configured to establish a respective communication link with the at least one satellite of the plurality of satellites by utilizing electronic beamsteering of the respective radio for fine alignment and mechanical rotation of the respective mounting assembly for coarse alignment.

15. The wireless communication system of claim 14, wherein each respective wireless communication node's radio is configured to communicate with the at least one satellite of the plurality of satellites via a multiple input multiple output (MIMO) beam.

16. The wireless communication system of claim 14, wherein each respective wireless communication node's radio is configured to communicate with the at least one satellite of the plurality of satellites over frequencies of at least 5 Gigahertz (Ghz).

17. The wireless communication system of claim 14, wherein each respective satellite of the plurality of satellite comprises a low earth orbit (LEO) satellite.

* * * * *